United States Patent [19]

Maeda et al.

[11] Patent Number: 6,005,675

[45] Date of Patent: *Dec. 21, 1999

[54] FACSIMILE APPARATUS FOR TRANSMITTING AND RECEIVING DATA AND COMMANDS RELATING TO THE APPARATUS

[75] Inventors: Toru Maeda, Mitaka; Hitoshi Saito, Yokohama; Akemi Sato, Kawasaki; Akira Matsui; Kazuhiro Sugawara, both of Tokyo, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/567,799

[22] Filed: Dec. 6, 1995

Related U.S. Application Data

[63] Continuation of application No. 07/952,944, Sep. 28, 1992, abandoned.

[30] Foreign Application Priority Data

| Sep. 27, 1991 | [JP] | Japan | 3-248909 |
| Sep. 27, 1991 | [JP] | Japan | 3-248910 |
| Sep. 27, 1991 | [JP] | Japan | 3-248911 |
| Sep. 28, 1992 | [JP] | Japan | 4-258703 |

[51] Int. Cl.$^6$ .............................. H04N 1/32; H04Q 11/04
[52] U.S. Cl. ...................... 358/442; 358/437; 358/445; 370/60; 370/94.1
[58] Field of Search .................... 358/476, 426, 358/261.1, 261.2, 474, 442, 434, 435, 436, 437, 438, 449, 440, 445, 403, 406, 407, 439; 370/94.1, 60, 60.1; 379/100, 216, 355; 359/123, 135, 136, 137

[56] References Cited

U.S. PATENT DOCUMENTS

Re. 31,182  3/1983  Crager et al. ........................ 358/435

(List continued on next page.)

OTHER PUBLICATIONS

Daniel Fishman and Elliot King, The Book Of Fax:Second Edition,pp. 117,118,124,125,131,132, 1990.

Pat. Abs. Jp. vol. 12, No. 261, Jul. 22, 1988 (JP-A-63046846).

Pat. Abs. Jp. vol. 15, No. 172, Apr. 30, 1991 (JP-A-3035357).

IBM Tech. Discl. Bull. vol. 32, No. 6A, Nov. 1989, pp. 426–427, "The Receiving Confirmation Function in Facsimile".

IBM Tech. Discl. Bull. vol. 33, No. 1B, Jun. 1990, p. 363 "Remote Configuration of a PC–Driven Facsimile System".

"Computer Communications", vol. 2, No. 4, Aug. 1979 pp. 165–180 published by IPC science and technology press.

IBM Tech. Discl. Bull. vol. 32, No. 6A, Nov. 1989 pp. 426–427, "The Receiving Confirmation Function Facsimile".

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

A control command indicating the end of a command is set in a remote command in file data to be transmitted, and the remote command is transmitted as packet data having a data length based on the control code to a receiving apparatus. When the receiving apparatus extracts the command from the received packet data, it informs, as a response signal, to the apparatus which transmitted the command that the command was extracted, and the transmitting apparatus restarts command transmission from a portion where the response signal cannot be received.

65 Claims, 42 Drawing Sheets

U.S. PATENT DOCUMENTS

| | | | |
|---|---|---|---|
| 4,058,672 | 11/1977 | Crager et al. | 358/435 |
| 4,058,838 | 11/1977 | Crager et al. | 358/425 |
| 4,238,851 | 12/1980 | Takahashi et al. | 370/94.1 |
| 4,270,146 | 5/1981 | Adachi | 358/256 |
| 4,581,656 | 4/1986 | Wada | 358/257 |
| 4,703,477 | 10/1987 | Adelmann et al. | 370/94 |
| 4,819,063 | 4/1989 | Sugiura et al. | 358/75 |
| 4,819,231 | 4/1989 | Yamada | 370/94 |
| 4,827,349 | 5/1989 | Ogata et al. | 358/256 |
| 4,829,385 | 5/1989 | Takezawa | 358/260 |
| 4,855,995 | 8/1989 | Hiyama et al. | 370/94.1 |
| 4,876,681 | 10/1989 | Hagiwara et al. | 370/94.1 |
| 4,897,733 | 1/1990 | Sakaguchi et al. | 358/435 |
| 4,897,835 | 1/1990 | Gaskill et al. | 370/94.1 |
| 4,910,785 | 3/1990 | Nakatsuma | 382/9 |
| 4,922,349 | 5/1990 | Abe et al. | 358/443 |
| 5,023,728 | 6/1991 | Nimura et al. | 358/437 |
| 5,095,445 | 3/1992 | Sekiguchi | 364/514 |
| 5,127,040 | 6/1992 | D'Avello et al. | 379/58 |
| 5,134,501 | 7/1992 | Satomi et al. | 358/434 |
| 5,155,601 | 10/1992 | Toyama | 358/401 |
| 5,157,662 | 10/1992 | Tadamura et al. | 370/68.1 |
| 5,208,682 | 5/1993 | Ahmed | 358/437 |
| 5,291,546 | 3/1994 | Giler et al. | 358/407 |
| 5,384,825 | 1/1995 | Dillard et al. | 379/59 |
| 5,394,462 | 2/1995 | Maemura | 379/142 |
| 5,557,662 | 9/1996 | Kenmochi et al. | 379/216 |

```
CMD = TEL NO
DATA = 1234567890 [LINE FEED CODE]  } GROUP A
CMD = NAME
DATA = ABCDEFG                      } GROUP B
```

FIG. 10

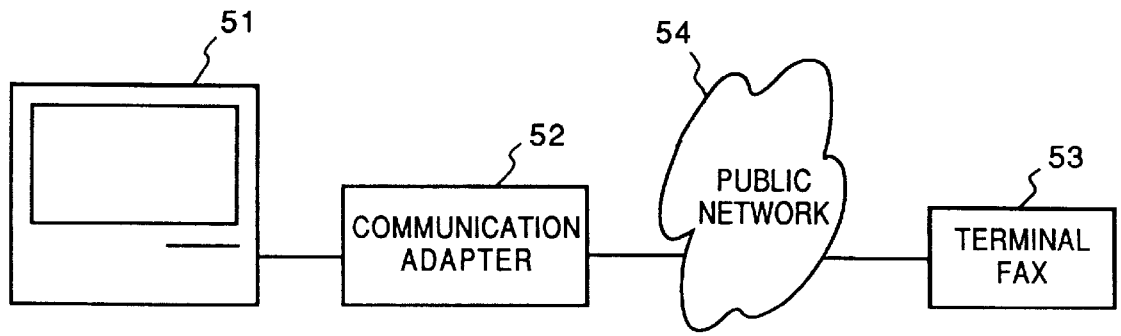
FIG. 18
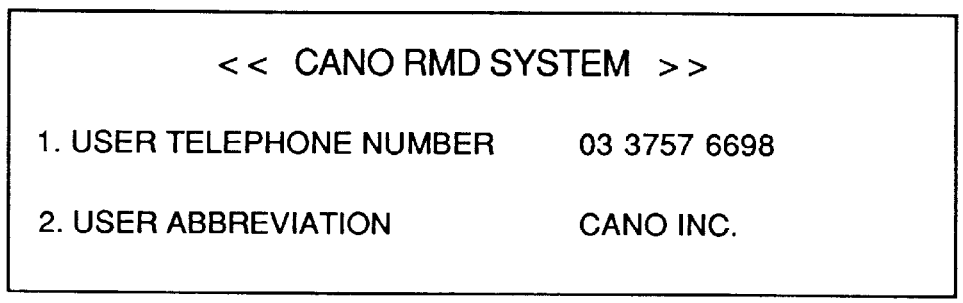
FIG. 19
UT03 3757 6698crlf
UNCANO INC. crlf
UT  USER TELEPHONE NUMBER REGISTRATION COMMAND
UT  USER ABBREVIATION REGISTRATION COMMAND
FIG. 20

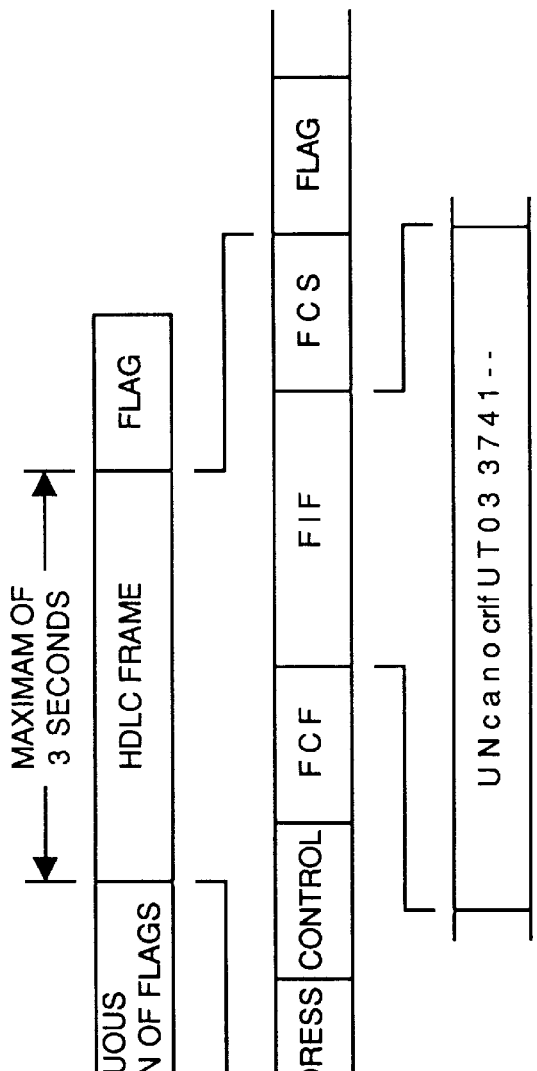
F I G. 21A
F I G. 21B CONTINUOUS FRAME
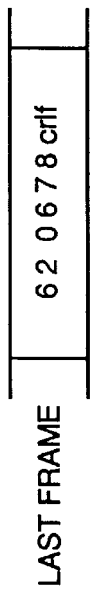
F I G. 21C LAST FRAME
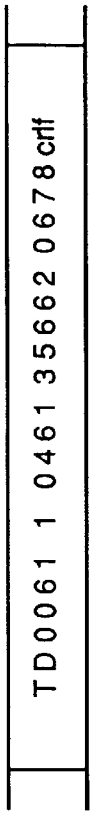
F I G. 21D RECEPTION BUFFER

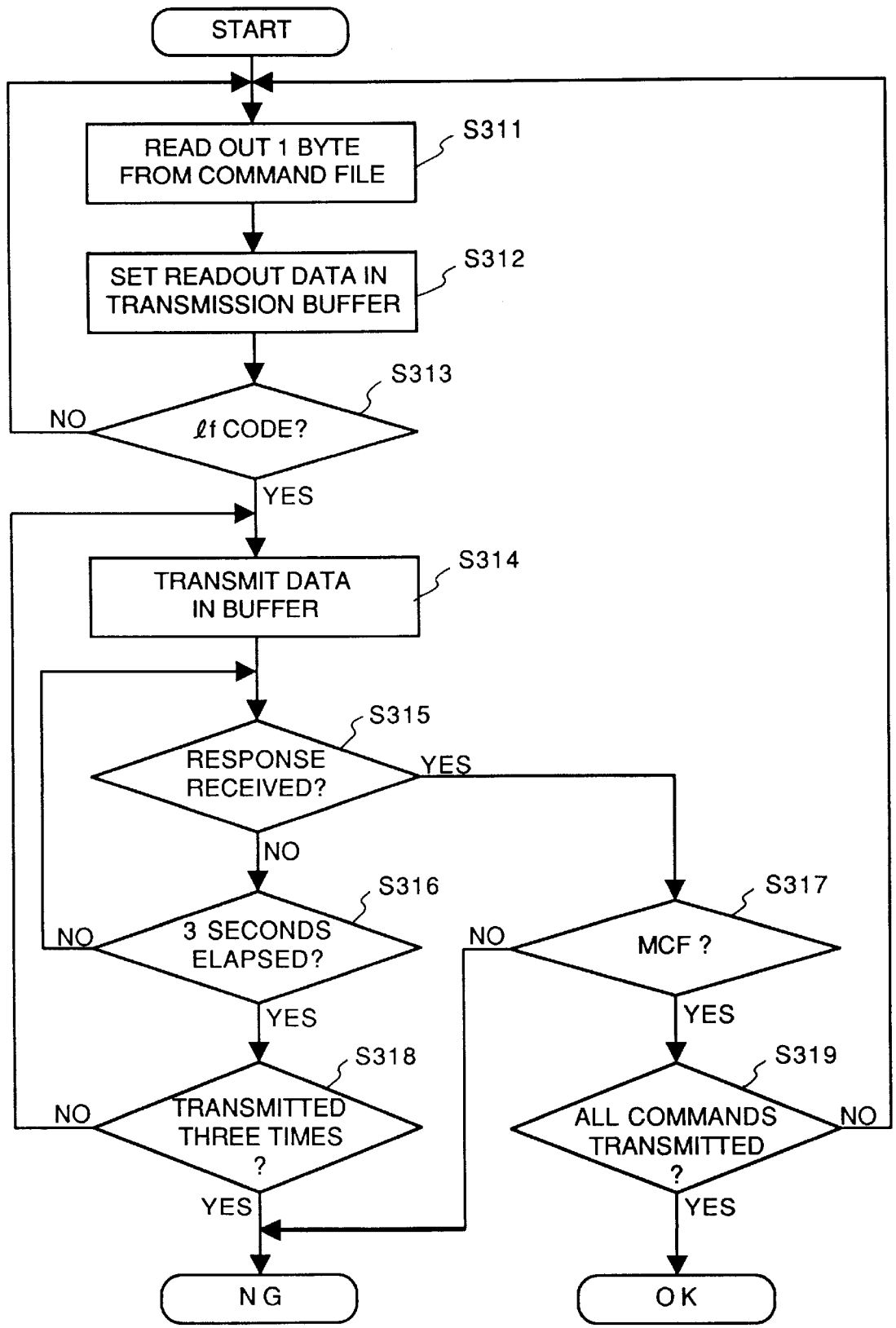
F I G. 26

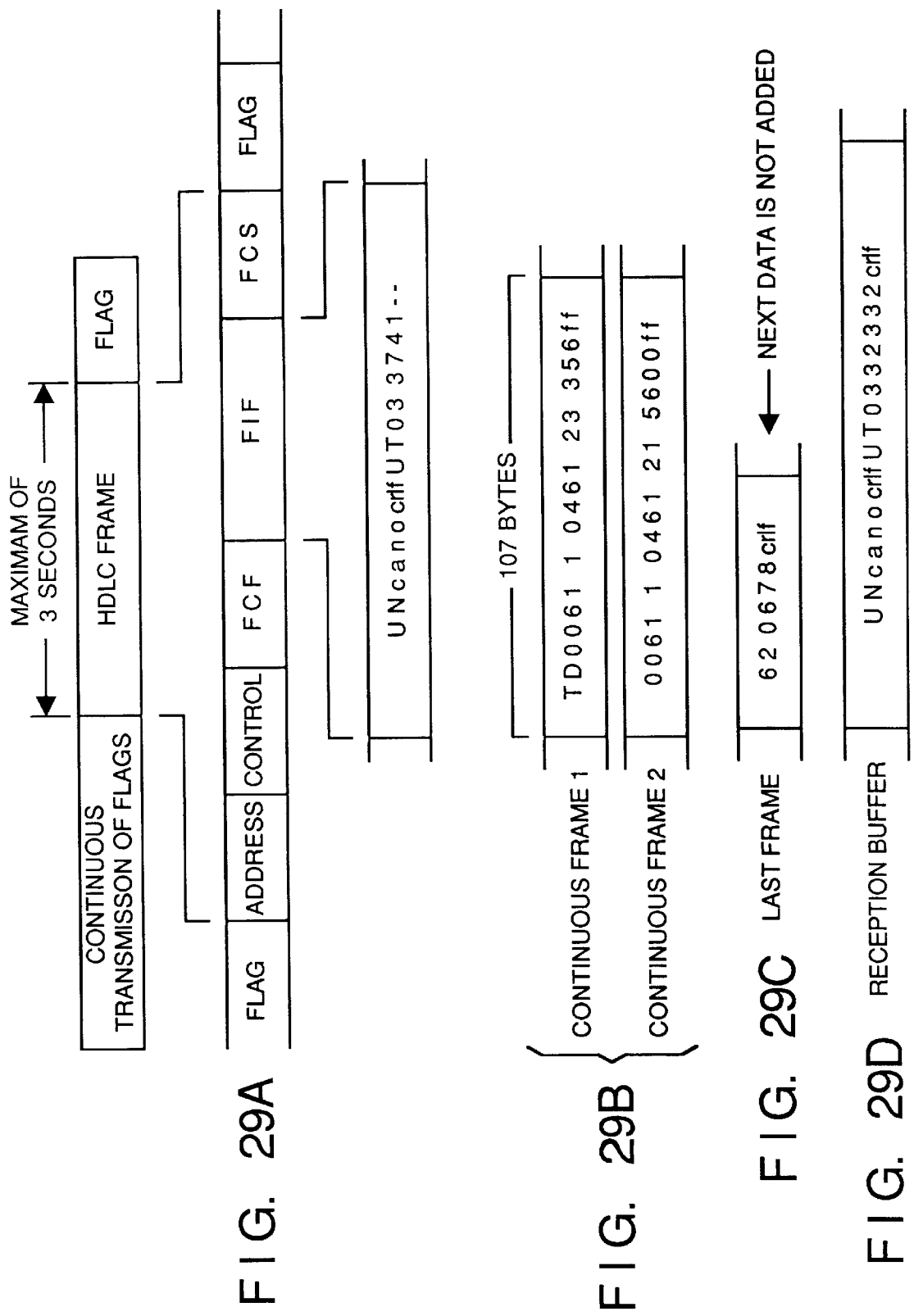

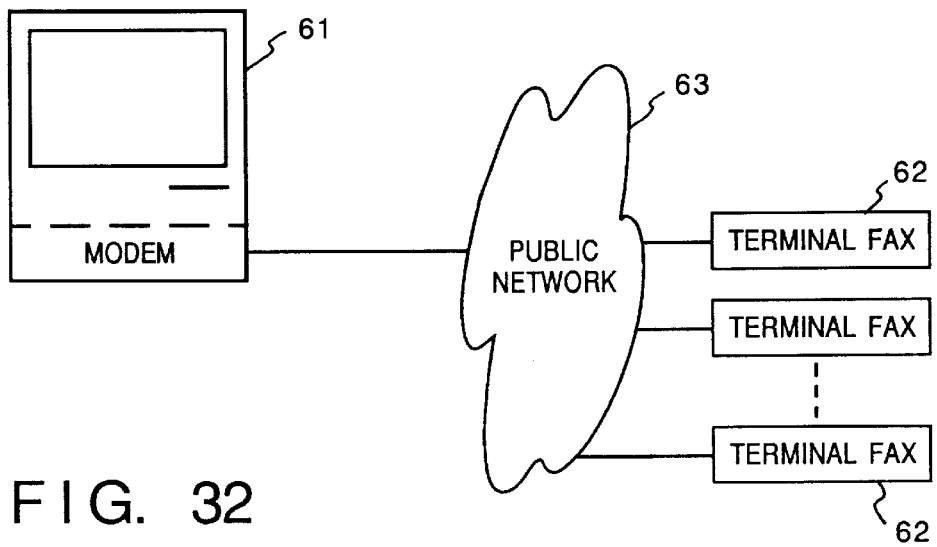
FIG. 32
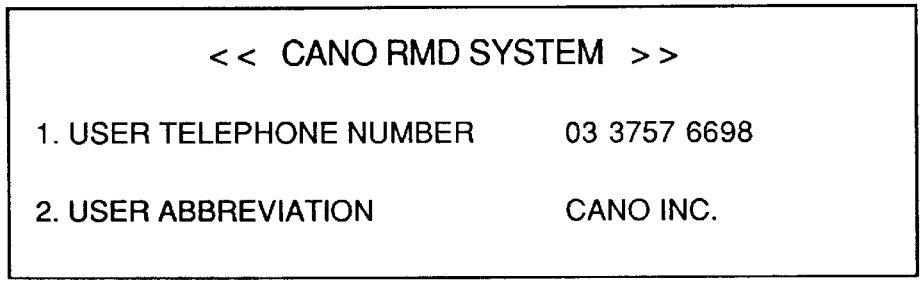
FIG. 33
UT03 3757 6698crlf
UNCANO INC. crlf
DI01crlf
DT045 467 2111crlf
DNabcd efghcrlf
DI02crlf
DT0432 255 3476crlf
DNlmnopqcrlf
eof
COMMANDS
    UT    USER TELEPHONE NUMBER REGISTRATION COMMAND
    UN    USER ABBREVIATION REGISTRATION COMMAND
    DI    SPEED DIAL NO. DESIGNATION COMMAND
    DT    SPEED DIAL TELEPHONE NUMBER REGISTRATION COMMAND
    DN    SPEED DIAL ABBREVIATION REGISTRATION COMMAND
FIG. 34

```
<<  CANO RMD SYSTEM  >>

1. CONNECTION TELEPHONE NUMBER    03 3757 6698

2. TERMINAL TYPE NAME              CF-L770

3. DESTINATION COUNTRY             USA

4. ROM VERSION                     U01.01
```

XD TERMINAL TYPE INFORMATION REQUEST COMMAND

XO TERMINAL TYPE NAME
XC DESTINATION COUNTRY
XV ROM VERSION

XOCF-L770crfXCUSAcrlfXVU01. 01crlf

FIG. 35

XOCF-L770crlf
XCUSAcrlf
XVU01. 01crlf
UT03 3757 6698crlf
UNCANO INC. crlf
DI01crlf
DT045 467 2111crlf
DNabcd efghcrlf
DI02crlf
DT0132 255 3476crlf
DNlmnopqcrlf
eof

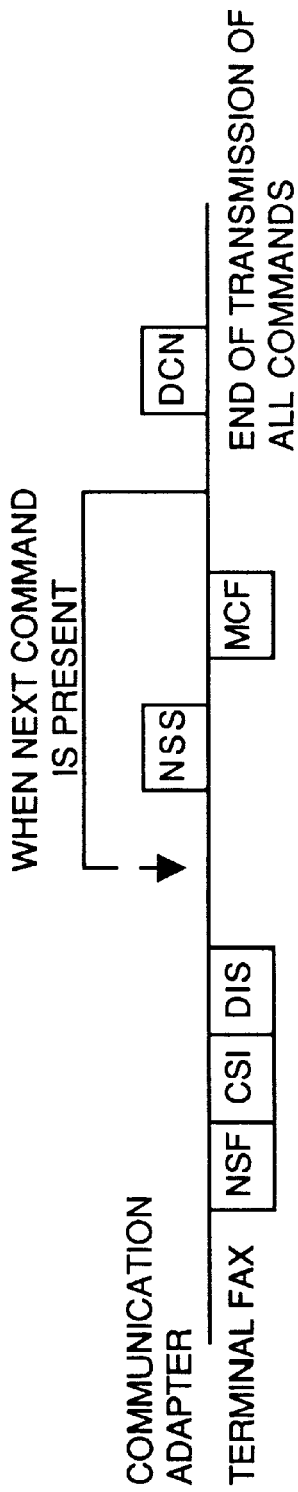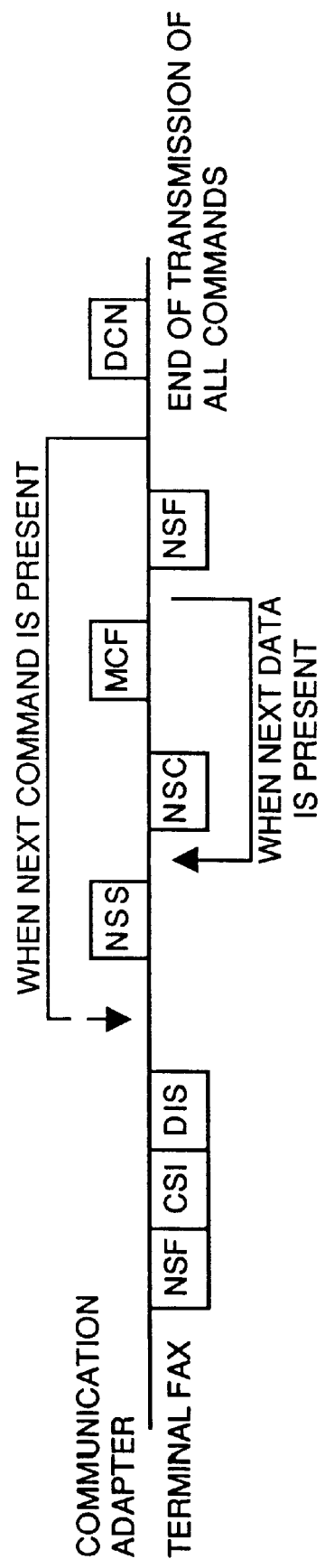

FACSIMILE APPARATUS FOR TRANSMITTING AND RECEIVING DATA AND COMMANDS RELATING TO THE APPARATUS

This application is a continuation of application Ser. No. 07/952,944 filed Sep. 28, 1992, abandoned.

BACKGROUND OF THE INVENTION

The present invention relates to a facsimile apparatus for transmitting/receiving a remote command and transferring character files and data files.

Conventionally, as an operation other than a normal transmission/reception operation in a facsimile apparatus, for example, when remote commands are transmitted/received, they are transmitted upon being divided in units of fixed packet lengths or in units of packets in correspondence with the remote commands.

However, in such a facsimile apparatus, since remote commands in a file memory are divided in units of fixed lengths regardless of their contents, a response to a specific remote command in a file from a receiving facsimile apparatus cannot be expected. For this reason, when remote commands are terminated as an error during transmission, the remote command transmission must be restarted from the beginning.

A conventional facsimile apparatus discriminates the presence/absence of a transmission original in its communication protocol. When an original is present, a communication control program is started to transmit a original content to an apparatus on the other end of the line. In an apparatus using the ECM procedure of the CCITT recommendation T.30 in its communication protocol, only image information is transmitted as facsimile information.

However, in a facsimile apparatus of this type, a character file cannot be transmitted in a transmission function other than an original transmission function due to a limitation on the communication protocol. When the ECM procedure of the CCITT recommendation T.30 is used, a data file cannot be transmitted.

A conventional facsimile apparatus has many registration items such as abbreviated dial numbers, a user telephone number, a user abbreviation, and the like. For this reason, when the apparatus is installed, a service person must manually perform input operations of these items for a long period of time.

When a trouble of an apparatus occurs, a service person must go to the installation site of the apparatus to make adjustments of the apparatus.

In order to reduce time/economic losses caused when a service person goes to the site of installation, a technique for registering data of a facsimile apparatus or adjusting the apparatus from a remote place by utilizing a communication function of the facsimile apparatus has been proposed.

When data registration is performed from a remote place, it is easiest to perform communications in an HDLC frame format used by the facsimile apparatus in a communication procedure using a 300-bps modem, following the CCITT recommendation V.21, of the facsimile apparatus so as to read/write data from/in an internal memory of the apparatus.

In the CCITT recommendation T.30 which defines the standards of the facsimile apparatus, however, a preamble for a 300-bps binary code signal is defined as a series of flag sequences of 1 second+15% (CCITT T.30 5.3.1.1), and the maximum length of one frame is defined to be 3 seconds +15%. For this reason, an insignificant preamble of 1 second must be added to significant data of 3 seconds, thus providing disadvantages in data communication efficiency.

The above-mentioned standards are determined assuming a frame having a maximum length of about 100 bytes. For this reason, to receive data exceeding 3 seconds without limitations requires a considerable change in software. When reception of infinitely large data is permitted, even when a communication error occurs, an error portion cannot immediately re-sent, and all the data must be re-sent after transmission for a long period of time, thus considerably increasing the communication time.

Furthermore, the above-mentioned time period of 1 second is determined as a countermeasure against a factor such as an echo occurring on a communication line. It is not desirable to merely shorten this time period since a communication error may often occur due to a factor such as an echo in a long-distance communication mode.

In the remote registration operation, a receiver must inform to a transmitter whether or not registration is normally performed after the receiver executes received commands. However, the registration items of the facsimile apparatus are as many as several tens to several hundreds of items. For this reason, if registration is executed for each item, and a response for this registration is sent back, communications require a very long period time.

In order to eliminate the above-mentioned drawback, a method of simultaneously executing registrations after all the commands are received, and then sending back a result indicating whether or not the registrations are normally performed is also known. In this case, however, in order to receive all the commands, a large-capacity memory is required. In addition, when the registrations cannot be performed, and the receiver sends back a negative response, the transmitter cannot identify which of items cannot be registered.

When data registrations are performed from a remote place, a host apparatus for performing the registration operation must recognize the data format in the receiver, and must perform a write access matching with the recognized format. If this is not done, normal registrations cannot be performed in the receiver, thus causing a trouble.

For example, if the user tries to register a 30-digit telephone number to a registration area for abbreviated dial numbers of a facsimile apparatus which can store a maximum 20-digit abbreviated dial number, that is, if the number of digits of the telephone number to be registered exceeds the registration area, dial numbers stored in an area adjacent to the above registration area may be possibly damaged. However, the registration items of the facsimile apparatus are as many as several tens to several hundreds of items. For this reason, if registration is executed for each item, and a response for this registration is sent back, communications require a very long period time.

When remote registrations are to be performed, an operator is encountered to bear this in mind, and is expected to make operations after he or she recognizes the type of receiving apparatus. However, if the operator recognizes a wrong type of receiving apparatus, the content of the RAM may be destroyed.

Furthermore, even in apparatuses of the same type, data attributes and RAM storage addresses may be changed depending on destination places, program versions, and the presence/absence of optional functions. However, since these pieces of information cannot be normally discriminated by a user, a service person must consequently go to the installation site, thus disabling the remote registrations.

SUMMARY OF THE INVENTION

It is an object of the present invention to provide a facsimile apparatus, which can prevent remote commands in a file memory from being divided in units of fixed lengths regardless of their contents, and can restart transmission of remote commands from a terminated position even when remote commands are terminated as an error during transmission.

In order to achieve the above object, according to the present invention, a facsimile apparatus for transmitting/receiving facsimile information such as character information, image information, and the like, and a control command, comprises means for adding a control code indicating a division of the control command to the control command, means for converting the control command added with the control code into packet data having a predetermined data length on the basis of the control code, and means for transmitting the packet data to a destination station.

Preferably, according to the present invention, the facsimile apparatus further comprises means for extracting the control command included in the packet data, and means for informing to an apparatus which transmitted the packet data that the control command was extracted, and the transmitting facsimile apparatus waits for a response to the control command from a receiving facsimile apparatus.

It is another object of the present invention to provide a facsimile apparatus which can expand an existing communication procedure to a procedure unique to a file transfer operation, and can transfer file data converted into packets to a destination apparatus.

In order to achieve this object, according to the present invention, a facsimile apparatus for transmitting/receiving facsimile information such as character information, image information, and the like, file data, and a control command, comprises means for adding a control code indicating a division of the control command to the control command, means for storing the file data in a predetermined frame of the control command, means for converting the control command storing the file data into packet data having a predetermined data length on the basis of the control code, and means for transmitting the packet data to a destination station.

It is another object of the present invention to provide a facsimile apparatus, which can execute registrations and adjustments by reading/writing data from/in an internal memory of the apparatus from a remote place, and can re-send only an error portion when a communication error occurs during transmission of a large amount of data in the remote registration mode, thereby shortening the communication time even when an error occurs.

In order to achieve the above object, according to the present invention, there is provided a facsimile apparatus for performing a data registration to a plurality of facsimile apparatuses connected to a public network through the public network, comprising means for inputting registration data, means for converting the registration data into a predetermined frame format, means for monitoring the number of bytes of data constituting the frame, dividing means for, when the number of bytes exceeds a predetermined value, dividing the frame into a plurality of frames, and means for adding a code indicating continuation to the divided frame.

It is still another object of the present invention to provide a facsimile apparatus, which can set an arbitrary preamble time in communications, thereby improving communication performance.

In order to achieve the above object, according to the present invention, there is provided a facsimile apparatus for performing a data registration to a plurality of facsimile apparatuses connected to a public network through the public network, comprising means for inputting registration data, means for converting the registration data into a predetermined frame format, and means for changing a preamble time of a preamble to be added to the beginning of the frame in the data registration to be different from a preamble time upon execution of a normal facsimile procedure.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a view showing remote commands according to the first embodiment;

FIG. 18 is a diagram showing an arrangement of a facsimile apparatus according to the fourth embodiment of the present invention;

FIG. 19 is a view showing a display example on a screen according to the fourth embodiment;

FIG. 20 shows commands according to the fourth embodiment:

FIGS. 21A to 21D show frame formats according to the fourth embodiment;

FIGS. 25 and 26 are flow charts showing an operation of the apparatus according to the second modification of the fourth embodiment;

FIGS. 29A to 29D show frames in an HDLC format in a facsimile apparatus according to the sixth embodiment of the present invention;

FIG. 32 is a diagram showing an arrangement of a remote registration apparatus according to the seventh embodiment of the present invention;

FIG. 33 shows a display example on a screen upon data input according to the seventh embodiment;

FIG. 34 shows commands according to the seventh embodiment;

FIG. 35 shows a display example on the screen upon transmission according to the seventh embodiment;

FIGS. 46 to 49 are charts showing protocols of an apparatus according to the eighth embodiment of the present invention.

DETAILED DESCRIPTION OF THE PREFERRED EMBODIMENTS

The preferred embodiments of the present invention will be described in detail below with reference to the accompanying drawings.

The following is a list of abbreviations used throughout the specification.

HDLC (High-level data link control)
NCU (Network control unit)
CNG (Calling tone)
DIS (Digital identification signal)
DTC (Digital transmit command)
DCN (Disconnect)
NSS (Now-standard set-up)
MCF (Message confirmation)
RTP (Retrain positive)
RTN (Retrain negative)
FIF (Facsimile information field)
FCS (Frame check sequence)
DCS (Digital command signal)
EOM (End of message)
ECM (Error correction mode)
EOP (End of page)
PPS (Partial page signal)
FCF (Facsimile control field)
FCD (Facsimile coding data)
RCP (Restoration of partial page control)
RMD (Remort diagnostics)
NSF (Non-standard facilities)
CSI (Called subscriber identification)
CED (Called station identification)
NSC (Non-standard facilities command)

[First Embodiment]

Figure 1:
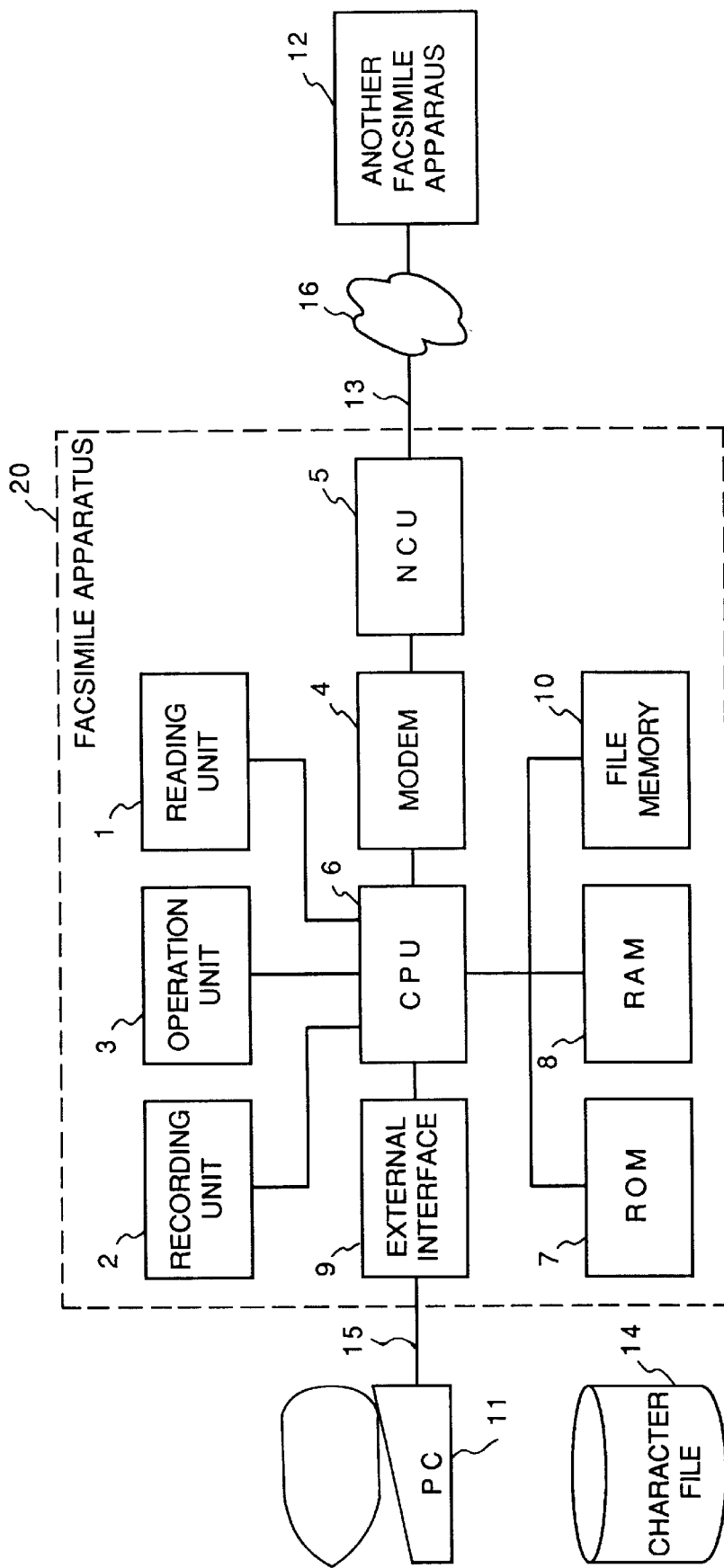
FIG. 1 is a block diagram showing the entire arrangement of a facsimile apparatus according to an embodiment of the present invention.

FIG. 1 is a block diagram showing the entire arrangement of a facsimile apparatus according to the first embodiment of the present invention. As shown in FIG. 1, a facsimile apparatus 20 of this embodiment comprises a reading unit 1 for reading character information, and the like on an original, a recording unit 2 for storing various kinds of information, an operation unit 3 at which an instruction for realizing a predetermined function in the facsimile apparatus is input, a modem 4 for modulating/demodulating input data to the facsimile apparatus 20 or output data to an external apparatus, and a network control unit (NCU) 5 for performing network control between the facsimile apparatus 20 and an external line network (telephone network) 16.

In this facsimile apparatus 20, a CPU 6 controls the entire facsimile apparatus according to a control program stored in a ROM 7, and control information is stored in a RAM 8. The facsimile apparatus 20 is connected to a personal computer 11 through an external interface 9 and an RS-232C cable 15, and is also connected to another facsimile apparatus 12 having the same arrangement as that of the facsimile apparatus 20 through the telephone network 16 and a telephone line 13.

The operation of the facsimile apparatus of this embodiment will be described below.

When information transmission from a character file 14 for storing remote commands through the personal computer 11 is instructed at the operation unit 3 shown in FIG. 1, the CPU 6 executes predetermined processing according to the control program stored in the ROM 7. More specifically, the CPU 6 sends a file read command to the personal computer 11 via the external interface 9 and the RS-232C cable 15, thereby reading out the character file 14 of the personal computer 11. The CPU 6 writes information received through the RS-232C cable 15 and the external interface 9 in a file memory 10 like in the command transmission state.

Assume that the CPU 6 enables the NCU 5 to perform call generation processing to the telephone network 16 via the telephone line 13, and calls the facsimile apparatus 12.

When the CPU 6 confirms a response from the facsimile apparatus 12, it reads out a predetermined communication control program stored in the ROM 7, and executes corresponding processing.

Figure 2:
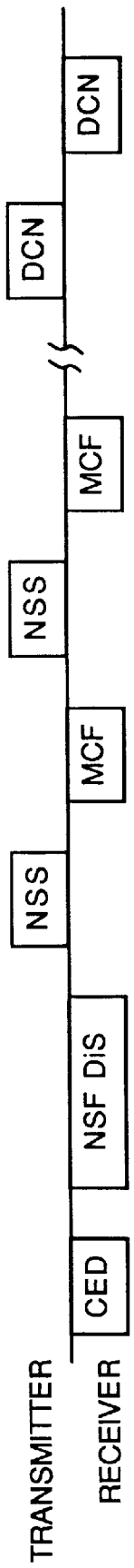
FIG. 2 is a view showing a communication protocol executed by a communication control program according to the first embodiment.

FIG. 2 shows a communication protocol executed by the communication control program. In this case, a communication is executed while branching from the flow of the CCITT recommendation T.30 to a specific flow. More specifically, since the flow of the CCITT recommendation T.30 includes no remote command transmission function, the T.30 flow is expanded to a specific procedure. In this embodiment, only the expanded portion will be described below. In this flow, symbols (abbreviation) of control signals attached to nodes have the same meanings as those in the CCITT recommendation T.30.

The remote command transmission function in the facsimile apparatus according to this embodiment will be described below.

It should be noted that flowcharts beginning with nodes B, C, D, R and T are the same as those shown in CCITT Recommendation T.30, and not shown in this specification.

Figure 4:
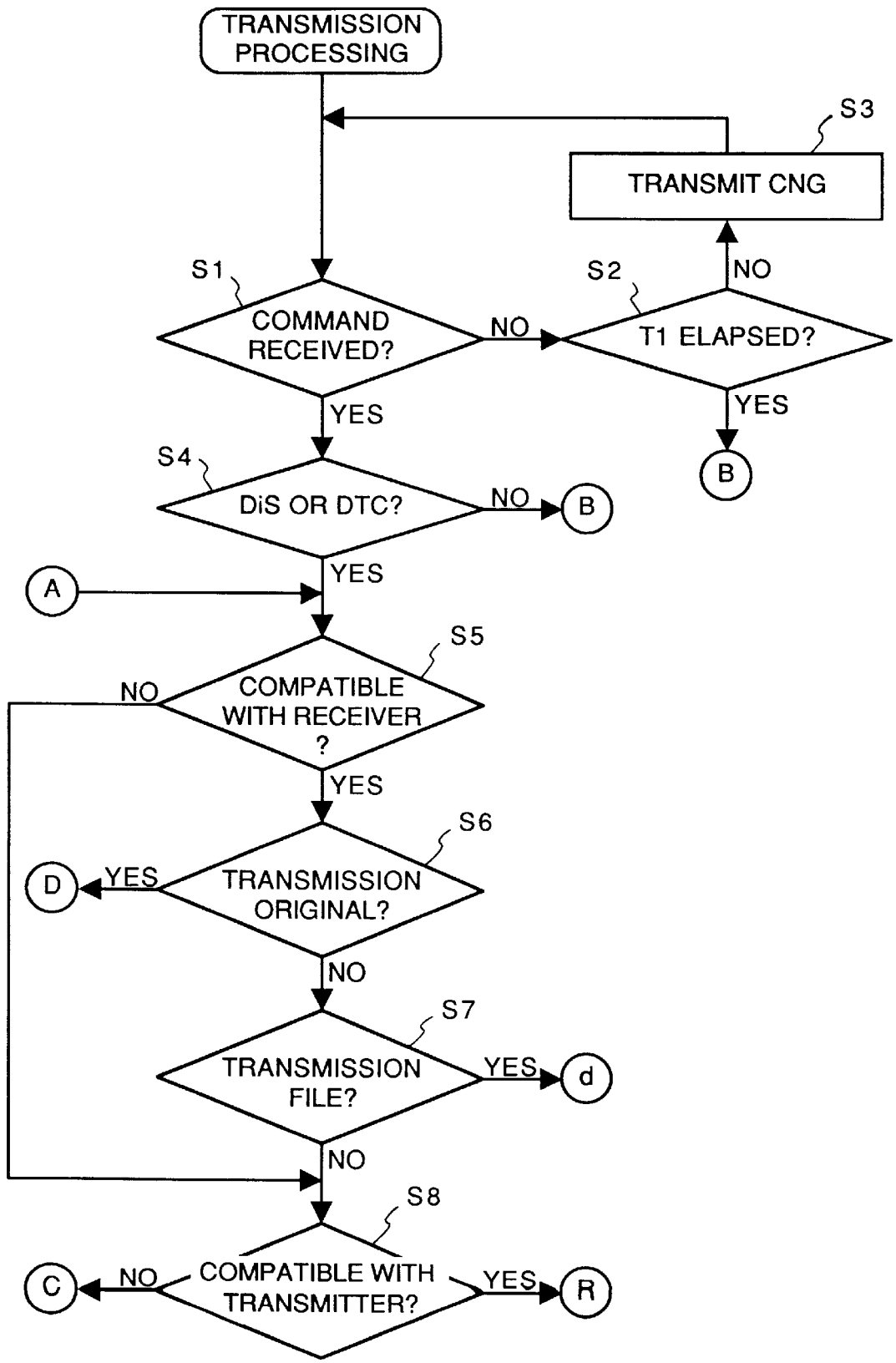
FIGS. 4 and 5 are flow charts showing transmission processing in the facsimile apparatus of the first embodiment.
Figure 8:
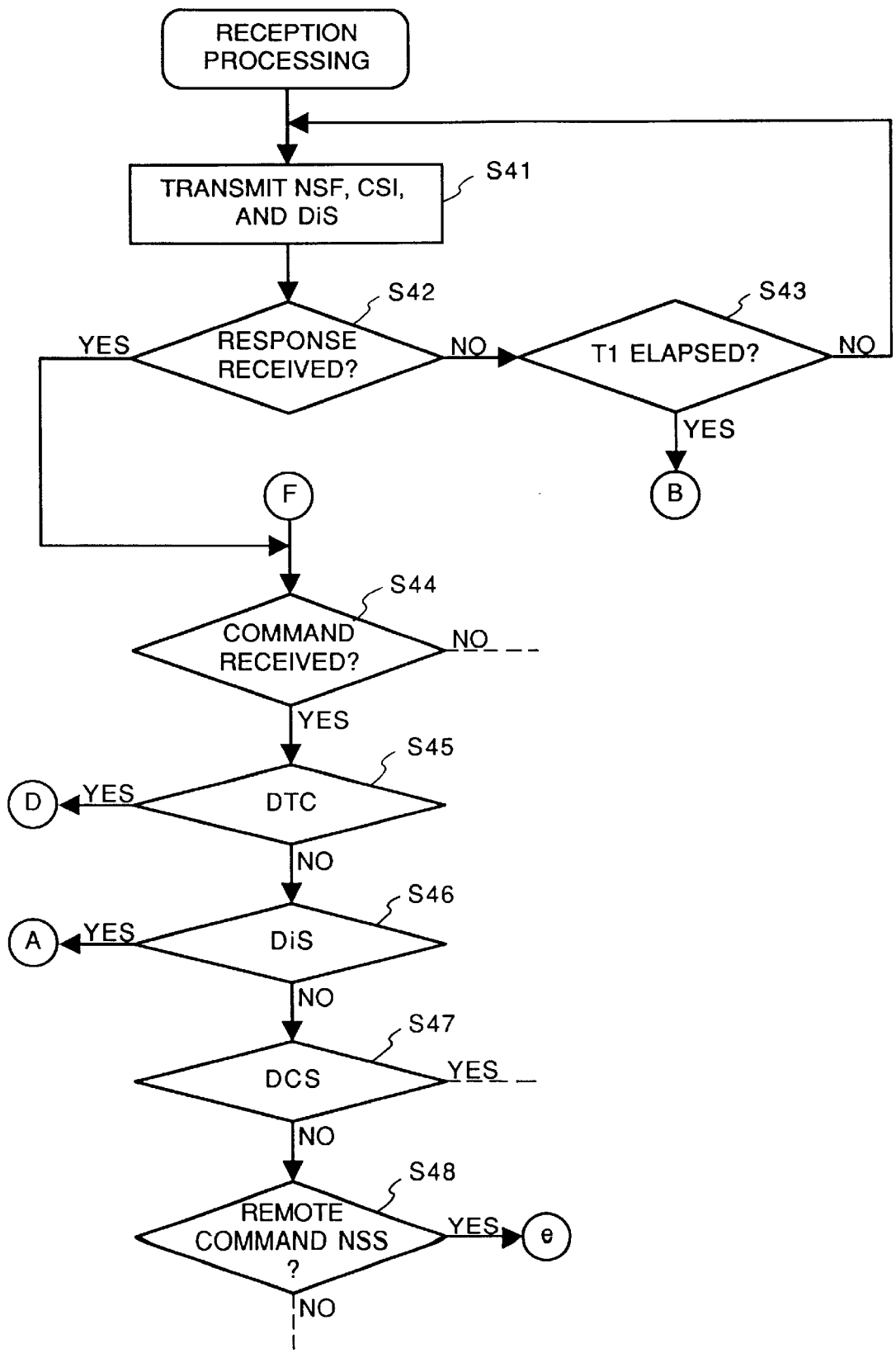
FIG. 8 and FIGS. 9A and 9B are flow charts showing remote command reception processing in the facsimile apparatus of the first embodiment.

Briefly, in a flowchart beginning with node B, a transmission line is disconnected without sending DCN; with node C, a transmission line is disconnected by sending DCN; with node D, transmission of image is executed; with node R, "RECEPTION PROCESSING" is performed as shown in FIG. 8; and with node T, "TRANSMISSION PROCESSING" is performed as shown in FIG. 4.

Figure 5:
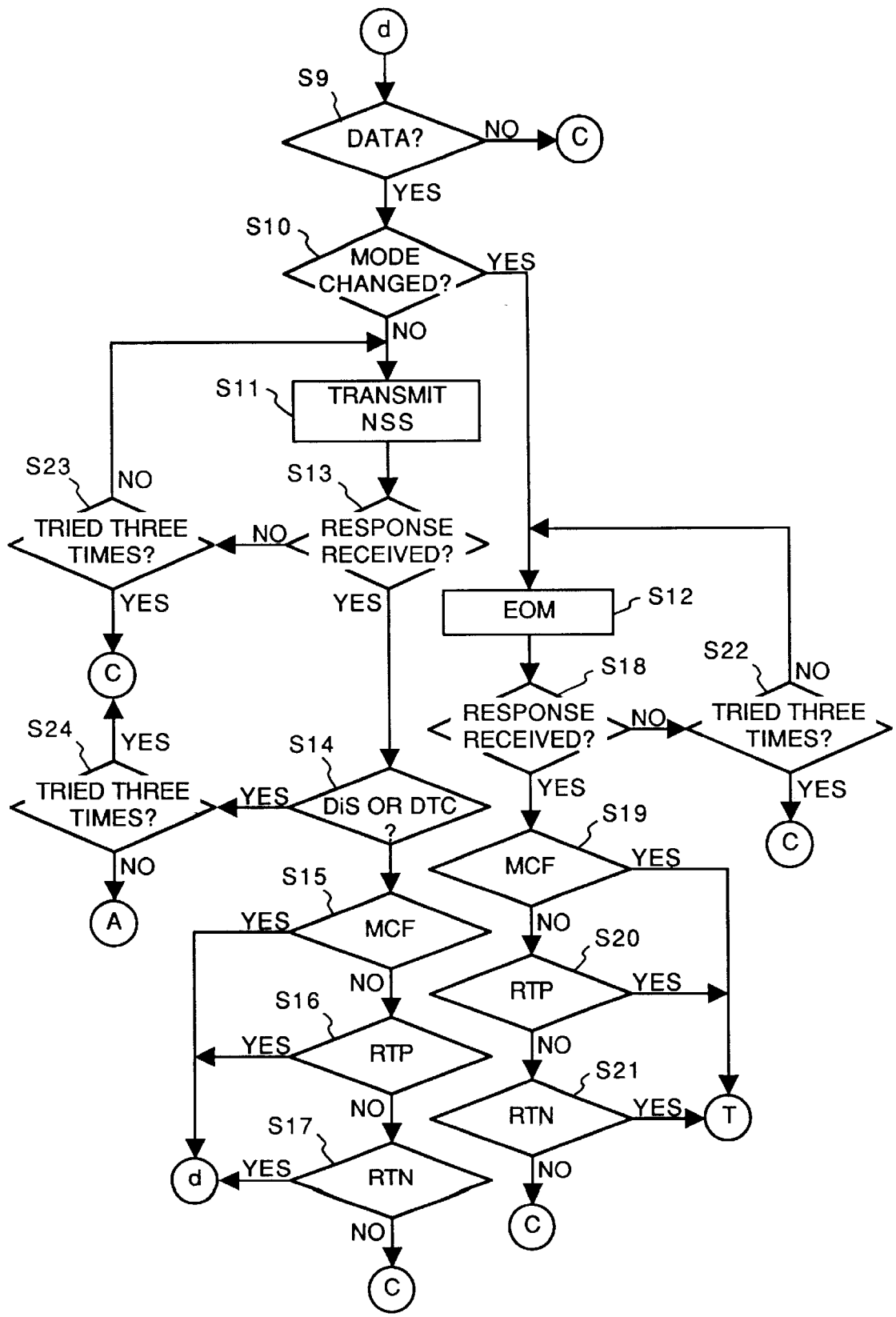

FIGS. 4 and 5 are flow charts showing a T.30 expanded flow of the transmission processing in the facsimile processing of this embodiment. In FIG. 4, it is checked in step S1 if a command is received. If NO in step S1, it is checked in step S2 if a predetermined period time has elapsed. If NO in step S2, ringing tone (CNG) information is generated in step S3. However, if YES in step S1, a DIS or DTC signal is checked in step S4. If YES in step S4, compatibility with a facsimile apparatus on the other end of a line is checked in step S5.

In step S6, the presence/absence of a transmission original is checked. If NO in step S6 (YES is determined in a normal procedure), the presence of a remote command transmission file is determined in step S7. Then, the control enters a file transfer procedure in node d.

When the control advances to node d in FIG. 5, the presence/absence of a command or data in a file is checked in step S9. If no command nor data is detected, the flow advances to node C. In node C, a DCN as a line disconnection command is transmitted, and the line is disconnected. On the other hand, if a remote command or data is detected, a file transfer mode of a remote command is checked in step S10. If the mode is not changed, the remote command or file data is stored in an NSS signal indicating a non-standard device setting function, and the NSS signal is transmitted in step S11.

If a response signal is received in step S13, if it is determined in step S14 that the response signal is neither a DIS signal nor a DTC signal, and if an MCF/RTP/RTN signal is confirmed in step S15, S16, or S17, the flow returns to node d again, and a file transfer operation is subsequently executed. However, if YES in step S14, i.e., if the response signal is a DIS or DTC signal, the flow advances to step S24. If it is determined in step S24 that an MCF/RTP/RTN signal cannot be received after three trials like in the normal T.30 procedure, the flow advances to node C.

On the other hand, if it is determined in step S10 that the file transfer mode of, e.g., the remote command is changed, an EOM as an end of message is sent in step S12. It is then checked in step S18 if a response signal is received. In each of steps S19 to S21, it is checked if an MCF/RTP/RTN signal is received.

Figure 3A:
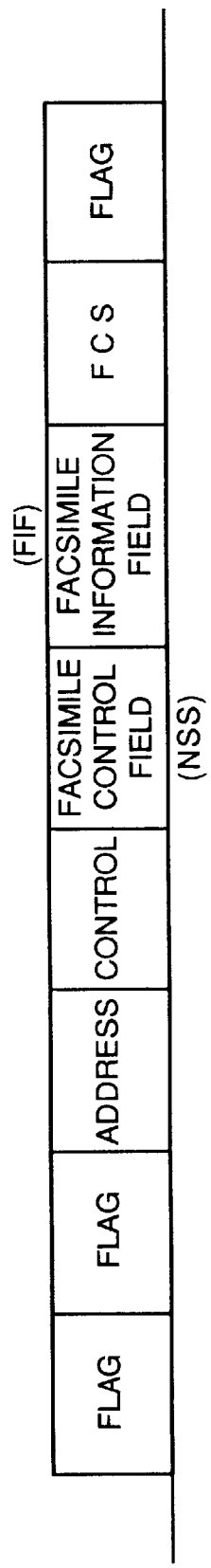
FIGS. 3A and 3B show frame formats of control signals in the facsimile apparatus according to the first embodiment.
Figure 3B:
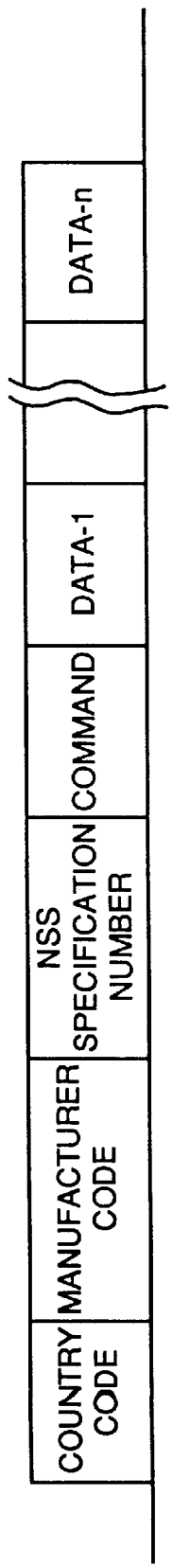

FIGS. 3A and 3B show frame formats of control signals in the facsimile apparatus of this embodiment. FIG. 3A shows the format of a control frame having a facsimile information field, and FIG. 3B shows the frame format of an NSS signal.

In this facsimile apparatus, a remote command or character file data in the file memory is read out character by character from the file memory under the control of the communication control program, and is transmitted using the NSS signal at 300 bps in the communication format shown in FIGS. 3A and 3B.

After the flow branches to the specific procedure for file transfer, a remote command or file data is set in an NSS signal and transmitted.

Figure 6A:
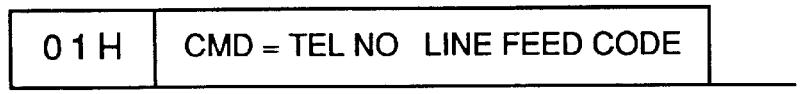
FIGS. 6A, 6B, and 6C are views showing remote commands transmitted in an NSS signal.
Figure 6B:

FIG. 6A shows a remote command to be transmitted using the NSS signal, and FIG. 6B shows a file transfer command. These commands are transmitted while being stored in a command data portion of the NSS signal. More specifically, $01_H$ (H indicates hexadecimal notation) indicates that the remote command or file transfer command is transferred, and thereafter, the remote command or data to be transferred is stored.

Figure 6C:
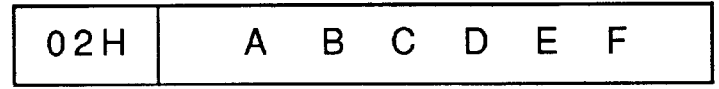

FIG. 6C shows file transfer data to be transmitted using the NSS signal. The data is transmitted while being stored in the command data portion of the NSS signal. More specifically, $02_H$ indicates the file transfer data, and thereafter, data to be transferred is stored.

Figure 7:
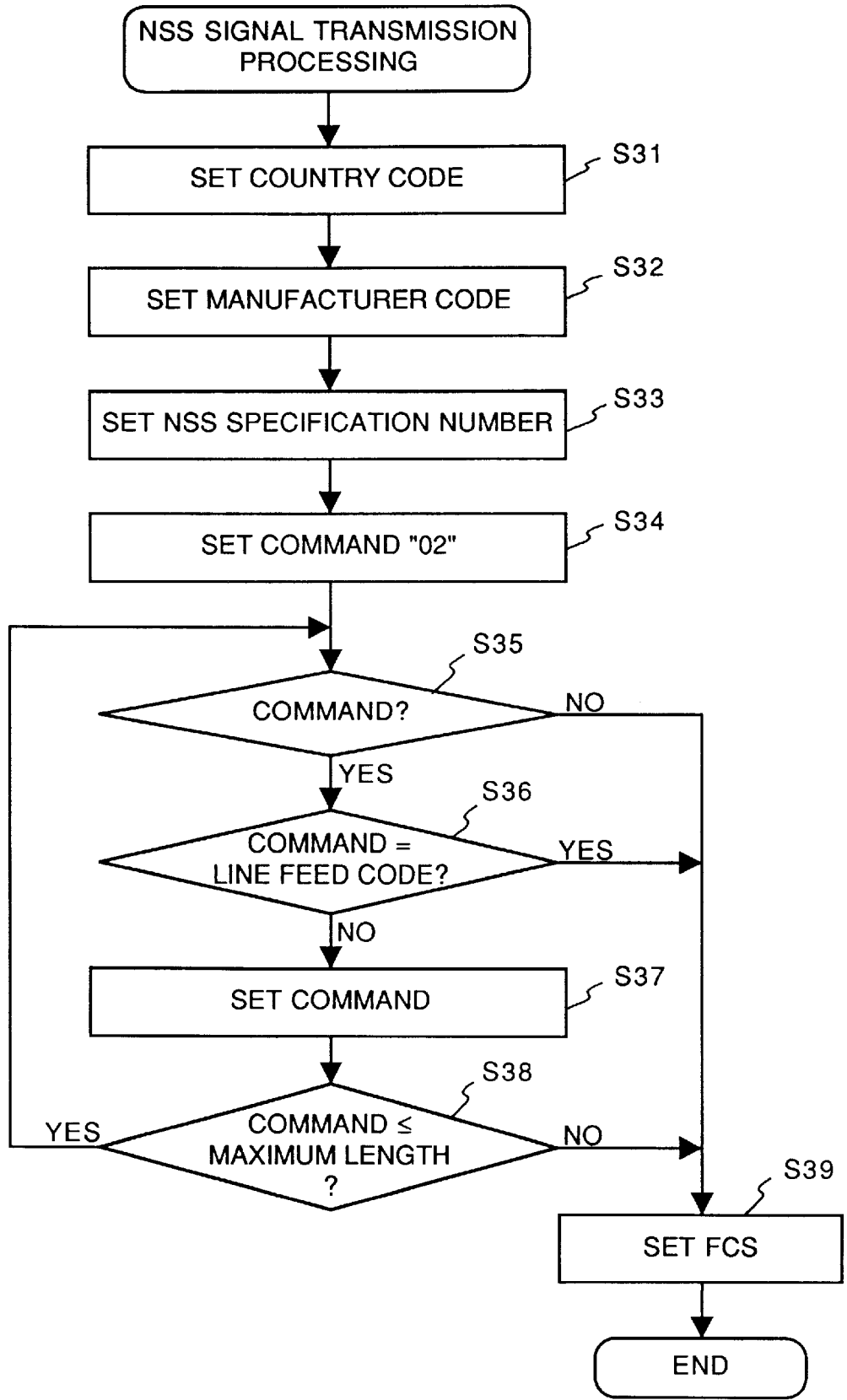
FIG. 7 is a flow chart showing a processing sequence when remote commands are read out from a file memory in a transmitting facsimile apparatus.

FIG. 7 is a flow chart showing a processing sequence executed when a remote command or data is read out from the file memory in the transmitting facsimile apparatus. In FIG. 7, in step S31, a country code is set. In step S32, a manufacturer code is set. In step S33, a specification number of the NSS signal is set. In step S34, a command "02" is set.

In step S35, the presence/absence of a remote command or transmission data is checked. If YES in step S35, it is checked in step S36 if the command or data is a line feed code. If NO in step S36, the command or data is set in step S37. In step S38, it is checked if the length of the set command or data is equal to or smaller than a maximum length. If YES in step S38, the flow returns to step S35.

If no command or data is detected in step S35, if a line feed code is detected in step S36, or if it is determined in step S38 that the command length or data length is larger than the maximum length, the flow advances to step S39 to set FCS, thus ending transmission of the NSS signal. The control then waits for a response signal from the facsimile apparatus 12 on the other end of the line.

Upon detection of the end of the NSS signal from the transmitter, the facsimile apparatus 12 (receiver) extracts the remote command or data from an FIF field in the NSS signal, and executes predetermined processing. Thereafter, the facsimile apparatus 12 sends an MCF signal for requesting the transmitter to send the next command or data.

Remote command reception processing in the facsimile apparatus of this embodiment will be described below with reference to the T.30 expanded flows shown in FIG. 8 and FIGS. 9A and 9B.

In step S41 in FIG. 8, NSF, CSI, and DIS signals are transmitted, and it is checked in step S42 if a response to these signals is received. If NO in step S42, it is checked in step S43 if a predetermined period of time has elapsed. However, if YES in step S42, it is checked in step S44 if a command is received, and it is then checked in each of steps S45 to S47 if a command signal DTC, DIS, or DCS is received.

In step S48, it is checked if the received command is an NSS signal including a remote command or file transfer command in addition to the normal procedure signals. If YES in step S48, node e is executed.

Figure 9A:
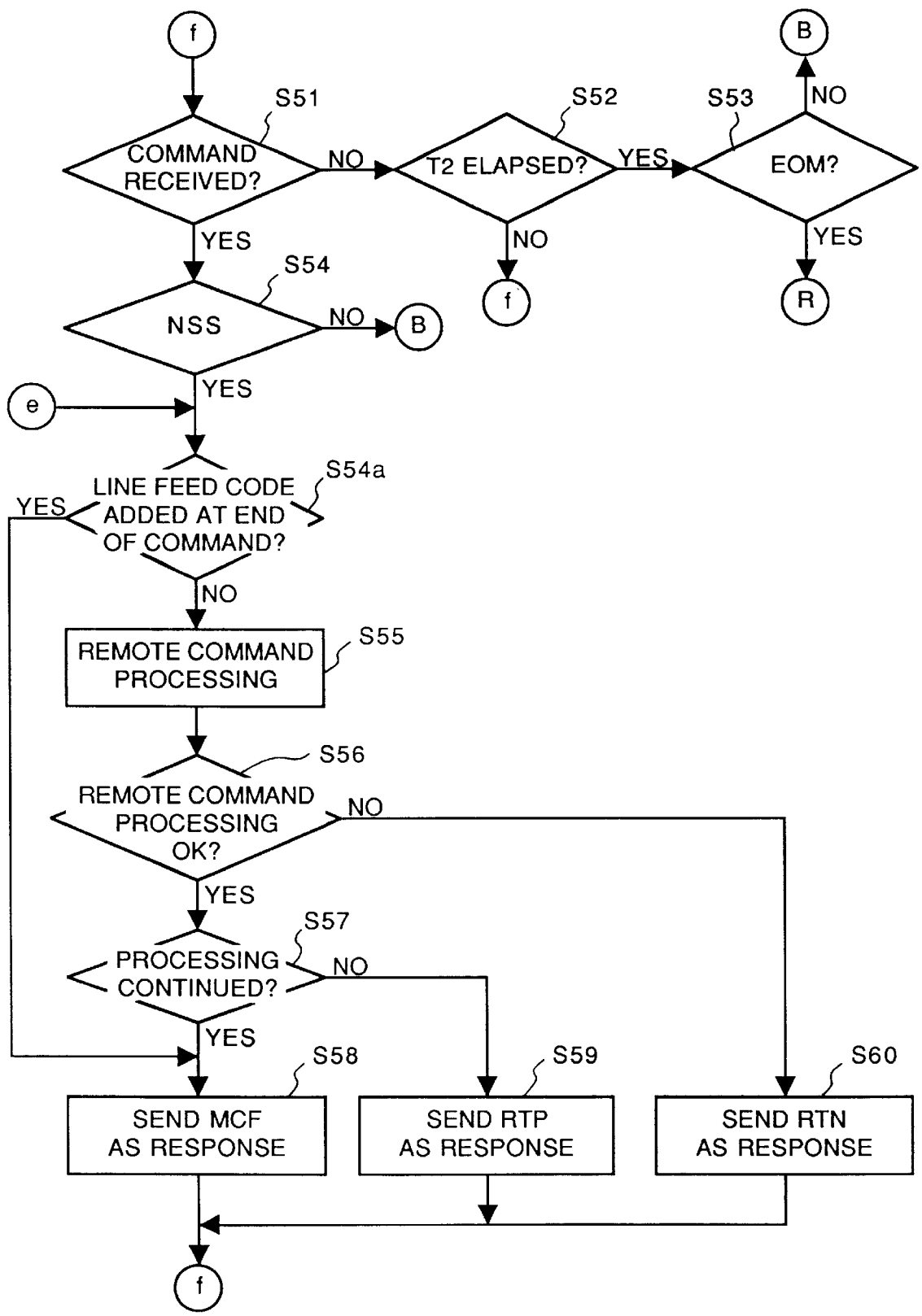

In node f shown in FIG. 9A, it is checked in step S51 if a command is received. If it is determined in step S54 that an NSS signal including a remote command is received, it is checked in step S54a if a line feed code is attached to the end of the remote command. In step S55, the remote command is stored in a file. In step S56, it is checked if the remote command can be normally processed. If NO in step S56, an RTN signal is sent back as a response signal in step S60, and the flow returns to node f.

Figure 9B:
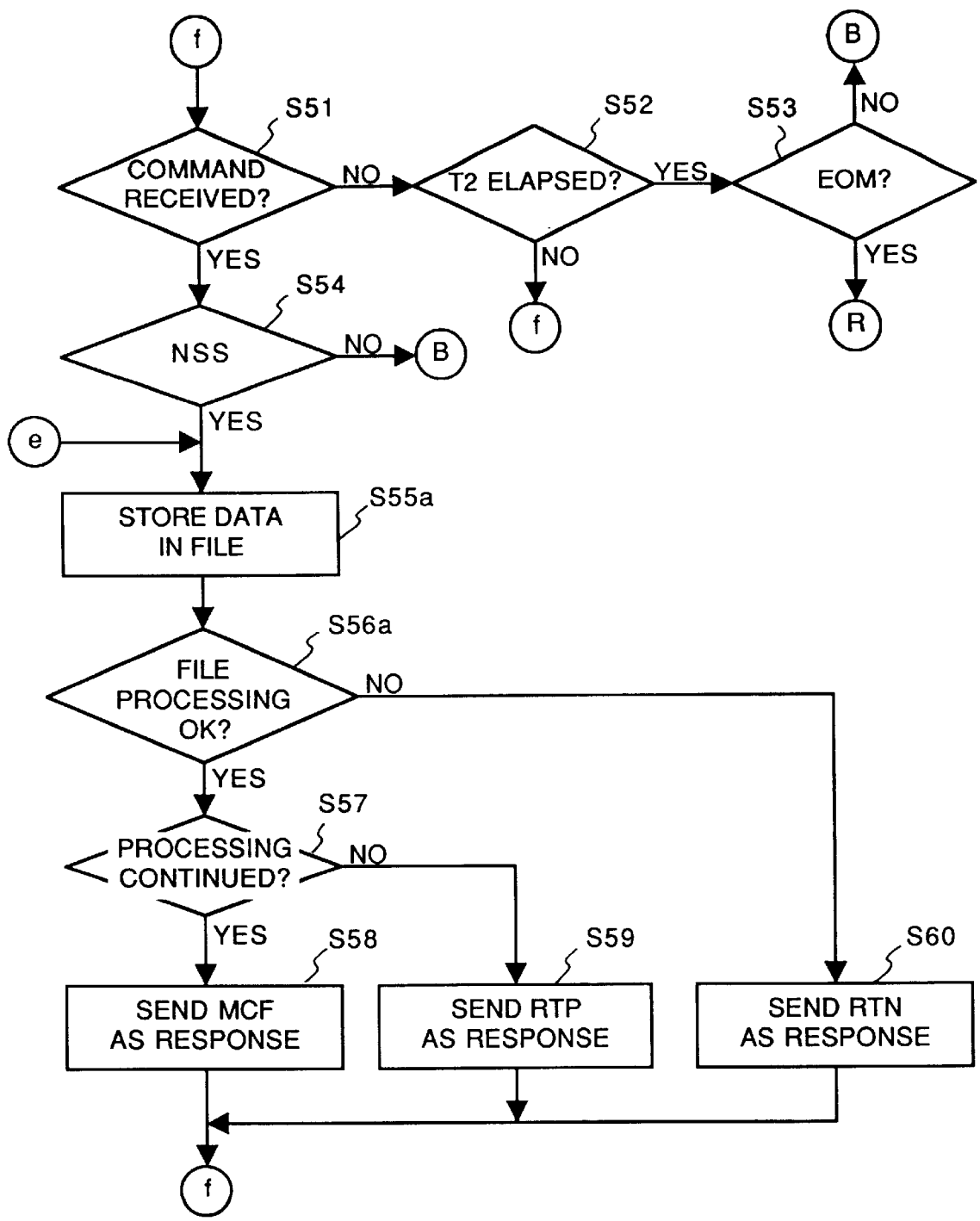

When this flow processes a character file, it is checked in step S51 in node f shown in FIG. 9B if a command is received. If it is determined in step S54 that an NSS signal including file transfer data is received, the data is stored in a file in step S55a. In step S56a, it is checked if the file can be normally processed. If NO in step S56a, an RTN signal is sent back as a response signal in step S60, and the flow returns to node f.

However, if it is determined in step S56 or S56a that the remote command or the file can be normally processed, it is checked in step S57 if processing can be continued. If NO in step S57, an RTP signal is sent back as a response signal in step S59, and the flow returns to node f. On the other hand, if the remote command or the file can be normally processed, and the processing can be continued, an MCF signal is sent back as a response signal in step S58, and the flow then returns to node f.

In node f, if it is determined in step S51 that no command is received, and if it is determined in step S52 that a predetermined period of time (a time T2) has elapsed, if an EOM signal can be detected in step S53, the flow advances to node R; otherwise, line disconnection processing in node B is executed. Upon reception of the MCF signal from the facsimile apparatus 12 on the other end of the line, the transmitter subsequently reads out a remote command or data from the file memory, converts it into a packet, and transmits the packet signal.

FIG. 10 shows an example of a remote command. In this case, FIG. 10 shows a case wherein remote commands (groups A and B) in a file are transferred from the transmitter to the receiver. In FIG. 10, using the command in the group A, a telephone number is written in a "telephone number memory" of the facsimile apparatus on the other end of the line. Using the command in the group B, a name is written in a "name memory" of the facsimile apparatus on the other end of the line.

At this time, the command in the group B must be transmitted after it is confirmed that the command in the group A is processed at the receiver side. For this reason, when a line feed code is stored after the group A, processing of the group A at the receiver side can be checked by a response signal at the transmitter side.

In this manner, in data transmission/reception in the facsimile apparatus, when a specific control code indicating the end of a command is input to a remote command in a character file, a specific command can be prevented from being divided in units of fixed lengths regardless of its content, and a transmitting facsimile apparatus can wait for a response signal to the command from a receiving facsimile apparatus.

Since the control code is input, even when transmission of remote commands is terminated halfway as an error, command transmission can be restarted from a portion where a transmitting facsimile apparatus cannot receive a response signal from a receiving facsimile apparatus. Thus, the remote commands need not be retransmitted from the beginning.

Furthermore, an existing communication procedure is expanded, character file data is stored in a control command, and the control command is transmitted to a destination station as a packet signal. In this manner, character file data having a desired data length can be transferred.

[Second Embodiment]

In the first embodiment, a line feed code is used as the control code. Other codes, e.g., an EOF code or a page end code may be used.

As a remote command transmission method, a command may be stored not in an NSS signal but in a facsimile message in the ECM procedure.

A case will be described below wherein a command is stored in a facsimile message in the ECM procedure. Since the arrangement of a facsimile apparatus according to the second embodiment is the same as that of a facsimile apparatus according to the first embodiment, a detailed description thereof will be omitted.

Figure 11:
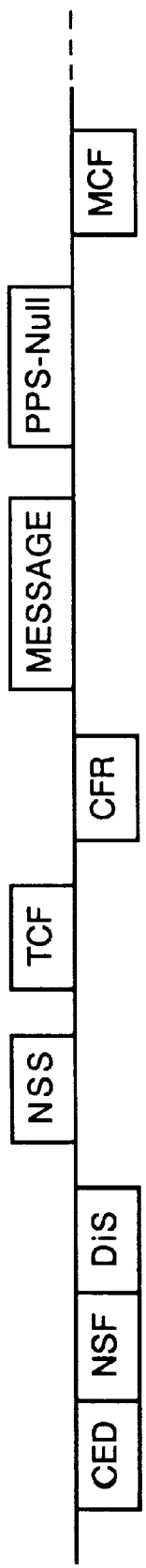
FIG. 11 is a view showing a communication protocol executed by a communication control program according to the second embodiment.

In the facsimile apparatus according to this embodiment, when a facsimile apparatus 12 on the other end of a line responds, a CPU 6 reads out a communication control program stored in a ROM 7, and executes predetermined processing. FIG. 11 shows a communication protocol executed by this communication control program.

In this embodiment, in order to perform a file transfer operation, a communication is executed while branching from the CCITT recommendation T.30 ECM flow to a specific flow. Since the CCITT recommendation T.30 ECM flow includes no remote command transmission function, only a portion expanded to a specific procedure will be described below. In a procedure until a facsimile message is transmitted, the presence/absence of a normal transmission original is checked, and if it is determined that no transmission original is present, the presence/absence of a transmission file need only be checked. In remote command reception processing executed by the facsimile apparatus 12, since a procedure up to message reception need only be performed after it is confirmed that the specific mode is set, a detailed description thereof will be omitted in this embodiment.

Figure 12:
FIG. 12 is a view showing a communication format of a partial page frame in the second embodiment.

In the facsimile apparatus according to this embodiment, a command in a character file in a file memory is read out character by character from the file memory by the communication control program, and is transmitted in a partial page frame of a high-speed modem in a communication format shown in FIG. 12.

Figure 13A:
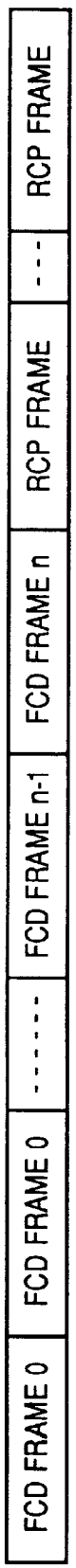
FIGS. 13A, 13B, and 13C are views showing formats of FCD frames in the second embodiment.
Figure 13B:
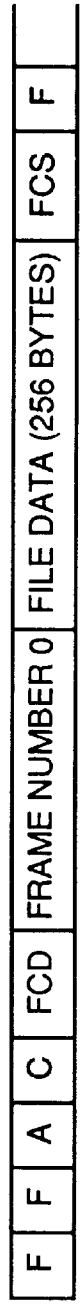
Figure 13C:
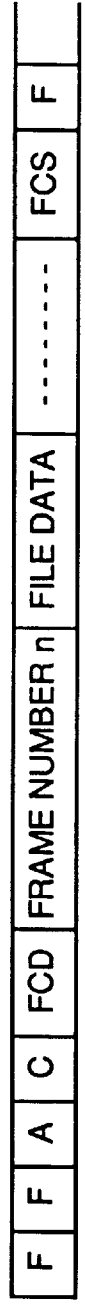

FIGS. 13A to 13C show the format of an FCD frame. FIG. 13A shows the format of the entire frame, FIG. 13B shows the format of the first FCD frame, and FIG. 13C shows the format of an n-th FCD frame. In this embodiment, after the control branches to a specific remote command transmission procedure, a remote command is set in an FIF field of the FCD frame, and the FCD frame is transmitted.

Message transmission processing of this embodiment will be described below.

Figure 14:
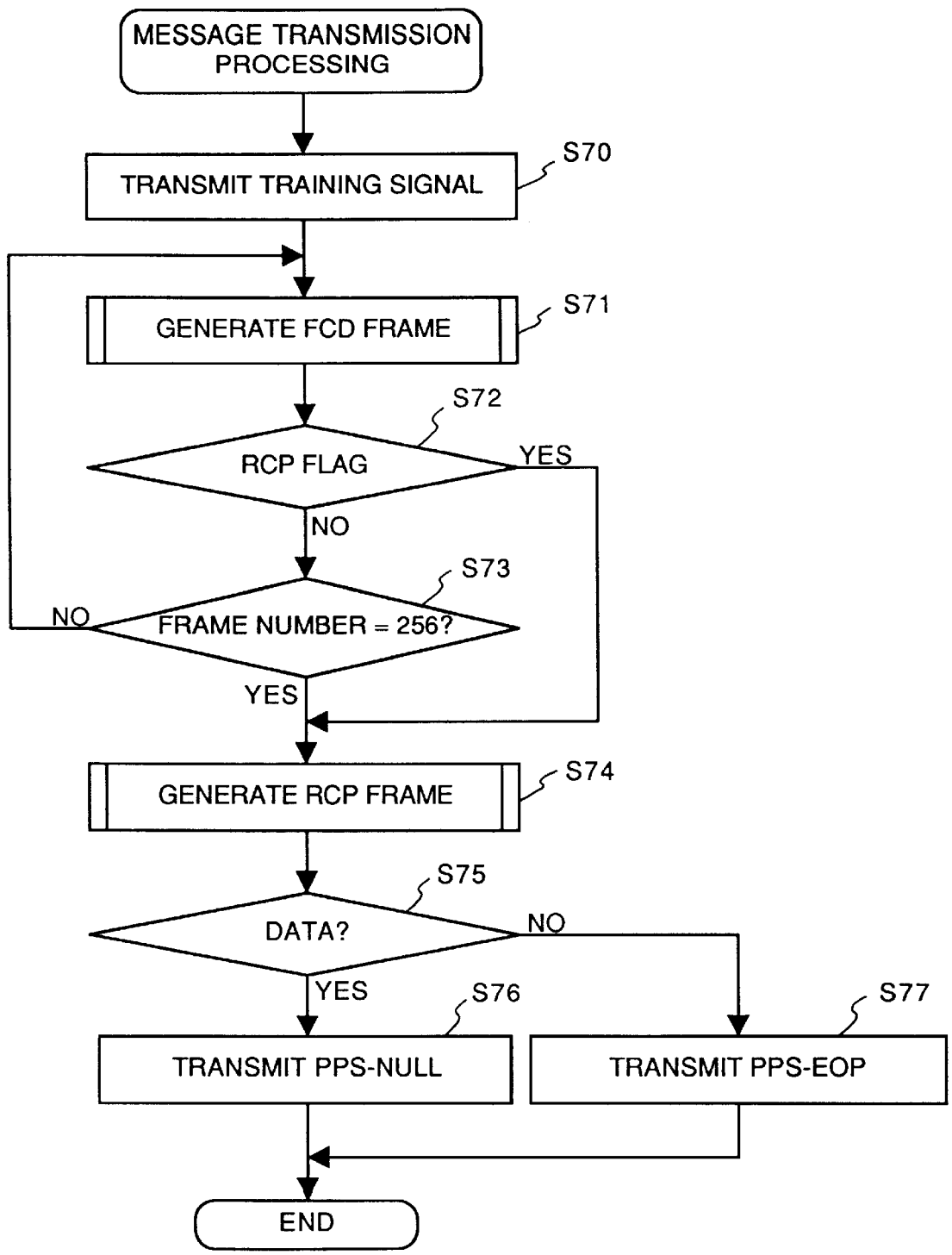
FIG. 14 is a flow chart showing a message transmission processing sequence in the second embodiment.

FIG. 14 is a flow chart showing the message transmission processing sequence of this embodiment. In FIG. 14, in step 70, a training signal is transmitted, and in step S71, an FCD frame is generated and transmitted. In step S72, the set state of an RCP flag is checked, and in step S73, it is checked if the frame number has reached 256.

If it is determined in step S72 that the RCP flag is set or if it is determined in step S73 that the frame number has reached 256, an RCP frame is generated and transmitted in step S74. The presence/absence of data, i.e., the presence/absence of a remote command is checked in step S75. If YES in step S75, the flow advances to step S76 to transmit a PPS-NULL signal. However, if NO in step S75, a PPS-EOP signal is transmitted in step S77.

Figure 15:
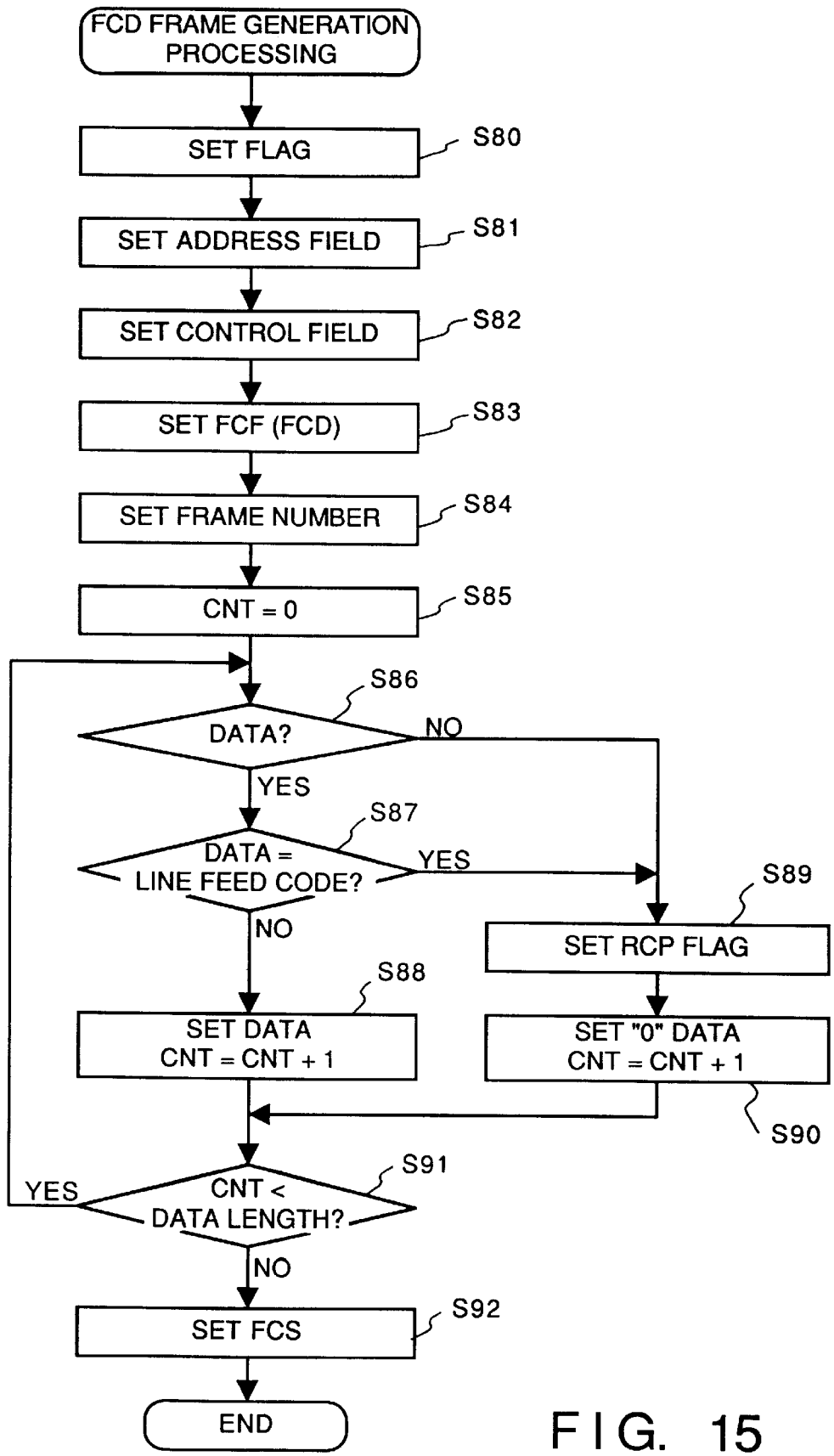
FIG. 15 is a flow chart showing FCD frame generation processing in the second embodiment.

FIG. 15 is a flow chart showing FCD frame generation processing. That is, FIG. 15 shows processing for reading out a remote command from the file memory, and generating an FCD frame in the transmitter. A flag, an address field, a control field, FCF (FCD), and a frame number are set in steps S80 to S84 in FIG. 15, and CNT is set to be "0" in step S85.

In step S86, the presence/absence of data, i.e., a remote command is checked. If YES in step S86, it is checked in step S87 if the command is a line feed code. If NO in step S87, data is set in step S88, and the data length is checked in step S91. In this manner, commands are repetitively set until the remote command length reaches a predetermined length.

However, if no remote command is detected or if the command is a line feed code, an RCP flag is set in step S89, and "0" data is set in step S90. In step S91, the data length is checked. In this manner, "0" data are repetitively set until the remote command length reaches a predetermined length.

In step S92, an FCS command is set, thus ending this processing.

Since the command reception processing in the facsimile apparatus 12 (receiver) is the same as that in the first embodiment shown in FIG. 8 and FIGS. 9A and 9B, a detailed description thereof will be omitted.

In this manner, in this embodiment, a transmitting facsimile apparatus can wait for a response signal to a specific command from a receiving facsimile apparatus like in the first embodiment. In addition, error retransmission can be restarted from a portion where the transmitting facsimile apparatus cannot receive a response signal.

[Third Embodiment]

The third embodiment according to the present invention will be described below. Since the arrangement a facsimile apparatus according to this embodiment is the same as that of the first embodiment, an illustration and a description thereof will be omitted. In the facsimile apparatus according to this embodiment, a data file is used in place of a character file.

Figure 16:
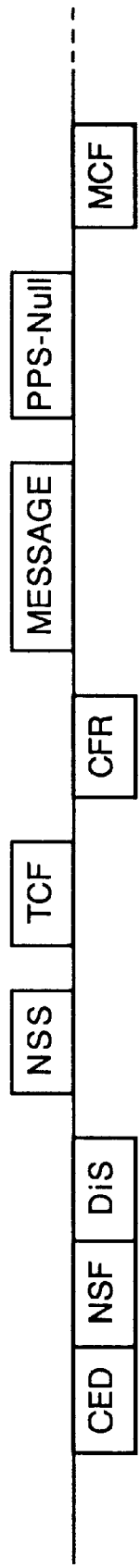
FIG. 16 is a view showing a communication protocol executed by a communication control program of a facsimile apparatus according to the third embodiment.

FIG. 16 shows a communication protocol executed by a communication control program of the facsimile apparatus according to this embodiment. In this case, in order to perform a file transfer operation, a communication is executed while branching from the CCITT recommendation T.30 ECM flow to a specific flow. Since the CCITT recommendation T.30 ECM flow includes no remote command transmission function, the T.30 flow is expanded to a specific procedure.

Figure 17:
FIG. 17 is a view showing a communication format according to the third embodiment.

In the facsimile apparatus of this embodiment, a command in a data file in a file memory is read out from the file memory in predetermined units by the communication control program, and is transmitted in a partial page frame of a high-speed modem in a communication format shown in FIG. 17. The control branches to a specific file transfer procedure to set file data in an FIF field of an FCD frame, and the FCD frame is transmitted.

The format of the FCD frame is the same as that shown in FIGS. 13A, 13B, and 13C.

Message transmission processing and FCD frame generation processing in the facsimile apparatus of this embodiment are the same as those of the second embodiment shown in FIGS. 14 and 15.

Since file reception processing in the facsimile apparatus of this embodiment is the same as the T.30 expanded flow shown in FIGS. 8 and 9B, it will be described below with reference to FIGS. 8 and 9B.

In file reception processing in a facsimile apparatus 12 (receiver) on the other end of a line, a received file is stored in the file memory in place of outputting of image information in a normal facsimile communication.

More specifically, in step S41 in FIG. 8, NSF, CSI, and DIS signals are transmitted, and it is checked in step S42 if a response to these signals is received. If NO in step S42, it is checked in step S43 if a predetermined period of time has elapsed. However, if YES in step S42, it is checked in step S44 if a command is received, and it is then checked in each of steps S45 to S47 if a command signal DTC, DIS, or DCS is received.

In this case, in step S48 in the first embodiment, it is checked if the received command is an NSS signal including a remote command. However, in this embodiment, it is checked if the received command is an NSS signal including a file transfer command in addition to the normal procedure signals. If YES in step S48, node e is executed.

More specifically, in node f (FIG. 9B), it is checked in step S51 in node f if a command is received. If it is determined in step S54 that an NSS signal including file transfer data is received, the data is stored in a file in step S55a. In step S56a, it is checked if the file can be normally processed. If NO in step S56a, an RTN signal is sent back as a response signal in step S60, and the flow returns to node f.

However, if it is determined in step S56a that the file can be normally processed, it is checked in step S57 if processing can be continued. If NO in step S57, an RTP signal is sent back as a response signal in step S59, and the flow returns to node f. On the other hand, if the file can be normally processed, and the processing can be continued, an MCF signal is sent back as a response signal in step S58, and the flow then returns to node f.

In node f, if it is determined in step S51 that no command is received, and if it is determined in step S52 that a predetermined period of time (a time T2) has elapsed, if an EOM signal can be detected in step S53, the flow advances to node R; otherwise, line disconnection processing in node B is executed.

In this manner, when an existing communication procedure is expanded to a specific file transfer procedure, file data can be transferred in a packet to a destination station.

<Fourth Embodiment>

FIG. 18 is a diagram showing an arrangement of a facsimile apparatus according to the fourth embodiment of the present invention. In FIG. 18, reference numeral 51 denotes a PC (personal computer), at which an operator performs, e.g., a data input operation, and which controls the entire system. An operator inputs data according to screen data, as shown in FIG. 19.

The PC 51 generates a command file for a remote registration mode using the input data, and transfers it to a communication adapter 52.

The communication adapter 52 transmits the command file received from the PC to a terminal. In this embodiment, a facsimile apparatus comprising an RS-232C interface (I/F) for the PC is used as the communication adapter 52.

A terminal facsimile apparatus 53 includes at least one terminal facsimile apparatus connected to a public network 54. The terminal facsimile apparatus 53 receives commands sent from the communication adapter, and performs, e.g., read/write operations of a memory according to the commands.

Figure 23A:
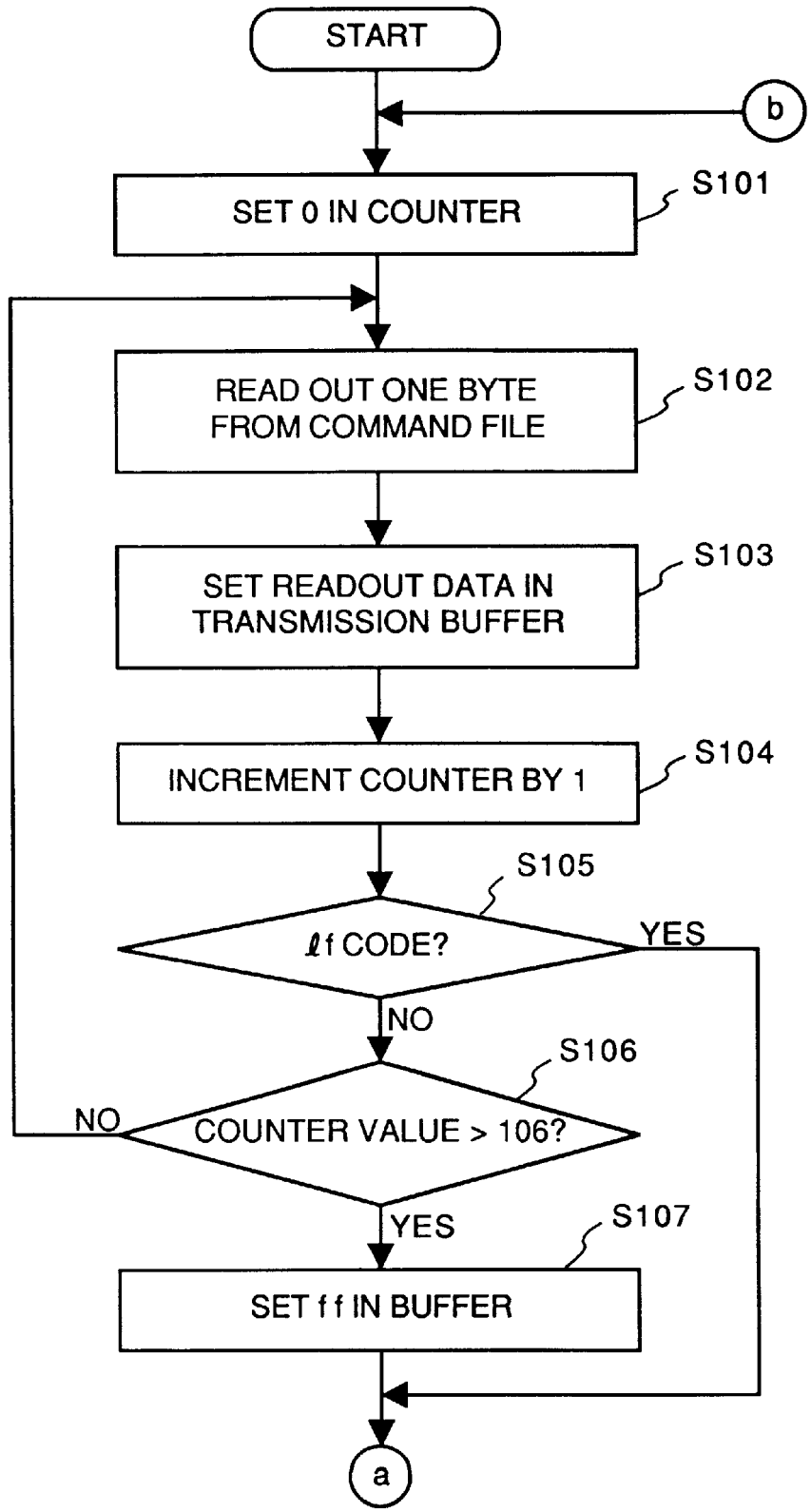
FIGS. 23A and 23B are flow charts showing an operation of the apparatus according to the fourth embodiment.
Figure 23B:
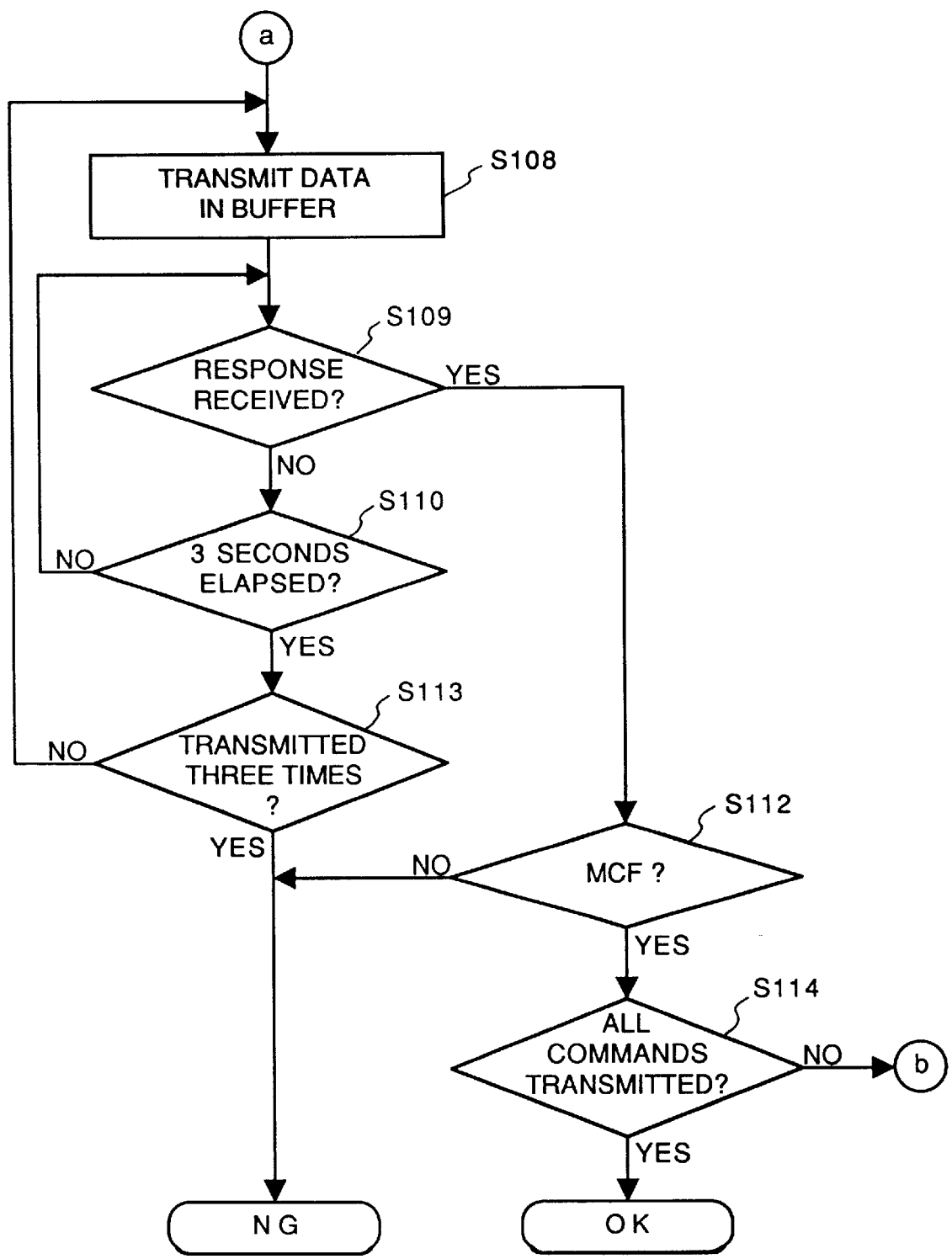

The operation of the facsimile apparatus according to the fourth embodiment of the present invention will be described below with reference to the flow charts shown in FIGS. 23A and 23B.

An operator inputs, e.g., a user telephone number according to a menu displayed on the screen of the PC, as shown in FIG. 19.

The PC analyzes the input data, and converts the data into remote registration commands to generate a command file to be transmitted (see FIG. 20).

This command file is an ASCII file, and each command is constituted by adding data input by the operator after a command ID (two characters) defined for each registration item.

The end of data is expressed by cr code+lf code (ODH, 0AH).

When all the data input by a user are converted into the command file, the PC transfers the generated command file to the communication adapter.

In this embodiment, this transfer operation is performed using the RS-232C I/F. However, other high-speed I/Fs such as an SCSI I/F may be used.

The communication adapter is of a model prepared by adding a software program for the present invention to a facsimile apparatus comprising the RS-232C I/F. The communication adapter stores the command file received through the RS-232C I/F in a memory, and then generates a call to a target facsimile apparatus to be subjected to registrations.

Figure 22:
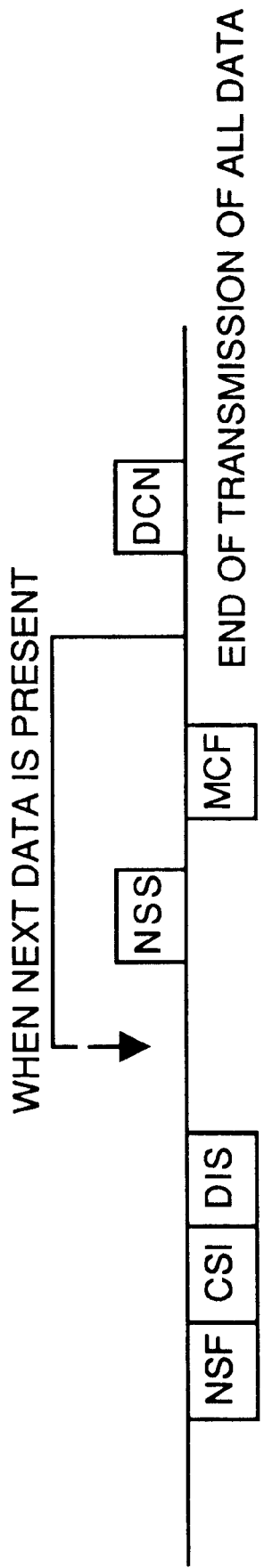
FIG. 22 is a chart showing a communication protocol according to the fourth embodiment.

As shown in FIG. 22, upon reception of a calling signal (CI) from the circuit, the terminal facsimile apparatus closes the circuit, sends a CED signal, and then sends NSF, CSI, and DIS signals.

In this NSF (non-standard function) signal, the terminal facsimile apparatus states that it has a function of accepting the remote registrations.

After the communication adapter confirms the statement indicating the presence of the remote registration function in the NSF signal, it sets a remote registration command in an NSS (non-standard function setting) signal, and transmits the NSS signal.

Upon reception of the remote registration command, the terminal facsimile apparatus performs a registration according to the received command. When the registration is normally ended, the terminal facsimile apparatus sends back an MCF signal as a positive response; otherwise, it sends back an RTN signal.

After the communication adapter confirms the MCF signal, if commands to be transmitted still remain, the communication adapter sets the commands in the NSS signal and transmits the NSS signal again. After all the commands are transmitted, the communication adapter sends a DCN signal to end the communication.

A communication operation between the communication adapter and the terminal facsimile apparatus in the remote registration operation will be described below with reference to the flow charts shown in FIGS. 23A and 23B.

As described above, a command to be used in the remote registration operation is set in a frame in the HDLC frame, and is transmitted.

In the HDLC format, as shown in FIGS. 21A to 21D, a portion between one flag (7EH) and another flag is processed as a frame, and the frame is divided into an address field, a control field, an FCF field, an FIF field, and an FCS field. These fields except for the FIF field are those having fixed lengths.

Since the maximum length of one frame is determined to fall within 3 seconds in the CCITT recommendation, it is 3 (seconds)×300 (bits)÷8=112 bytes at 300 bps.

Since this frame includes the address field (1 byte), the control field (1 byte), the FCF field (1 byte), and the FCS field (2 bytes), the limit length of the FIF field for storing commands is 107 bytes.

More specifically, in this embodiment, the frame is divided, so that commands stored in the frame do not exceed 107 bytes, and a code indicating division is added to the divided frames.

Prior to a communication, the communication adapter clears a counter representing the number of bytes set in the frame to "0" in step S101.

The communication adapter reads out a command file received from the PC and stored in the memory from the beginning in step S102, and sequentially sets the readout file in a transmission buffer in step S103. In step S104, the communication adapter increments the counter by "1".

When the communication adapter finds a cr code+lf code (ODH, 0AH) indicating the end in the readout data, it sets the readout data up to the lf code (0AH) in the transmission buffer, and transmits the data in the transmission buffer.

When the length of the commands to be transmitted exceeds 107 bytes, the communication adapter automatically inserts a code indicating continuation when the content of the counter reaches 106, and it transmits the data obtained so far (steps S107 and S108).

In this embodiment, the code indicating continuation is an ff code (0CH).

Since the trailing end of the received frame terminates with an ff code, the receiving apparatus recognizes a continuous frame, holds the received data, and sends back an MCF signal.

Upon reception of the MCF signal, the communication adapter reads out the remaining command from the command file, sets the readout command in the transmission buffer, and transmits the command.

In this case, the counter is incremented while setting commands, and when the counter value reaches 106, an ff code is similarly inserted to indicate a continuous frame.

In this manner, the transmission operation is continued, and when a cr code+lf code are found, data up to the lf code are transmitted (steps S112 and S114).

Upon reception of an ff code, the receiving apparatus holds data, and adds the next frame to the end of the previously held data.

Upon reception of a frame which terminates with a cr code+lf code, the receiving apparatus executes the received data from the beginning, and sends back a negative or positive response.

In this embodiment, when data cannot be normally transmitted due to a factor such as noise in the frame transmission operation, the receiving apparatus compares data in the FCS field and a value calculated based on data in the received frame so as to detect an error. The calculation method of data in the FCS field complies with the CCITT recommendation T.30/5.3.7.

Upon detection of an error, the receiving apparatus abandons the received frame, and does not send back any response. When no significant response can be obtained for a command, the transmitting apparatus re-sends the same information after an elapse of 3 seconds. Thus, the receiving apparatus waits for the re-sent information to continue reception.

Therefore, when a communication error occurs, a frame terminated as an error can re-sent 3 seconds later. Thus, the transmission time can be prevented from being wasted unlike when a large amount of data are transmitted without being divided, no significant response is sent back after the transmission time of several tens of minutes, and re-transmission is performed another several tens of minutes.

Re-transmission is performed up to twice. That is, when no significant response can be obtained in three transmission operations including the first transmission operation, the transmitting apparatus stops a communication, sends a DCN signal, and releases the circuit.

<First Modification>

The first modification of the fourth embodiment of the present invention will be described below.

In the fourth embodiment, the frame having a maximum length of 3 seconds can be divided while paying attention to the number of bytes by calculating the number of bytes that can be transmitted within 3 seconds. In this modification, the frame is divided while paying attention directly to the transmission time of the frame.

This modification is constituted by the PC, the communication adapter, and the terminal facsimile apparatus, as shown in FIG. 18, as in the fourth embodiment.

The operation of this modification is the same as that in the fourth embodiment. That is, when an operator inputs data according to a menu shown in FIG. 19, the PC analyzes input data to generate a command file (FIG. 20), and transfers the command file to the communication adapter.

When the communication adapter stores the received command file in its internal memory, it calls the terminal facsimile, and transmits the content of the command file. The terminal facsimile executes remote registrations according to the sent commands, and transmits an MCF or RTN signal depending on the execution result. Commands, a protocol, and the like to be used are the same as those in the fourth embodiment.

Figure 24A:
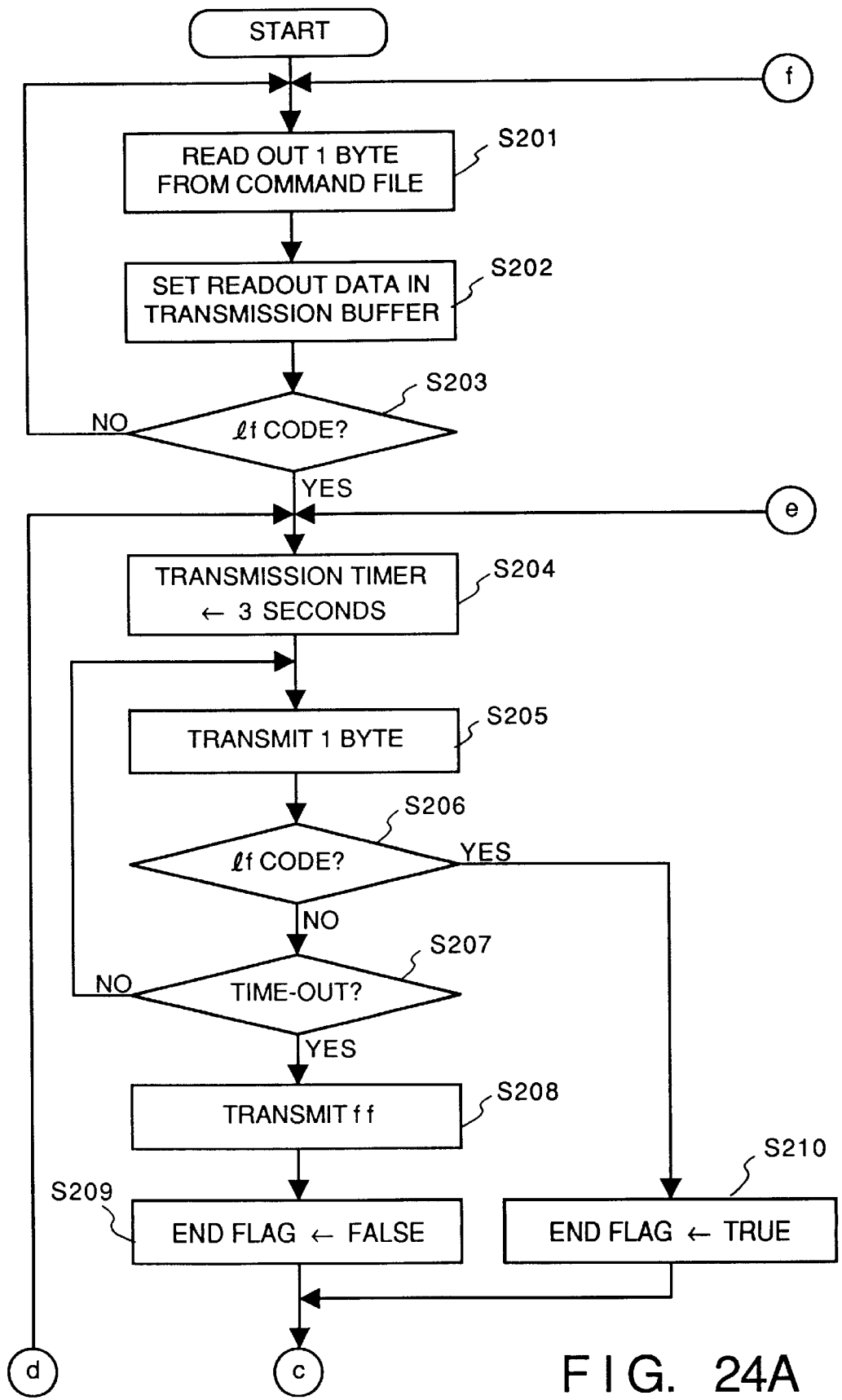
FIGS. 24A and 24B are flow charts showing an operation of the apparatus according to the first modification of the fourth embodiment.
Figure 24B:
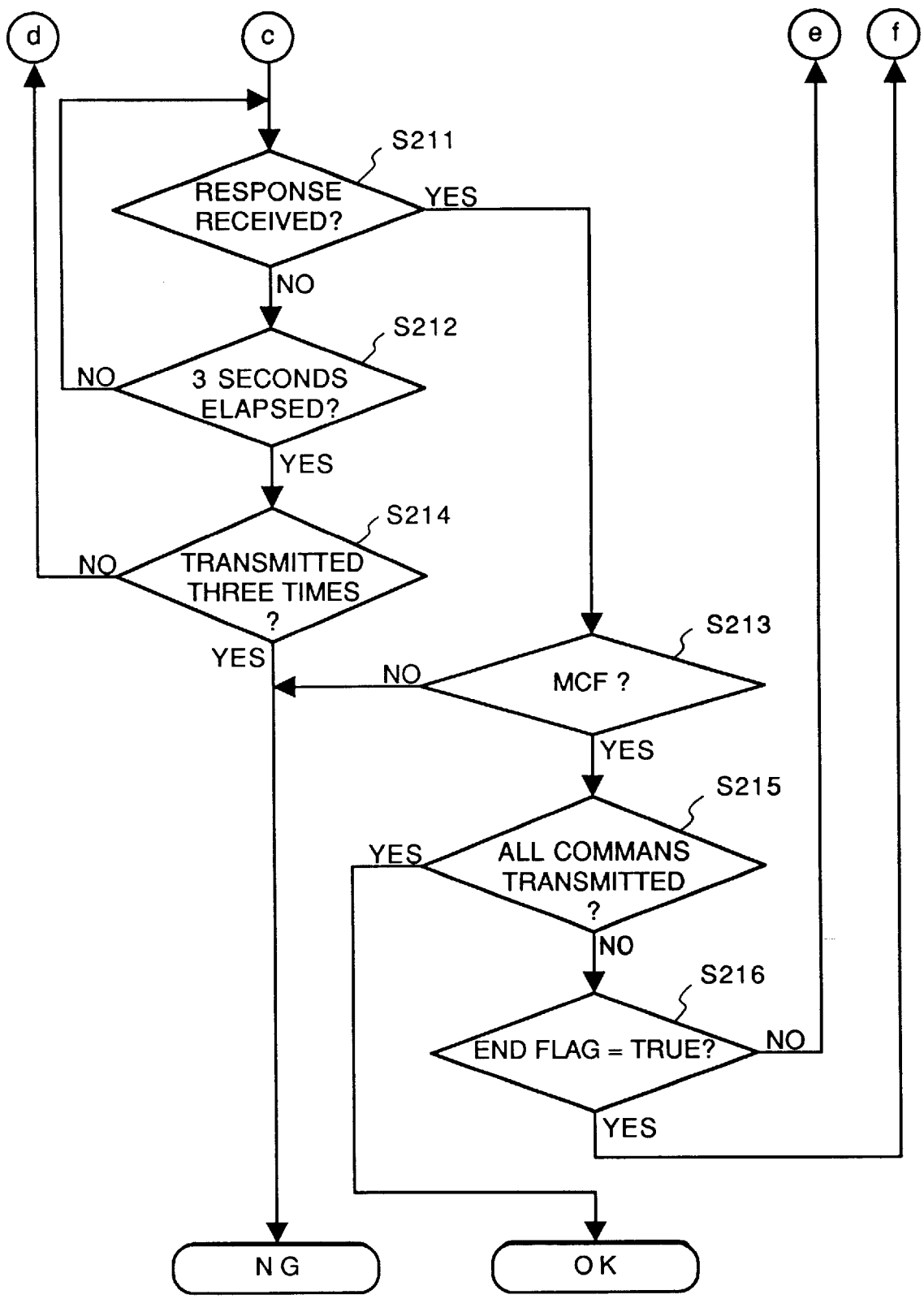

The communication operation between the communication adapter and the terminal facsimile in this modification will be described below with reference to the flow charts shown in FIGS. 24A and 24B.

The communication adapter sequentially reads out a command file received from the PC and stored in the memory from the beginning, and sets the readout command file in a transmission buffer (steps S201 and S202).

When the communication adapter finds a cr code+lf code (0DH, 0AH) indicating the end from the readout data, it sets the readout data up to the lf code (0AH) in the transmission buffer, and starts transmission of the data in the transmission buffer.

At the beginning of the transmission, a transmission timer is set to be 3 seconds, and the start address of the buffer is stored in a start pointer. The transmission operation is continued until the transmission timer reaches a time-out state or a cr code+lf code are detected in the transmission data (steps S204 to S207).

When a cr code+lf code are detected, a command end flag is set to be "true", and a response reception routine is started (steps S209 and S211).

If the transmission timer reaches a time-out state before all the data in the buffer are transmitted, an ff code (0CH) indicating a continuous frame is transmitted at that time.

The address of data next to the finally transmitted data is stored in a next pointer, and the command end flag is set to be "false", thus starting the response reception routine (steps S210 and S211).

When an MCF is received in the response reception routine, the command end flag is checked. If the flag is "true", it is then checked if all the commands are transmitted (steps S213 and S215).

If commands to be transmitted still remain, the flow returns to the node before step S201, and an operation for setting the next command in the transmission buffer is repeated.

If all the commands are transmitted, a DCN signal is transmitted, and a communication is normally ended.

Upon reception of the MCF signal, if the command end flag is "false", the remaining data in the transmission buffer are transmitted. When the command end flag is "false", since the address of the next data is saved in the next pointer, the transmission is restarted from the saved address.

In this case, when the transmission time exceeds 3 seconds, an ff code is inserted to divide the frame. In this manner, the transmission is performed until a cr code +lf code indicating the end of the commands are found.

If a command other than the MCF signal is received in the response reception routine, since this means that the registration cannot be normally performed, a DCN signal is transmitted to terminate a communication as an error.

If no command can be received within 3 seconds in the response reception routine, the number of times of transmissions is checked. If the number of times of transmissions is less than 3, re-transmission is performed from the address saved in the start pointer.

If no significant response can be received after the three transmission operations, a DCN signal is transmitted to terminate a communication as an error.

<Second Modification>

The second modification of the fourth embodiment will be described below. In this modification, in a remote apparatus, a frame is divided at the PC side.

In the fourth embodiment, the PC generates a remote registration command file without limiting its data length. The communication adapter divides the generated command file upon transmission, and adds a code indicating continuation to the divided files. In this modification, the PC divides a command file exceeding a predetermined value, and inserts a code indicating continuation. Thereafter, the PC transfers the divided command files to the communication adapter, and the communication adapter simply transmits the received command files.

This modification is constituted by the PC, the communication adapter, and the terminal facsimile apparatus, as shown in FIG. 18, as in the fourth embodiment.

The operation of this modification is the same as that in the fourth embodiment. That is, when an operator inputs data according to a menu shown in FIG. 19, the PC analyzes input data to generate a command file, and transfers the command file to the communication adapter.

Figure 25:
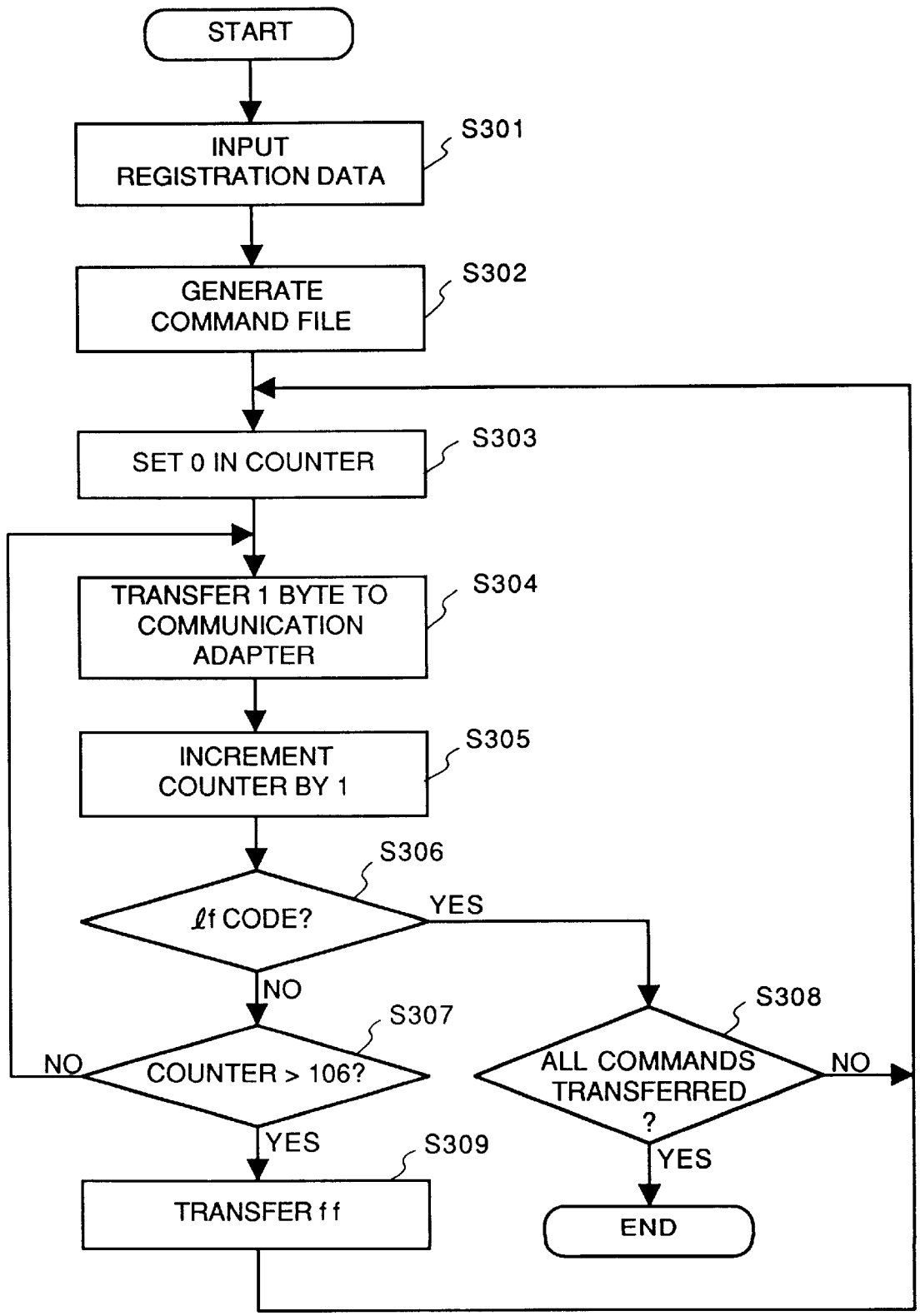

As shown in FIG. 25, prior to the transfer operation, the PC initializes a transfer counter to "0", and thereafter, increments the transfer counter by "1" every time 1 byte is transferred (steps S303 to S305).

The transfer counter is cleared to "0" when an lf code (0AH) is found. If the transfer counter reaches "106", the PC forcibly inserts an ff code (0CH) indicating continuation, clears the transfer counter to "0", and continues the transfer operation (steps S306, S307, and S309).

Thus, the command file received by the communication adapter always includes an lf code indicating the end or an ff code indicating continuation within 107 characters.

As shown in FIG. 26, the communication adapter sequentially reads out the command file received from the PC and stored in the memory from the beginning, and sets the readout command file in a transmission buffer (steps S311 and S312).

When the communication adapter finds an lf code indicating the end or an ff code indicating continuation in the readout data, it sets the readout data up to the found code in the transmission buffer, and starts transmission of the data in the transmission buffer.

Since the frame is divided in advance by the PC to have a maximum of 107 characters, the transmission time per frame always falls within 3 seconds.

Upon completion of transmission of data in the transmission buffer, a response reception routine is started. If an MCF signal is received in the response reception routine, it is then checked if all the commands are transmitted (steps S317 and S319).

If commands to be transmitted still remain, the flow returns to the node before step S311, and an operation for setting the next command in the transmission buffer is repeated.

If all the commands are transmitted, a DCN signal is transmitted to normally end a communication.

If a command other than the MCF signal is received in the response reception routine, since this means that the registration cannot be normally performed, the DCN signal is transmitted to terminate a communication as an error.

If no command can be received within 3 seconds in the response reception routine, the number of times of transmissions is checked. If the number of times of transmissions is less than 3, re-transmission is performed from the beginning of the transmission buffer (S318).

If no significant response can be received after the three transmission operations, a DCN signal is transmitted to terminate a communication as an error.

In this manner, when a large amount of data are transmitted in a remote registration procedure, the data are divided into a plurality of frames each having a fixed length, and a code indicating continuation is added to each divided frame. Thus, a receiver can be easily manufactured, and when an error frame is generated, only the frame causing the error can be easily re-transmitted, thus shortening the communication time when an error occurs.

<Fifth Embodiment>

The fifth embodiment of the present invention will be described below. Since the arrangement and operation of a facsimile apparatus according to this embodiment are the same as those of the facsimile apparatus according to the first embodiment, a detailed description thereof will be omitted here.

Call termination processing and the like of the facsimile apparatus according to this embodiment will be described below with reference to the flow charts.

Figure 27:
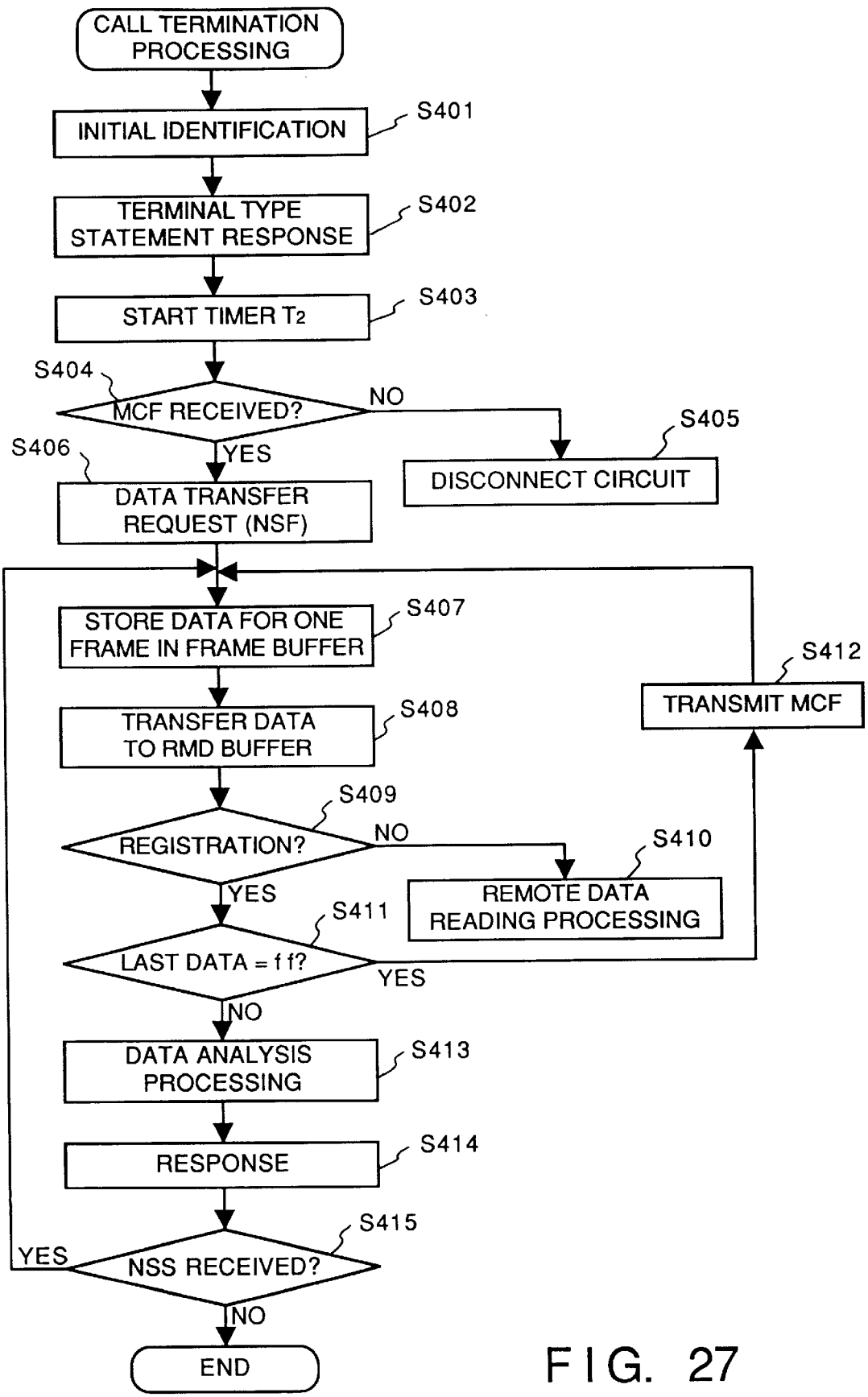
FIGS. 27 and 28 are flow charts showing call termination processing in a facsimile apparatus according to the fifth embodiment of the present invention.

FIG. 27 is a flow chart showing the call termination processing according to this embodiment.

An incoming call detection sensor (not shown) detects the presence/absence of an incoming call. When the sensor detects no incoming call, it continues detection of an incoming call.

When the sensor detects an incoming call, connection processing with a circuit is performed. After connection with the circuit, initial identification processing is performed (step S401).

More specifically, a calling identification signal (CNG) from the calling terminal is detected to check if the CNG is input within a predetermined time T1 after the detection of the incoming call. If the CNG is not input, it is determined that the calling terminal is a "telephone set", and a telephone mode is selected. Then, it is informed to the calling terminal using a dummy ring-back tone or a message that telephone calling is being performed, and a ringing tone of a telephone set of the called terminal is generated to urge a user to perform an off-hook operation of the telephone set. On the other hand, if the CNG is input, it is determined that the calling terminal is a facsimile apparatus, and NSF, CSi, and DiS signals are sent to the calling terminal. The NSF signal is a non-standard function signal for informing a non-standard function to the calling terminal, the CSi signal is a called terminal identification signal for informing the telephone number of the called terminal to the calling terminal, and the DiS signal is a digital identification signal for informing a standard function to the calling terminal. In particular, the NSF signal includes information having a remote data registration/data reading function.

The calling terminal analyzes the content of the NSF signal to check if the called terminal has the remote data registration/data reading function. If it is determined that the called terminal does not have the remote data registration/data reading function, since it is nonsense to continue the communication, the calling terminal sends a DCN (circuit disconnection command), thus disconnecting the circuit.

On the other hand, if it is determined that the called terminal has the remote data registration/data reading function, information associated with the name of the type of terminal of the called terminal is transmitted (terminal type statement response) in step S402. The calling terminal checks if the received information coincides with the type of terminal of the called terminal assumed by the calling terminal. This checking operation is necessary since the types of data to be able to be registered/read out vary depending on the types of terminals.

If the type of terminal of the called terminal does not coincide with the assumed type of terminal, the calling terminal checks if the remote data registration/data reading function can be continued.

If it is determined that the remote data registration/data reading function cannot be continued, a DCN signal or an RTN signal is sent to the called terminal to disconnect the circuit. And if it is determined that the remote data registration/data reading function can be continued, the same processing as in a case wherein the type of terminal of the called terminal coincides with the type of terminal assumed by the calling terminal is performed.

If the terminal type statement response is checked, and a coincidence between the two types is found, the calling terminal sends an MCF (message confirmation) signal. The called terminal starts a timer $T_2$ after the terminal type statement response is issued (step S403), and checks if the MCF is received within the time $T_2$. If the MCF cannot be received within the time $T_2$, the called terminal disconnects the circuit (step S405). On the other hand, if the MCF is received within the time T2, the called terminal sends an NSF as a data transfer request to the calling terminal when it is ready to receive data (step S406). When the calling terminal confirms the NSF, it starts data transmission using an NSS signal.

At the called terminal, received data is temporarily stored in a frame data having a capacity of one frame (step S407), and the stored data is then transferred to an RMD buffer (step S408). The data is read out from the RMD buffer in units of frames, and the following processing is executed based on the readout data.

It is checked in step S409 if a remote data registration mode is set. If it is determined that the remote data registration mode is not set, remote data reading processing is performed (step S410). On the other hand, if it is determined that the remote data registration mode is set, it is checked if the last data in one frame is ff (step S411). If the last data is ff, this means that there is a next frame. At this time, the frame number of the fifth octet is read out to check if the frame number is correct.

Since the frame numbers are sent a sequential number, an RTN or DCN signal is sent to the calling terminal to disconnect the circuit. Alternatively, a re-send request of a frame having an omitted frame number may be issued.

On the other hand, if the frame number is correct, an MCF signal is sent to the calling terminal to request transmission of the next frame. The next frame is stored in the frame buffer, and is then transferred to the RMD buffer. It is checked if the data registration mode is set, and thereafter, it is checked if the last data is ff (step S412).

If the last data is not ff, the data is read out from the RMD buffer, and data analysis processing is performed (step S413).

Figure 28:
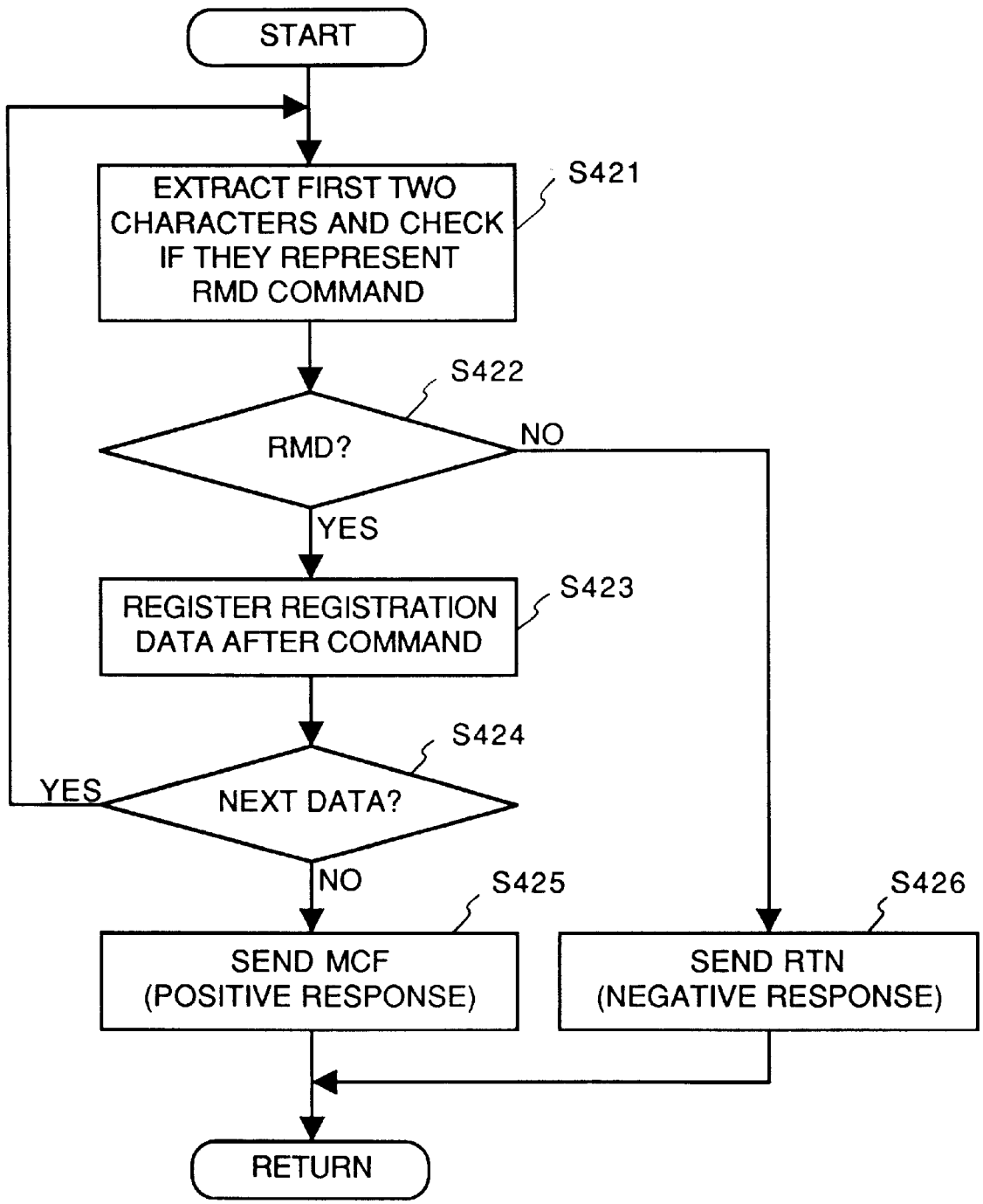

In the data analysis processing, according to the flow chart shown in FIG. 28, the first two characters are extracted, and it is checked if they indicate a remote data registration command (step S421). If a command represented by the first two characters is not defined as the remote data registration command, an RTN (negative response) is sent to the calling terminal (step S426).

A timer $T_4$ is started, and it is checked if an NSS is detected until the timer $T_4$ reaches a time-out state. If the NSS is not detected, the circuit is disconnected; otherwise, the NSS is stored in the frame buffer, and the above-mentioned processing is performed.

If the first two characters represent the remote data registration command, registration data next to the command up to a bit before crlf is registered. If data is present after crlf, processing for extracting the next first two characters to check if they represent the remote data registration command is repeated until all the data are processed.

If all the data are processed, an MCF is sent to the calling terminal (step S425). After the MCF is sent, a timer $T_3$ is started to check if an NSS is sent from the calling terminal (step S415 in FIG. 27). If the NSS is received, processing for receiving the sent frame in the frame buffer is repeated. On the other hand, if the NSS is not received within the time $T_3$, it is determined that there is no data to be received, and a DCN is sent to disconnect the circuit.

<Sixth Embodiment>

The sixth embodiment of the present invention will be described below. Since the arrangement and operation of a facsimile apparatus according to this embodiment are the same as those of the facsimile apparatus according to the fourth embodiment, a detailed description thereof will be omitted.

FIGS. 29A to 29D show frames in an HDLC format in the facsimile apparatus of this embodiment.

Figure 30A:
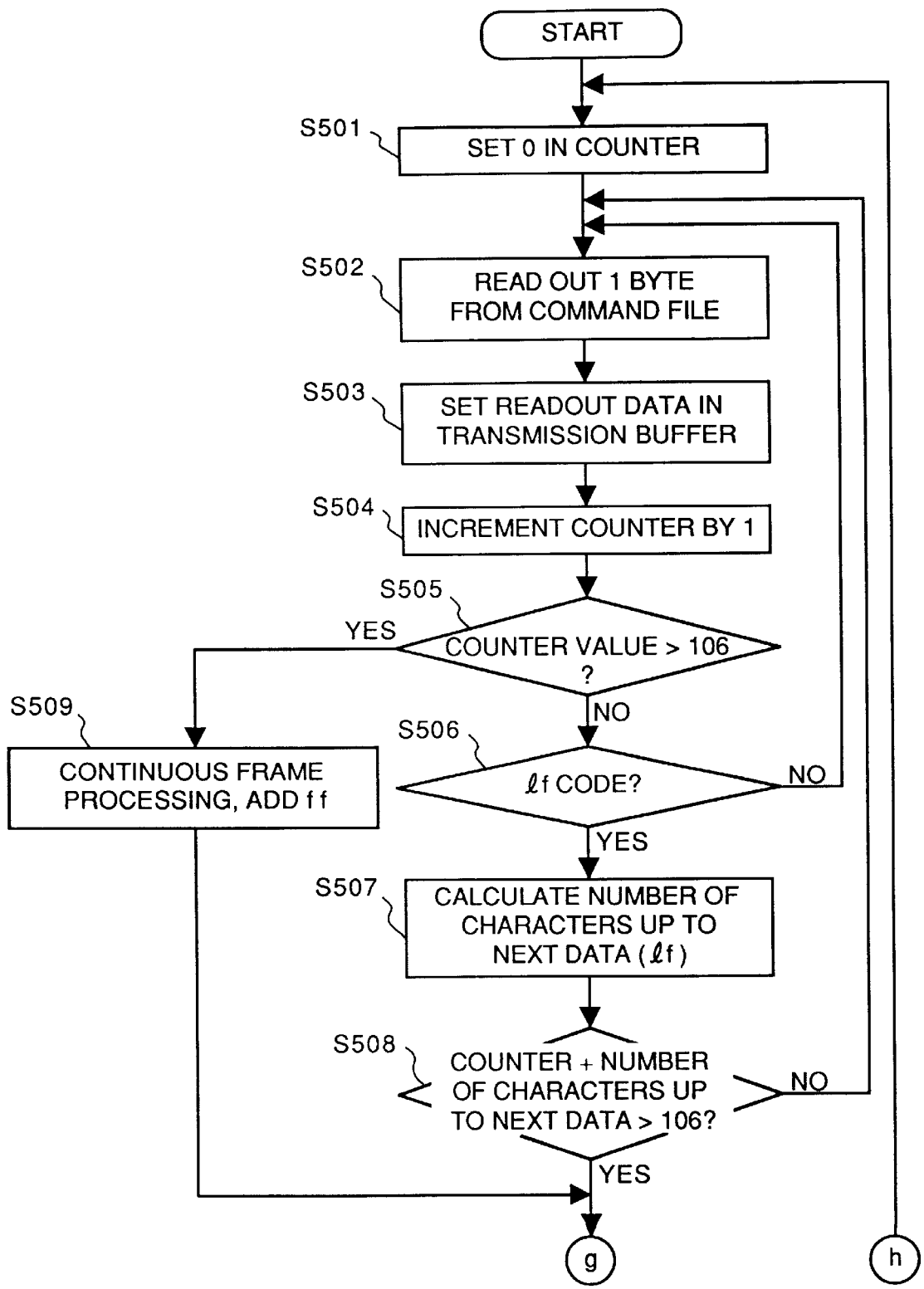
FIGS. 30A and 30B are flow charts showing a transmission operation in a facsimile apparatus according to the sixth embodiment.
Figure 30B:
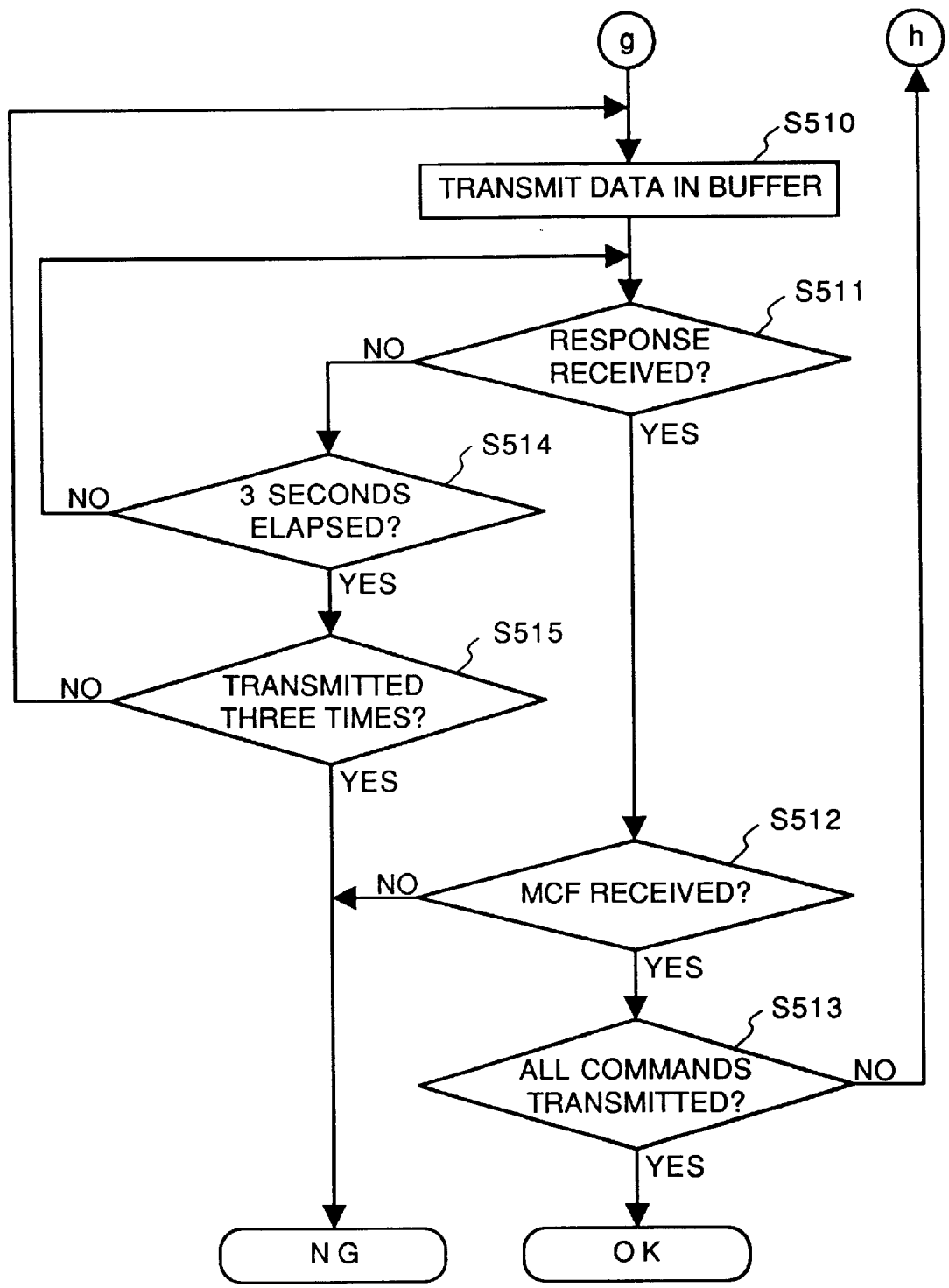

The transmission operation of this embodiment will be described in detail below with reference to the flow charts shown in FIGS. 30A and 30B.

A command is divided using "crlf". When data division characters "crlf" are found in a command file, a communication adapter sets data up to the data division characters "crlf" in a transmission buffer, and checks if the next data is present in the command file.

If the next data is present, the communication adapter checks if the next data can be set within 107 bytes. If the next data can be set within 107 bytes, the communication adapter sets the next data, and repeats this processing as long as the next data is present and can be set within 107 bytes. Upon completion of the data setting operation, the communication adapter transmits data for one frame (step S510).

If the length of the first command to be transmitted exceeds 107 bytes, the communication adapter adds an ff code (0CH) as a division code indicating continuation to the end of the frame so as to indicate that the command continues (step S509).

A receiving facsimile apparatus registers all the data according to commands in a received NSS, and when all the transmitted data are normally registered, the receiving apparatus sends back an MCF as a positive response (step S512).

If a command or data includes an error, and the registration cannot be normally performed, the receiving apparatus sends back an RTN as a negative response.

When the trailing end of the received frame terminates with an ff code, the receiving apparatus holds the received command in a buffer without executing it, and sends back an MCF.

Upon reception of the MCF, the communication adapter sets the remaining command string in the previous transmission in the transmission buffer, and transmits the command string.

In this case, if the commands to be set exceed 107 bytes, an ff code is also set to indicate continuation of transmission.

If the receiving apparatus receives an ff code, the currently received data is added after the trailing end of the previously held data. Upon reception of a frame including the last data=crlf, the receiving apparatus executes the commands in the buffer, and sends back a positive or negative response.

The communication adapter continuously executes the above-mentioned transmission processing until all the data in the command file are transmitted.

As for the last frame of data including ff codes indicating continuation, the command of the next data is not added, and this last frame is not transmitted as a frame including a plurality of commands (see FIGS. 29A to 29D.

<Modification>

A modification of the sixth embodiment will be described below. In the sixth embodiment, the PC generates a file of commands to be registered in a terminal facsimile apparatus, and divides the file by adding a data division code in a format with which the divided files can be directly transmitted. The PC sends the divided files to the communication adapter. However, in this modification, the communication adapter divides data of registration commands, thereby simplifying data sending processing in the PC.

An operator inputs a user telephone number, and the like according to a menu displayed on the PC (see FIG. 19). The PC analyzes input data, and generates a command file to be transmitted. The command file is an ASCII file, and each command is constituted by adding data input by the operator after a command ID (two characters) defined for each registration item. Data input by the operator is transmitted as a command file to the communication adapter simultaneously with the input operation by the operator. The state of the buffer of the communication adapter at that time is as shown in FIGS. 31A to 31C.

Figure 31A:
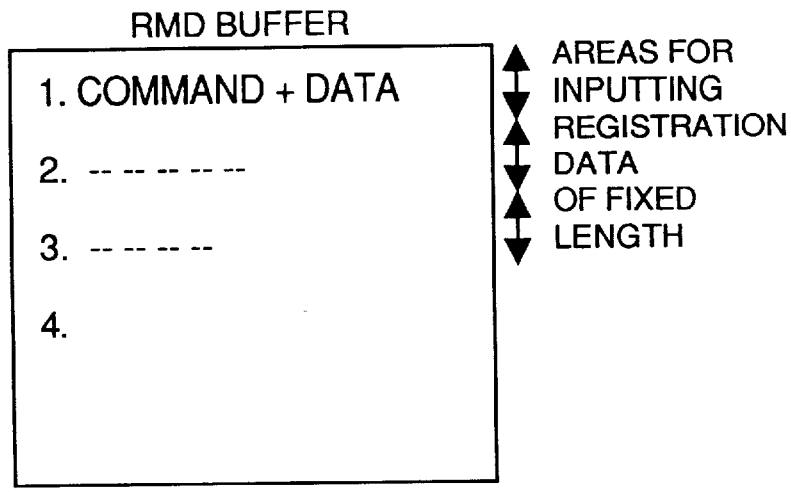
FIGS. 31A to 31C are views showing buffer in a communication adapter according to a modification of the sixth embodiment.
Figure 31B:
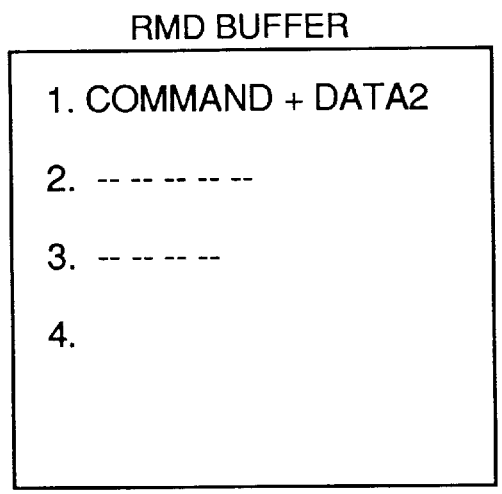
Figure 31C:
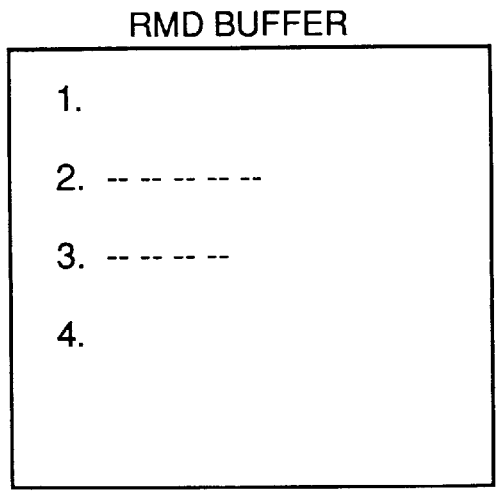

In a data registration mode, a command+a data content to be registered are stored in the buffer (FIG. 31A). In this case, a number is added after the command to store the data content in a record of the corresponding number. In a data correction mode, a command+number are stored in the buffer to designate a record including data to be corrected, and to update the content (FIG. 31B). When a data content is to be deleted, a command+number are stored in the buffer to designate a record including data to be deleted (FIG. 31C). The communication adapter inserts spaces in a received data record to clear the content of the data record.

In a file transmission operation, when the operator instructs to execute transmission on the menu, a transmission command and a designated transmission destination are sent to the communication adapter. When a remote registration communication is started, the communication adapter transfers data from an RMD data buffer to a transmission buffer. The data transmission procedure is as follows:

(1) If the data length for one record does not exceed 105 bytes, codes "crlf" (OD0AH) are added to the end of data to be transferred.

If the data length exceeds 105 bytes, a code "ff" (OCH) is added to the 106th byte of data, and the data is transferred to the transmission buffer.

(2) The data length of the next record is calculated. If the next data can be added within 105 bytes, the next data is transferred, and codes "crlf" (ODOAH) are added. The steps (1) and (2) are repeated as long as data can be transferred to the transmission buffer.

(3) The data transmission is performed in the same procedure as in the above embodiment.

The following operations are the same as those in the sixth embodiment.

In this manner, a communication is made with a facsimile apparatus from a remote place by utilizing the communication function of the facsimile apparatus so as to read/write data from/in an internal memory of the apparatus, thus allowing a registration/adjustment operation of the apparatus from the remote place. <Seventh Embodiment>

FIG. 32 is a diagram showing an arrangement of a remote registration apparatus according to the seventh embodiment of the present invention. In FIG. 32, reference numeral 61 denotes a PC (personal computer), at which an operator performs, e.g., a data input operation, for controlling the entire system. The PC 61 incorporates a 300-bps modem, and can communicate with a terminal facsimile apparatus.

Reference numeral 62 denotes at least one terminal facsimile apparatus connected to a public network 63. The terminal facsimile apparatus receives commands sent from the PC, and performs read/write operations of a memory according to the received commands.

Figure 39:
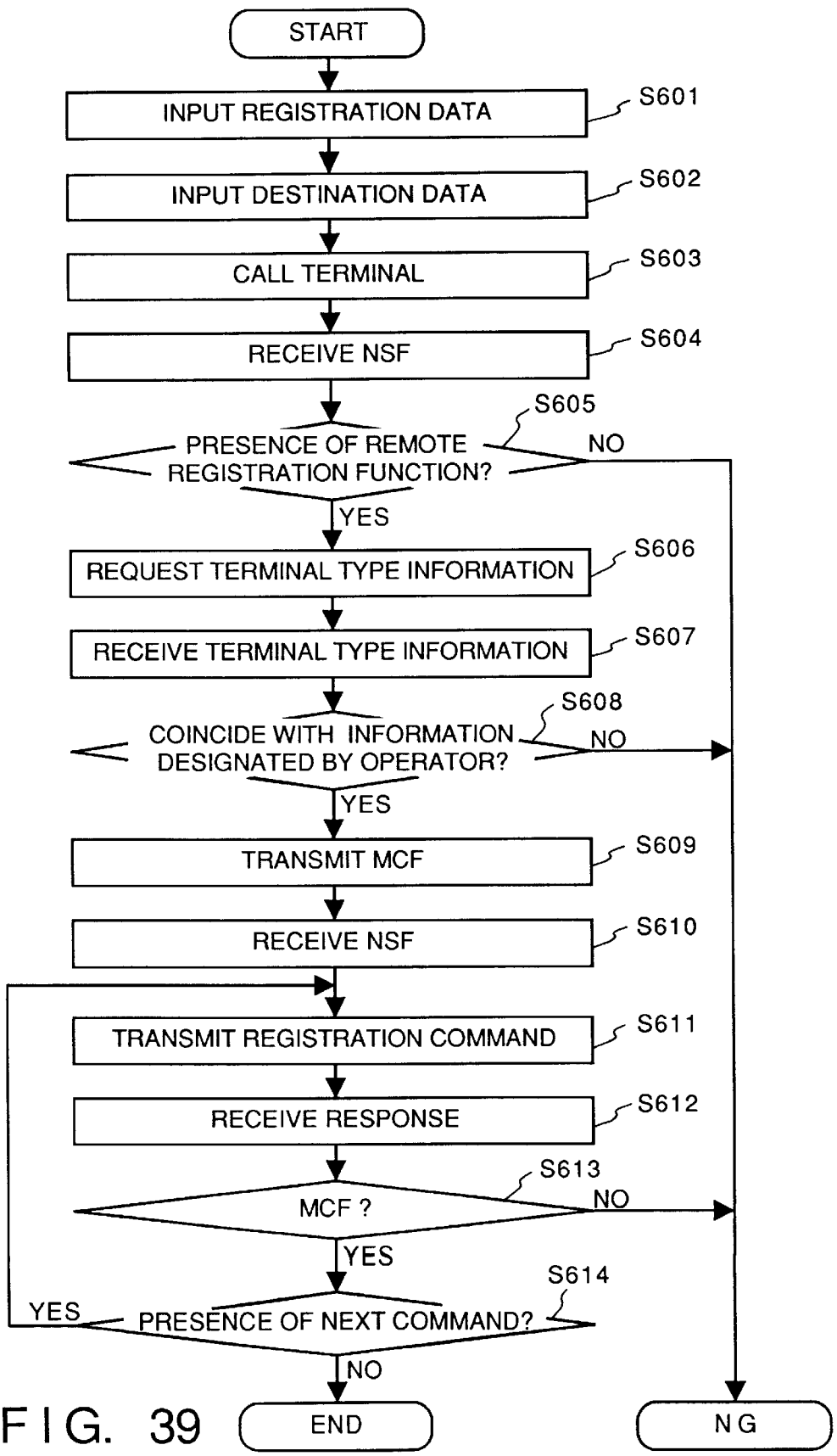
FIG. 39 is a flow chart showing an operation of the apparatus according to the seventh embodiment.

The operation of the apparatus according to the seventh embodiment of the present invention will be described below with reference to the flow chart shown in FIG. 39.

In step S601, an operator inputs a user telephone number, and the like according to a menu displayed on the PC (see FIG. 33).

The PC analyzes the input data to generate remote registration commands, and forms a transmission command file (see FIG. 34).

Upon completion of the input operation of the registration content, a transmission menu is displayed, and in step S602, the telephone number and terminal type information of the terminal facsimile apparatus to be connected are input (see FIG. 35).

In this embodiment, the terminal type information includes three data, i.e., a terminal type name, a destination country, and a program version No.

In a display example shown in FIG. 35, all the data, i.e., the terminal type name=CF-L770, the destination country= USA, and the version No.=U01.01 are input.

In this case, since all the terminal type name, destination country, and version No. are designated, all the pieces of terminal type information are compared with those of the receiver (step S608).

If even one of these pieces of information does not coincide with that of the receiver, the following communication is not performed.

As another example, when it is known that data to be registered has the same storage format (encoding method, data length, and the like) regardless of the destination country/version No. as long as only the terminal type name data coincide with each other, only the terminal type name of CF-L770 can be designated, and the columns of the destination country and the version No. need not be filled.

Thus, only the terminal type name data are compared, and other data are ignored.

In this case, if only the terminal type name data coincide with each other, the apparatus can operate regardless of the destination country/version No.

When it is known that data to be registered has the same storage format (for example, when it is already determined by a manufacturer that a user abbreviation must be input to have a maximum of 20 ASCII characters) regardless of the terminal type, destination country, and version No., no data need be input, and a transmission operation can be performed without filling the columns of the terminal type name, destination country, and version No. In this case, no comparison operation is performed, and the apparatus can operate regardless of the terminal type name, destination country, and version No.

Upon completion of the above-mentioned operation, a communication is performed between the host apparatus and the terminal facsimile apparatus. The communication is performed using a CCITT V.21 recommendation 300-bps modem in a format complying with the facsimile procedure while setting commands in an FIF (facsimile information field) of a frame in the HDLC format (see FIG. 36).

When the host apparatus generates a call, the terminal facsimile apparatus detects a calling signal from the circuit, and closes the circuit. The terminal facsimile apparatus sends a CED signal, and then sends NSF, CSI, and DIS signals.

In this NSF (non-standard function) signal, the terminal facsimile apparatus states that it has a function of accepting remote registrations.

After the host apparatus confirms the statement of the presence of the remote registration function in the NSF signal, it sets remote registration commands in an NSS (non-standard function setting) signal, and transmits the NSS signal.

Figure 37:
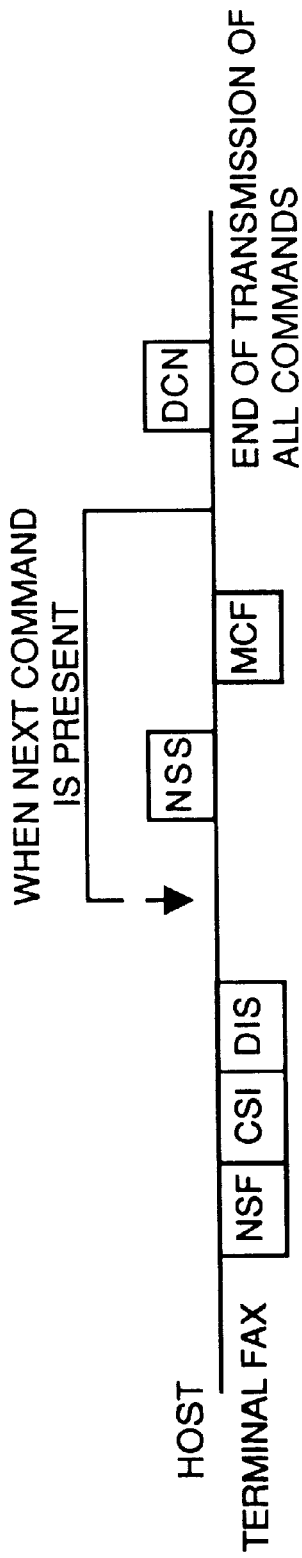
FIGS. 37 and 38 are charts showing communication protocols according to the seventh embodiment.

When the operator designates no terminal type information of the receiver, registration commands are immediately sent, and the terminal facsimile apparatus which received the commands registers data according to the commands in the NSS signal. Thereafter, when the data can be normally registered, the terminal facsimile apparatus sends an MCF signal as a positive response; otherwise, it sends an RTN signal as a negative response (see FIG. 37).

When the operator designates terminal type information, the host apparatus sets a command for requesting the terminal type information of the receiver in the NSS signal, and transmits the NSS signal before the above-mentioned registration commands are sent.

In this embodiment, a command used in a remote registration procedure is expressed by an ID (two letters of alphabet), and necessary information is added as a parameter depending on commands.

Commands (and parameters) are divided using CR-LF codes (ODH, 0AH).

The terminal type information request command is expressed by "XD", and has no parameter. Therefore, in the data field of the NSS signal for requesting the terminal type information, "XDcrlf" is stored.

The terminal facsimile apparatus, which received the terminal type information request command, sets its own terminal type information in an NSC (non-standard function command) signal, and transmits the NSC signal.

In this embodiment, the terminal type information includes terminal type name data, destination country data, and ROM version data, and these data are respectively expressed by command IDs XO, XC, and XV. Corresponding information is added after each of these IDs as a parameter.

Therefore, in the data field of the NSC signal for transmitting the terminal type information, when the terminal type name=CF-L770, the destination country=USA, and version No.=U01.01, "XOCF-L770crlfXCUSAcrlfXW01.01crlf" is stored.

Figure 38:
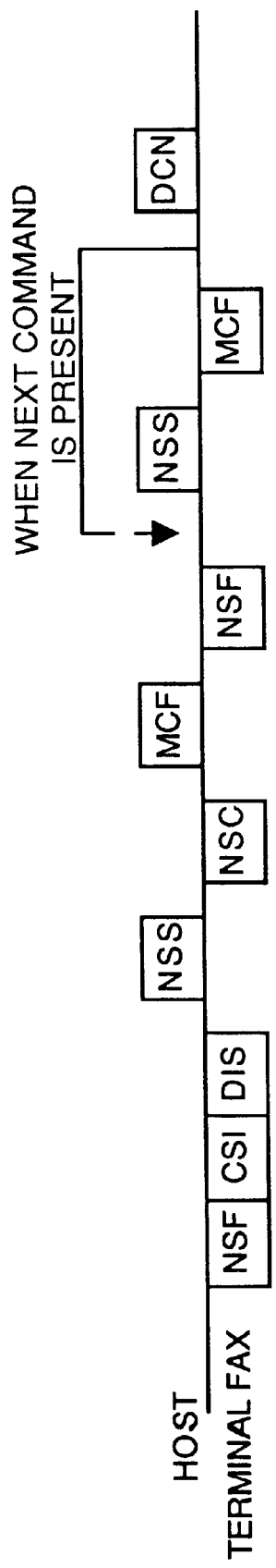

The host apparatus, which received the terminal type information, compares its content with the terminal type information designated by the operator. When a coincidence between the two pieces of information is found, registration commands are set; otherwise, a DCN signal is sent to end the communication (see FIG. 38).

<Modification>

Figures 40, 41:
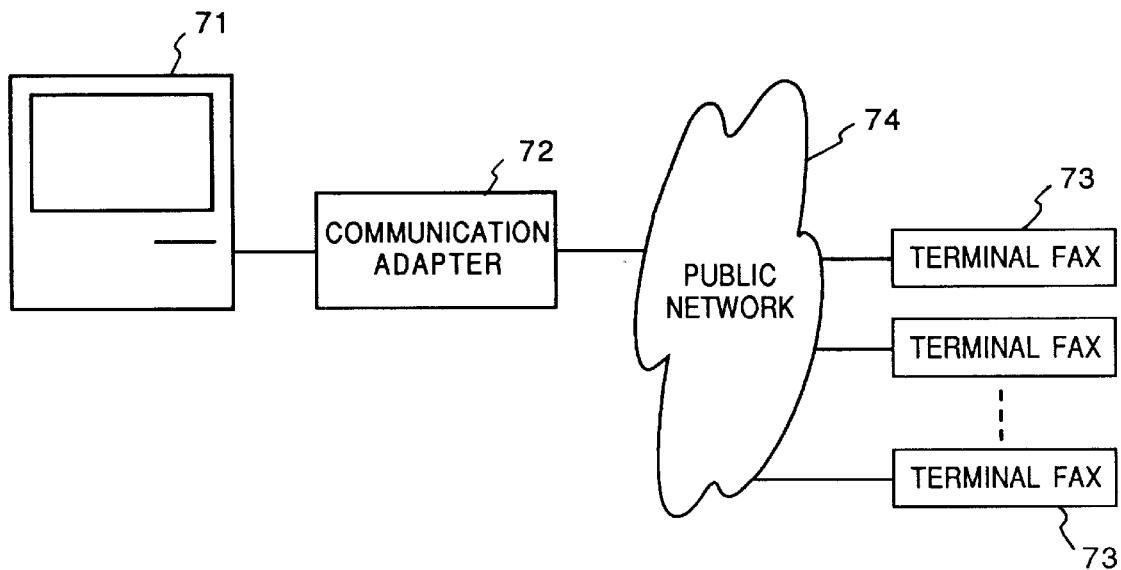
FIG. 40 is a diagram showing an arrangement of an apparatus according to a modification of the seventh embodiment.
FIG. 41 shows commands according to the modification of the seventh embodiment.

FIG. 40 is a diagram showing an arrangement of a remote registration apparatus according to a modification of the seventh embodiment.

In FIG. 40, reference numeral 71 denotes a PC, at which an operator performs, e.g., a data input operation, for controlling the entire system. The PC 71 generates a registration command file based on input data, and transfers the command file to a communication adapter 72.

The communication adapter 72 transmits the command file received from the PC to a terminal facsimile apparatus. In this embodiment, the communication adapter comprises a facsimile apparatus having an RS-232C I/F for the PC.

The PC and the communication adapter constitute a host apparatus.

Reference numeral 73 denotes at least one terminal facsimile apparatus connected to a public network 74. The terminal facsimile apparatus receives commands sent from the communication adapter, and performs memory read/write operations according to the received commands.

The arrangement different from that of the seventh embodiment is as follows. That is, in the seventh embodiment, the PC incorporates the modem, and the PC itself performs communication control. In this modification, however, the PC receives input data and generates a command file, and a communication with a terminal is independently performed by the communication adapter.

In this system, the next input operation can be performed at the PC during a communication with the terminal, or one communication adapter can be shared by a plurality of PCs, and parallel input operations can be performed on the plurality of PCs. However, since the communication adapter can only transmit a command file received from the host apparatus to the terminal facsimile apparatus, it is difficult for the transmitting apparatus to determine whether or not a communication is possible by checking terminal type information of the receiver.

Thus, in this modification, the receiving apparatus determines whether or not a communication is possible.

The operation of the apparatus according to this modification will be described below with reference to the flow charts shown in FIGS. 43 and 44.

Figure 43:
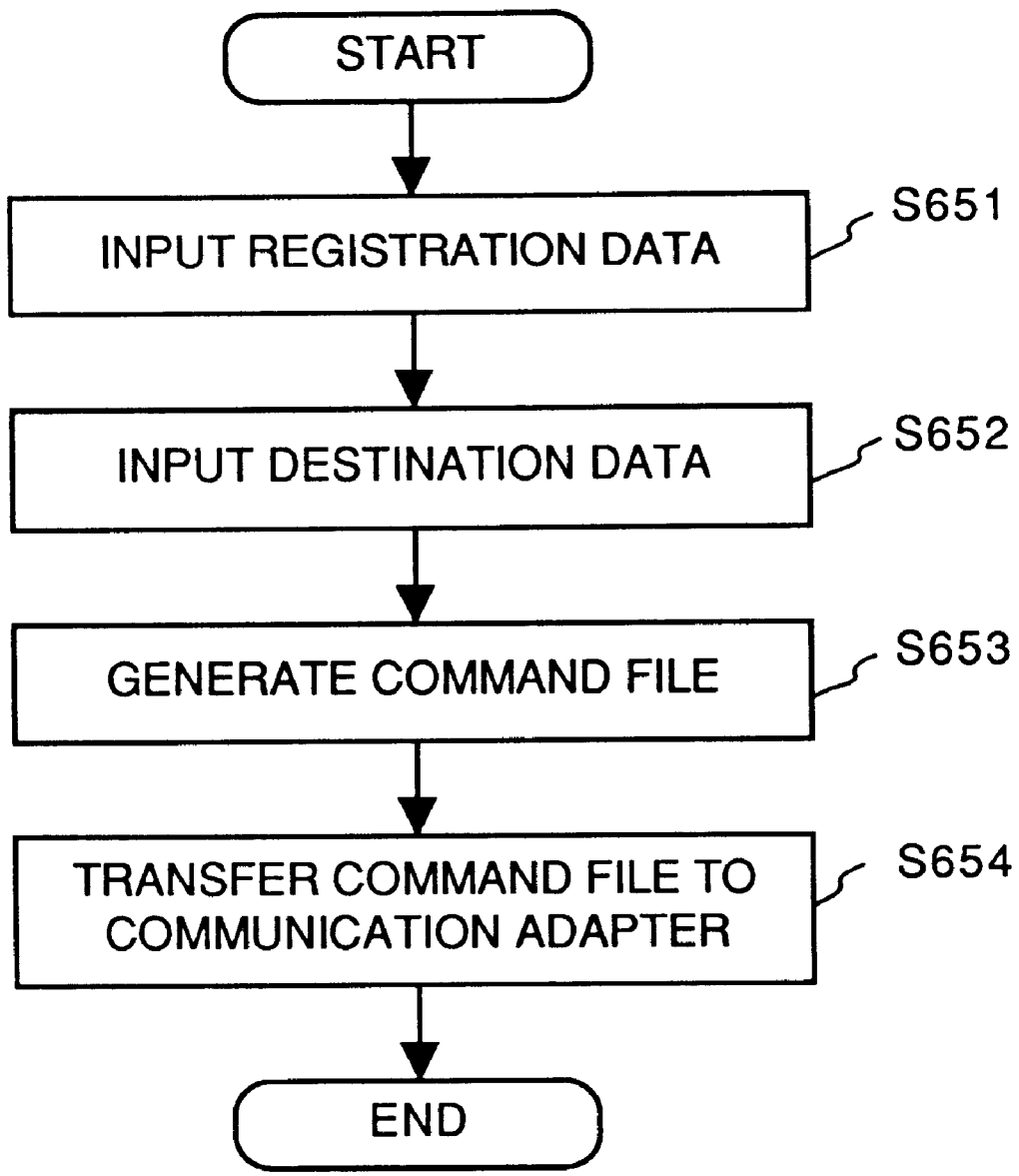
FIGS. 43 to 45 are flow charts showing an operation of the apparatus according to the modification of the seventh embodiment.

In step S651 in FIG. 43, an operator inputs a user telephone number, and the like according to a menu displayed on the PC (see FIG. 33). Upon completion of the input operation of the registration content, a transmission menu is displayed, and in step S652, the connection telephone number and terminal type attributes of the terminal facsimile apparatus are input (see FIG. 34). The above-mentioned operations are the same as those in the seventh embodiment.

Upon completion of the above-mentioned input operations, the PC converts input data into a command file. At this time, the PC adds the finally input terminal type information to the beginning of the command file.

The format of the terminal type information is the same as that transmitted from the terminal facsimile apparatus to the host apparatus in the seventh embodiment. That is, corresponding terminal type information is added after a command ID (two characters) as a parameter. In this case, the IDs are terminal type name=XO, destination country=XC, and ROM version=XV. A division code between adjacent commands uses CR-LF (0DH, 0AH).

More specifically, in a display example shown in FIG. 33, the generated command file starts with:

XOCF-L770crlfXCUSAcrlfXVU01.01crlf

Then, registration commands and parameters follow (see FIG. 41).

When all the data input by the operator are converted into the command file, the PC transfers the generated command file to the communication adapter (step S654).

In this embodiment, this transfer operation is performed using the RS-232C I/F. However, other high-speed I/Fs such as an SCSI I/F may be used.

The communication adapter is of a model prepared by adding a software program for the present invention to a facsimile apparatus comprising the RS-232C I/F. The communication adapter stores the command file received through the RS-232C I/F in a memory, and then generates a call to a target facsimile apparatus to be subjected to registrations.

Figure 45:
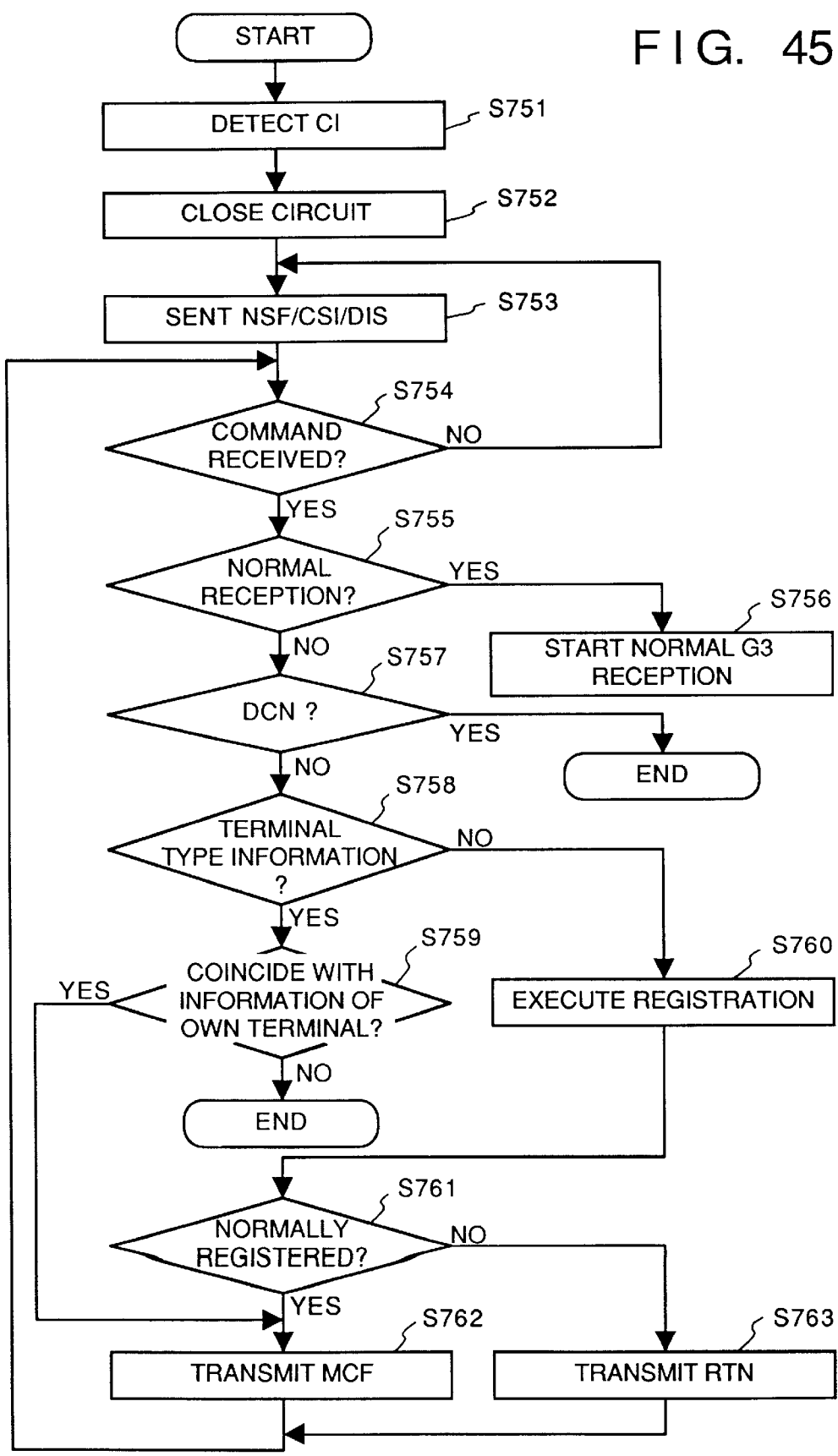

In FIG. 45, upon detection of a calling signal from the circuit, the terminal facsimile apparatus closes the circuit, sends a CED signal, and then transmits NSF, CSI, and DIS signals (steps S751 to S753).

In this NSF (non-standard function) signal, the terminal facsimile apparatus states that it has a function of accepting remote registrations.

Figure 44:
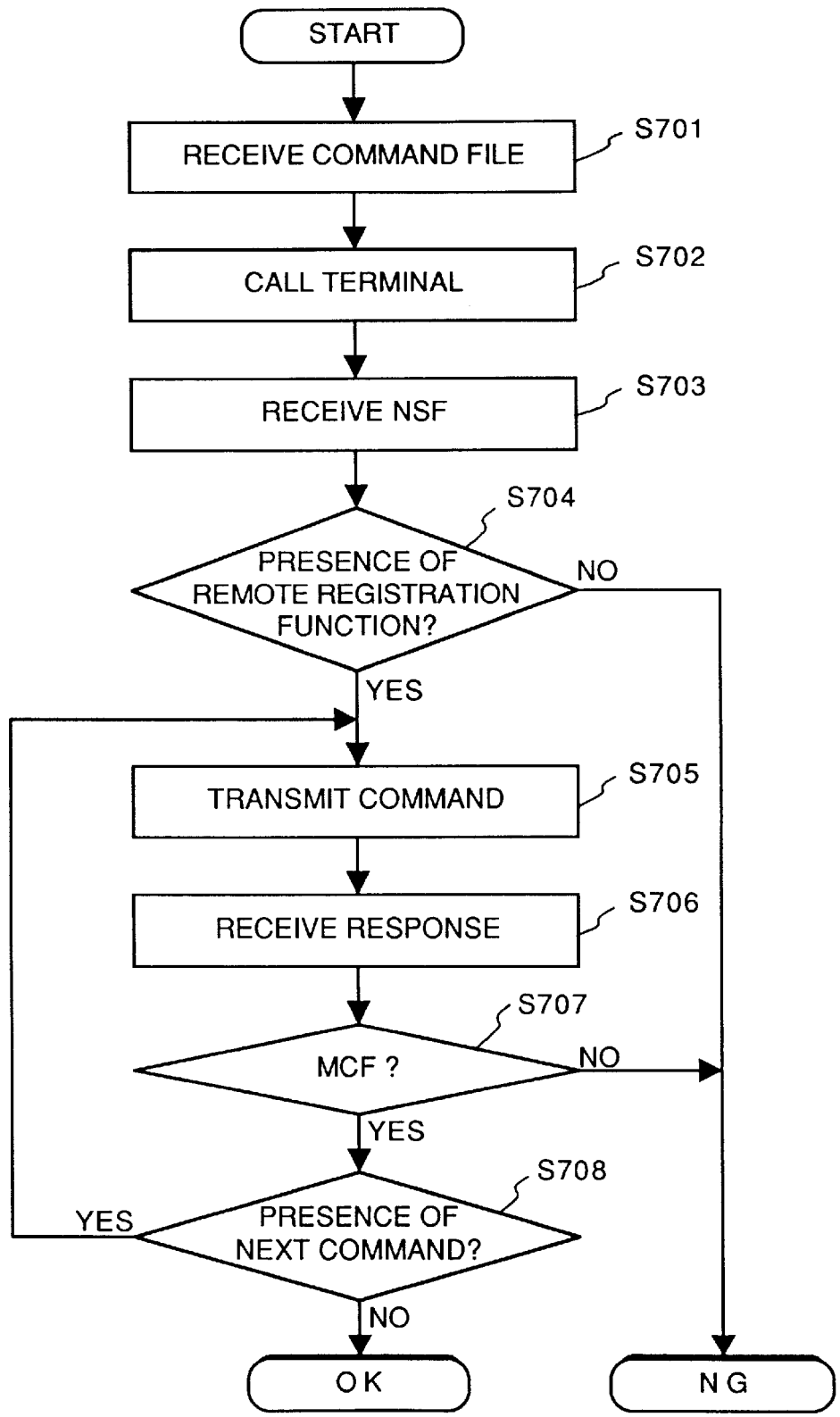

On the other hand, after the communication adapter confirms the statement indicating the presence of the remote registration function in the NSF signal, it sets a remote registration command in an NSS (non-standard function setting) signal, and transmits the NSS signal (steps S701 to S705 in FIG. 44).

The communication adapter merely sequentially reads out and transmits the content of the command file, and is not concerned with the content of the file. However, when the operator designates information of the terminal facsimile apparatus, the information of the terminal facsimile apparatus designated by the operator is written at the beginning of the command file. Thus, the communication adapter transmits the designated terminal type information to the terminal facsimile apparatus first.

Figure 42:
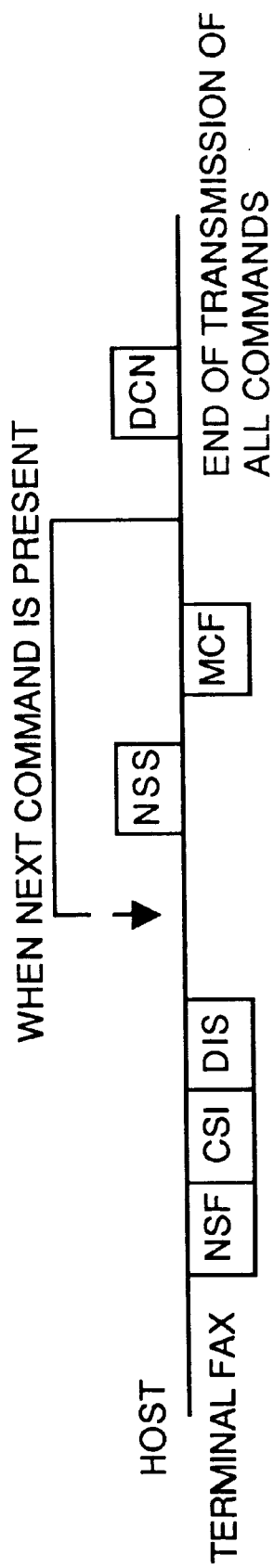
FIG. 42 is a chart showing a protocol according to the modification of the seventh embodiment.

The terminal facsimile apparatus, which received the terminal type information, compares the content with its own terminal type information. When a coincidence between the two pieces of information is found, the terminal facsimile apparatus sends an MCF signal to continue the communication; otherwise, it releases the circuit to end the communication (see FIG. 42).

As described above, terminal type information of an object to be subjected to registration, which information is recognized by a transmitting apparatus, is compared with terminal type information of a receiver itself, and only when these pieces of information coincide with each other, the remote registration operation is executed; otherwise, the communication is stopped to release the circuit, thereby preventing wrong data from being registered.

<Eighth Embodiment>

The eighth embodiment of the present invention will be described below. The arrangement of a remote registration apparatus according to this embodiment is the same as that of the apparatus according to the modification of the seventh embodiment shown in FIG. 40, and a display on a personal computer (PC) constituting this embodiment is the same as that shown in FIG. 19.

The format of a command frame of this embodiment is the same as that shown in FIG. 21A.

A communication between a communication adapter and a terminal facsimile apparatus in this embodiment is performed in procedures shown in FIGS. 46 to 49.

FIG. 46 shows a procedure when a data registration operation is performed from the communication adapter to the terminal facsimile apparatus. Upon detection of a calling signal from a circuit, the terminal facsimile apparatus closes the circuit, sends a CED signal, and then sends NSF, CSI, and DIS signals.

In this NSF (non-standard function) signal, the terminal facsimile apparatus states that it has a function of accepting remote registrations.

After the communication adapter confirms the statement indicating the presence of the remote registration function in the NSF signal, it sets a remote registration command in an NSS (non-standard function setting) signal, and transmits the NSS signal.

The terminal facsimile apparatus executes the commands in the NSS signal to register data. Thereafter, when the registration operation is normally ended, the terminal facsimile apparatus transmits an MCF signal as a positive response.

When the registration operation cannot be normally performed, the terminal facsimile apparatus transmits an RTN signal to inform an error.

If commands to be transmitted still remain after the MCF signal is confirmed, the communication adapter repetitively transmits the NSS signal. After all the commands are transmitted, the communication adapter sends a DCN signal to end the communication.

A data reading operation from the terminal facsimile apparatus is executed in a procedure shown in FIG. 47. Upon reception of the NSF signal indicating the presence of the remote registration function from the terminal facsimile apparatus, the communication adapter sets a data read command in the NSS signal, and transmits the NSS signal.

Upon reception of the data read command, the terminal facsimile apparatus then serves as a transmitting apparatus, sets the requested data in an NSC (non-standard command) signal, and transmits the NSC signal.

Upon reception of the NSC signal, the communication adapter stores the content in a memory, and sends an MCF signal.

If data to be transmitted still remain after the MCF signal is confirmed, the terminal facsimile apparatus repetitively transmits NSC signals. After all the data are transmitted, the terminal facsimile apparatus sends a DCN signal to end the communication.

In these communications, since the NSF, CSI, and DIS signals are sent first from the terminal facsimile apparatus before a specific procedure for remote registration is started, the preamble time is 1 second.

Figure 48:
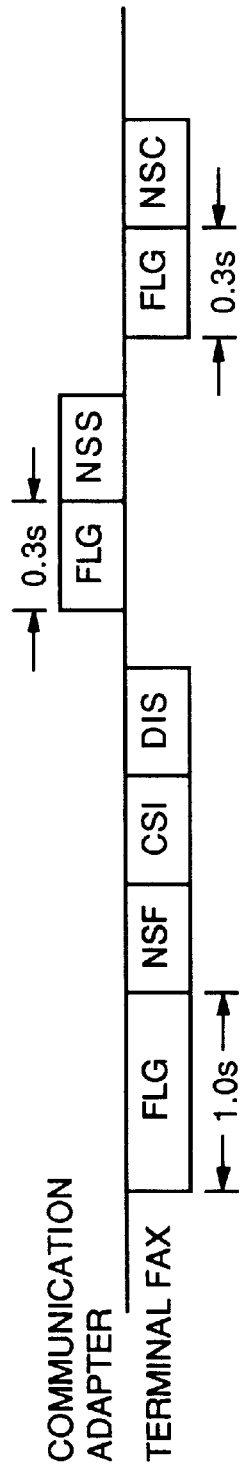
Figure 49:
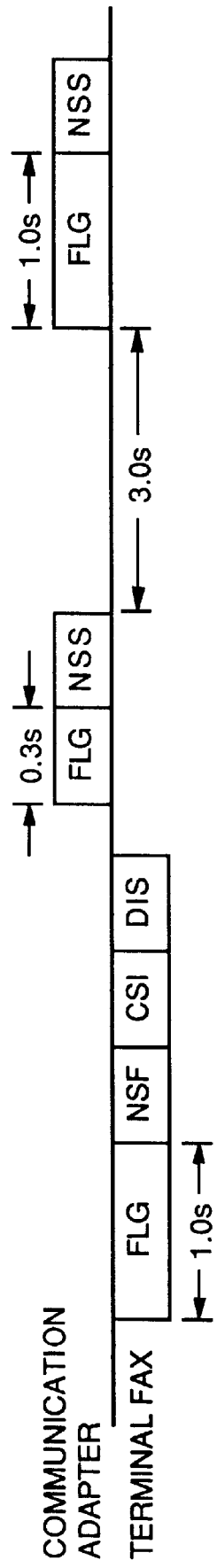

The first NSS signal sent first from the communication adapter and subsequent signals are transmitted while the preamble is changed to be a predetermined value (see FIG. 48).

In this embodiment, this preamble time is set to be 300 ms.

This value can be independently set by the communication adapter or the terminal facsimile apparatus. In a region with a bad circuit condition, this value can be set to be relatively large, thereby eliminating a communication error.

When no response is obtained after the commands are transmitted, as shown in FIG. 44, the preamble time is prolonged to 1 second like in a normal facsimile procedure after a response wait time of 3 seconds, and commands are re-transmitted, thus preventing a communication error.

Figure 50:
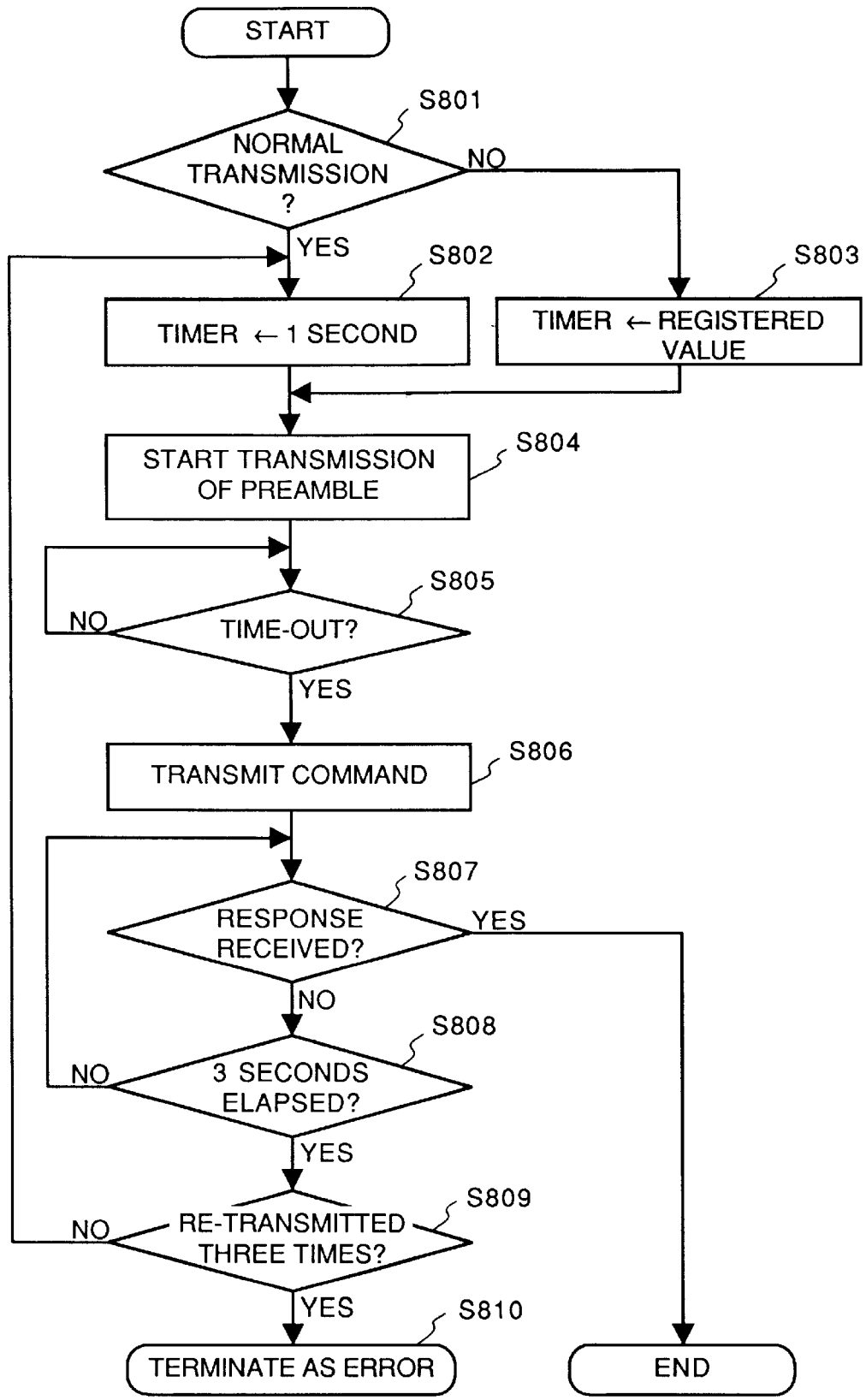
FIG. 50 is a flow chart showing preamble time control in the apparatus according to the eighth embodiment.

Preamble time control will be described below with reference to the flow chart shown in FIG. 50. The flow chart of FIG. 50 shows control upon transmission of command and upon reception of a response, and this portion is used common to a normal G3 procedure.

Upon transmission of commands, in step S801, a normal procedure or a specific procedure for remote registration is checked. If the normal procedure is to be performed, the flow advances to step S802, and a preamble time of 1 second determined by T.30 is set in a timer; otherwise, a predetermined preamble time is set in step S803.

This time is 300 ms in this embodiment.

Upon completion of the timer setting operation, transmission of the preamble is started (S804), and a flag pattern (7EH) is kept transmitted until the timer reaches a time-out state (S805).

When the timer reaches a time-out state, the flow advances to step S806, and commands are transmitted. Upon completion of the transmission of commands for a maximum of 3 seconds, a response reception routine is started (S807).

The response reception routine is executed for a maximum of 3 seconds (S808). If a response can be received within this period, this flow is ended, and the received data is analyzed to continue the procedure.

If a response cannot be received within 3 seconds, the number of times of transmissions of commands is checked in step S809.

If the number of times of transmissions of commands is less than 3, the flow returns to step S802, and 1 second is set in the timer according to the T.30 recommendation so as to re-transmit commands.

If the commands are re-sent three times, this flow is ended without performing re-transmission, and the communication is terminated as an error (S810).

The preamble time control of this embodiment has been described. This control is common to the communication adapter and the terminal facsimile apparatus.

In this embodiment, a facsimile apparatus having an RS-232C function is used as the communication adapter of the remote registration apparatus. Alternatively, a communication may be performed using a PC having an external or internal modem as a host.

In this manner, in a normal facsimile communication procedure, a preamble of 1 second is added according to the standards, and after the specific procedure for the remote registration is started, an arbitrarily determined shorter preamble is used, thereby improving communication efficiency. the received data is analyzed to continue the procedure.

As a countermeasure against a communication error caused by an echo, an arbitrary preamble time may be set. When the circuit condition is poor, the preamble time may be prolonged to improve communication performance.

In addition, when a response cannot be obtained for transmitted commands, the preamble time is re-set to 1 second according to the CCITT standards so as to retransmit commands, thus avoiding a trouble.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus for performing a data registration to a plurality of facsimile apparatuses connected to a public network through the public network, comprising:

means for inputting registration data;

means for converting the registration data into a plurality of frames; and means for successively transmitting the plurality of frames converted by said converting means as HDLC frames of a facsimile procedure signal to a facsimile apparatus to be subjected to the data registration.

2. A method of registering dial data to be used by a facsimile apparatus having a dialing means after registration to the facsimile apparatus through a telephone line, the dial data including at least one of user telephone number data, user abbreviation data, speed dial telephone number data and speed dial abbreviation data, said method comprising the steps of:

designating the facsimile apparatus to which the dial data is to be registered by using a computer terminal;

inputting the dial data to the computer terminal;

converting the inputted dial data into data having a format capable of being communicated; and transmitting the converted data to the designated facsimile apparatus through the telephone line so as to store the data into a memory which is built in the facsimile apparatus and to register the stored data with the dialing means of the facsimile apparatus.

3. A facsimile apparatus for transmitting/receiving facsimile information (e.g. character information/image information), and a control command, comprising:

means for adding a control code indicating a division of the control command to the control command;

means for converting the control command added with the control code into packet data having a predetermined data length on the basis of the control code;

means for transmitting the packet data to a destination station;

means for extracting the control command included in the packet data; and means for informing to an apparatus which transmitted the packet data that the control command was extracted, wherein a transmitting facsimile apparatus waits for a response to the control command from a receiving facsimile apparatus, and wherein the transmitting facsimile apparatus restarts transmission of the packet data including the control command from a portion where the information of the extraction of the control command from the receiving facsimile apparatus is stopped.

4. A facsimile apparatus for transmitting/receiving image information and file data, comprising:

means for adding, to the file data, a control code indicating a continuation of the file data;

means for converting the file data and the control code into an HDLC frame having a predetermined data length; and means for transmitting the HDLC frame as a facsimile procedure signal to a destination station.

5. A facsimile apparatus for transmitting/receiving image information and dial data, comprising:

means for adding, to the dial data, a control code indicating a continuation of the dial data;

means for converting the dial data and the control code into an HDLC frame having a predetermined data length;

means for transmitting the HDLC frame as a facsimile procedure signal to a destination station; and storage means for storing the dial data of the HDLC frame.

6. A method of controlling a facsimile apparatus for performing a data registration to a plurality of facsimile apparatuses connected to a public network through the public network, comprising the steps of:

requesting terminal type data of said plurality of facsimile apparatuses prior to the data registration; and comparing terminal type data of the facsimile apparatuses to be subjected to the data registration with the terminal type data obtained in response to the request, wherein when the comparison result indicates a non-coincidence, the facsimile apparatus which requested the terminal type data interrupts the communication, and wherein the terminal type data includes a terminal type name, a destination country of an apparatus, and a software development history number as attributes of the facsimile apparatus.

7. A method of controlling a facsimile apparatus for performing a data registration to a plurality of facsimile apparatuses connected to a public network through the public network, comprising the steps of:

designating terminal type data of said plurality of facsimile apparatuses prior to the data registration; and comparing terminal type data of the facsimile apparatus to be subjected to the data registration with the designated terminal type data, wherein when the comparison result indicates a non-coincidence, the facsimile apparatus to be subjected to the data registration interrupts the communication, and wherein the terminal type data includes a terminal type name, a destination country of an apparatus, and a software development history number as attributes of the facsimile apparatus.

8. A method of controlling a facsimile apparatus for performing a data registration to a plurality of facsimile apparatuses connected to a public network through the public network, comprising the steps of:

inputting registration data;

converting the registration data into a predetermined frame format; and changing a preamble time of a preamble to be added to the beginning of the frame in the data registration to be different from a preamble time upon execution of a normal facsimile procedure, wherein the preamble time can be arbitrarily registered in advance.

9. A facsimile apparatus for performing a data registration to a plurality of facsimile apparatuses connected to a public network through the public network comprising:

means for inputting registration data;

means for converting the registration data into a predetermined frame format;

means for adding a code indicating continuation of a frame to data constituting the frame in units of a predetermined number of bytes;

means for, when the code is detected, dividing the frame into a plurality of frames; and means for successively transmitting the plurality of frames divided by said dividing means as HDLC frames of a facsimile procedure signal to a facsimile apparatus to be subjected to the data registration.

10. A method of controlling a facsimile apparatus for transmitting/receiving image information and for transmitting data, comprising the steps of:

dividing the data into a plurality of frames;

adding a control code indicating the end of a piece of data, to a last frame among the divided frames, and adding a control code indicating an intermediate part of a piece of data, to intermediate frames of the divided frames; and sequentially transmitting the frame added with the control code as an HDLC frame.

11. A facsimile apparatus for receiving registration data transmitted through a public network and having a predetermined frame format, comprising:

means for receiving an HDLC frame as a facsimile procedure signal;

means for discriminating whether or not last data of the frame is a code indicating continuation of the frame;

means for, when the last data is not the code indicating continuation of the frame, executing commands in the frame, for, when the commands are normally executed, transmitting a positive response, and for, when the commands are not normally executed, transmitting a negative response;

means for, when the last data is the code indicating continuation of the frame, transmitting a positive response without executing commands in the frame, and receiving the next frame; and means for linking a frame which contains the code indicating continuation of the frame to a preceding frame, and for executing commands in said linked frame.

12. The apparatus according to claim 11, further comprising:

means for monitoring a frame number in the next frame upon reception of the next frame, wherein when the received frame number is not a serial number with the previously received frame number, a negative response is transmitted without executing commands in the frame, and the commands received so far are abandoned.

13. A facsimile apparatus for performing a data registration to a plurality of facsimile apparatuses connected to a public network through the public network, comprising:

means for inputting registration data;

means for converting the registration data into a predetermined frame format;

means for monitoring a length of a command for the data registration;

means for, when the command has a length smaller than an arbitrarily determined maximum length of the frames, adding a code indicating division between adjacent commands, and for setting a plurality of commands with the code added in one frame; and means for transmitting the frame, in which the plurality of commands are set, as an HDLC frame of a facsimile procedure signal to a facsimile apparatus to be subjected to the data registration.

14. The apparatus according to claim 13, wherein when the division by a single command exceeds the maximum frame length, another command is not added to the single command.

15. A method of controlling a facsimile apparatus for transmitting/receiving image information and for receiving data, comprising the steps of:

receiving an HDLC data frame including an added control code indicating an intermediate part of a piece of data or indicating the end of a piece of data;

connecting the received data frame in accordance with the control code; and processing the connected data.

16. A facsimile apparatus for performing a dial data registration to a facsimile apparatus connected to a public network through the public network, comprising:

means for requesting terminal type data of a further facsimile apparatus to be subjected to the dial data registration prior to data transmission to the further facsimile apparatus;

comparing means for comparing prescribed terminal type data of the further facsimile apparatus with the terminal type data obtained in response to the request; and means for, when a comparison result by said comparing means indicates non-coincidence of the prescribed and obtained terminal type data, interrupting a transmission of dial data to be used for performing the dial data registration to the further facsimile apparatus.

17. A facsimile apparatus for performing a data registration to a plurality of facsimile apparatuses connected to a public network through the public network, comprising:

means for requesting terminal type data of said plurality of facsimile apparatuses prior to the data registration; and means for comparing terminal type data of the facsimile apparatuses to be subjected to the data registration with the terminal type data obtained in response to the request, wherein when the comparison result indicates a non-coincidence, the facsimile apparatus which requested the terminal type data interrupts the communication, and wherein the terminal type data includes a terminal type name, a destination country of an apparatus, and a software development history number as attributes of the facsimile apparatus.

18. A facsimile apparatus for performing a dial data registration to a plurality of facsimile apparatuses connected to a public network through the public network, comprising:

means for designating terminal type data of said plurality of facsimile apparatuses prior to the dial data registration;

means for requesting terminal type data of one facsimile apparatus, of the plurality of facsimile apparatuses, to be subjected to the data registration prior to data transmission to the one facsimile apparatus;

means for receiving terminal type data from the one facsimile apparatus;

comparing means for comparing the received terminal type data of the one facsimile apparatus with the designated terminal type data; and means for, when a comparison result by said comparing means indicates non-coincidence of the received and designated terminal type data, interrupting transmission of dial data to be used for the dial data registration to the one facsimile apparatus.

19. A facsimile apparatus for performing a data registration to a plurality of facsimile apparatuses connected to a public network through the public network, comprising:

means for designating terminal type data of said plurality of facsimile apparatuses prior to the data registration; and means for comparing terminal type data of the facsimile apparatus to be subjected to the data registration with the designated terminal type data, wherein when the comparison result indicates a non-coincidence, the facsimile apparatus to be subjected to the data registration interrupts the communication, and wherein the terminal type data includes a terminal type name, a destination country of an apparatus, and a software development history number as attributes of the facsimile apparatus.

20. A method of controlling a facsimile apparatus for performing a data registration to a plurality of facsimile apparatuses connected to a public network through the public network, comprising the steps of:

inputting registration data;

converting the registration data into a plurality of frames; and successively transmitting the plurality of frames converted at said converting step as HDLC frames of a facsimile procedure signal to a facsimile apparatus to be subjected to the data registration.

21. A facsimile apparatus for performing a data registration to a plurality of facsimile apparatuses connected to a public network through the public network, comprising:

means for inputting registration data;

means for converting the registration data into a predetermined frame format; and means for changing a preamble time of a preamble to be added to the beginning of the frame in the data registration to be different from a preamble time upon execution of a normal facsimile procedure, wherein the preamble time can be arbitrarily registered in advance.

22. A facsimile apparatus for performing a data registration to a plurality of facsimile apparatuses connected to a public network through the public network, comprising:

means for inputting registration data;

means for converting the registration data into a predetermined frame format; and means for changing a preamble time of a preamble to be added to the beginning of the frame in the data registration to be different from a preamble time upon execution of a normal facsimile procedure, wherein in the data registration, when no response is sent back from the receiving facsimile apparatus after the frame is transmitted, the preamble time is restored to be the same as the preamble time upon execution of the normal facsimile procedure, and the frame is re-transmitted.

23. A facsimile apparatus for transmitting/receiving image information and for transmitting data, comprising:

dividing means for dividing the data into a plurality of frames;

adding means for adding a control code indicating the end of a piece of data, to a last frame among the divided frames, and for adding a control code indicating an intermediate part of a piece of data, to intermediate frames of the divided frames; and transmission means for sequentially transmitting the frame added with the control code as an HDLC frame.

24. The apparatus according to claim 23, wherein said transmission means transmits the frame as a facsimile procedure signal.

25. The apparatus according to claim 23, wherein said dividing means divides the data in accordance with a number of bytes constituting the data.

26. The apparatus according to claim 23, wherein said dividing means divides the data in accordance with a transmission time of the data.

27. The apparatus according to claim 23, wherein the data is command data.

28. A facsimile apparatus for transmitting/receiving image information and for receiving data, comprising:

reception means for receiving an HDLC data frame including an added control code indicating an intermediate part of a piece of data or indicating the end of a piece of data;

connection means for connecting the received data frame in accordance with the control code; and processing means for processing the connected data.

29. The apparatus according to claim 28, wherein said reception means receives the data frame as a facsimile procedure signal.

30. The apparatus according to claim 28, wherein the data is command data.

31. A method of registering dial data to be used by a facsimile apparatus having a dialing means after registration to the facsimile apparatus through a telephone line, the dial data including at least one of user telephone number data, user abbreviation data, speed dial telephone number data and speed dial abbreviation data, said method comprising the steps of:

designating the facsimile apparatus to which the dial data is to be registered by using a computer terminal;

inputting the dial data to the computer terminal;

converting the inputted dial data into data having a format capable of being communicated;

transmitting the converted data to the designated facsimile apparatus through the telephone line; and storing the data into a memory which is built in the facsimile apparatus and registering the stored data with the dialing means of the facsimile apparatus.

32. The method according to claim 31, wherein the dial data is to be used when the facsimile apparatus performs a facsimile transmission.

33. The method according to claim 31, further comprising the steps of inputting destination-name data corresponding to the dial data to the computer terminal, wherein the inputted destination-name data is converted into data having a format capable of being communicated, the converted data is transmitted to the designated facsimile apparatus through the telephone line and the memory stores the converted data.

34. A method of registering data to an image forming apparatus at a remote position comprising the steps of:

requesting type data of the image forming apparatus to be subjected to data registration prior to data transmission to the image forming apparatus;

comparing predetermined type data with the type data obtained in response to the request;

performing the data registration to the image forming apparatus when the obtained type data corresponds to the predetermined type data; and suspending the data registration to the image forming apparatus when the obtained type data do not correspond to the predetermined type data.

35. A method according to claim 34, wherein the type data include terminal type data.

36. A method according to claim 34, wherein the type data include destination country data.

37. A method according to claim 34, wherein the type data include program version data.

38. A method according to claim 34, wherein said image forming apparatus is a facsimile apparatus and data is registered to the facsimile apparatus through a public line.

39. A method according to claim 38, wherein the data to be registered is transmitted by using a HDLC frame.

40. A method according to claim 38 wherein the data to be registered is dial data.

41. A method according to claim 34, wherein the data registration step includes a step of storing the data into a memory in the image forming apparatus.

42. An apparatus for registering data to an image forming apparatus at a remote position, comprising;

means for requesting type data of the image forming apparatus to be subjected to data registration prior to data transmission to the image forming apparatus;

comparing means for comparing predetermined type data with the type data obtained in response to the request; and registration means for performing the data registration to the image forming apparatus when the obtained type data corresponds to the predetermined type data, said registration means suspending the data registration to the image forming apparatus when the obtained type data does not correspond to the predetermined type data.

43. An apparatus according to claim 42, wherein the type data include terminal type data.

44. An apparatus according to claim 42, wherein the type data include destination country data.

45. An apparatus according to claim 42, wherein the type data include program version data.

46. An apparatus according to claim 42, wherein said image forming apparatus is a facsimile apparatus and data is registered to the facsimile apparatus through a public line.

47. An apparatus according to claim 46, wherein the data to be registered is dial data.

48. An apparatus according to claim 46, wherein the data to be registered is transmitted by using a HDLC frame.

49. An apparatus according to claim 42, wherein said registration means stores the data into a memory in the image forming apparatus.

50. A method of registering data to an image forming apparatus at a remote position comprising the steps of:

receiving type data of the image forming apparatus to be subjected to data registration prior to data transmission to the image forming apparatus;

comparing predetermined type data with the type data received in said receiving step;

performing the data registration to the image forming apparatus when the received type data corresponds to the predetermined type data; and suspending the data registration to the image forming apparatus when the received type data do not correspond to the predetermined type data.

51. The method according to claim 50, wherein the type data include terminal type data.

52. The method according to claim 50, wherein the type data include destination country data.

53. The method according to claim 50, wherein the type data include program version data.

54. The method according to claim 50, wherein said image forming apparatus is a facsimile apparatus and data is registered to the facsimile apparatus through a public line.

55. The method according to claim 54, wherein the data to be registered is dial data.

56. The method according to claim 54, wherein the data to be registered is transmitted by using a HDLC frame.

57. The method according to claim 50, wherein the data registration step includes a step of storing the data into a memory in the image forming apparatus.

58. An apparatus for registering data to an image forming apparatus at a remote position, comprising:

means for receiving type data of the image forming apparatus to be subjected to data registration prior to data transmission to the image forming apparatus;

comparing means for comparing predetermined type data with the type data received by said receiving means; and registration means for performing the data registration to the image forming apparatus when the received type data corresponds to the predetermined type data, said registration means suspending the data registration to the image forming apparatus when the received type data does not correspond to the predetermined type data.

59. The apparatus according to claim 58, wherein the type data include terminal type data.

60. The apparatus according to claim 58, wherein the type data include destination country data.

61. The apparatus according to claim 58, wherein the type data include program version data.

62. The apparatus according to claim 58, wherein said image forming apparatus is a facsimile apparatus and data is registered to the facsimile apparatus through a public line.

63. The apparatus according to claim 62, wherein the data to be registered is dial data.

64. The apparatus according to claim 62, wherein the data to be registered is transmitted by using a HDLC frame.

65. The apparatus according to claim 58, wherein said registration means stores the data into a memory in the image forming apparatus.

\* \* \* \* \*

UNITED STATES PATENT AND TRADEMARK OFFICE
CERTIFICATE OF CORRECTION

PATENT NO. : 6,005,675

DATED : December 21, 1999

INVENTOR(S) : TORU MAEDA ET AL.    Page 1 of 3

It is certified that error appears in the above-identified patent and that said Letters Patent is hereby corrected as shown below:

In the Drawings:
 SHEET 32

Figure 36:
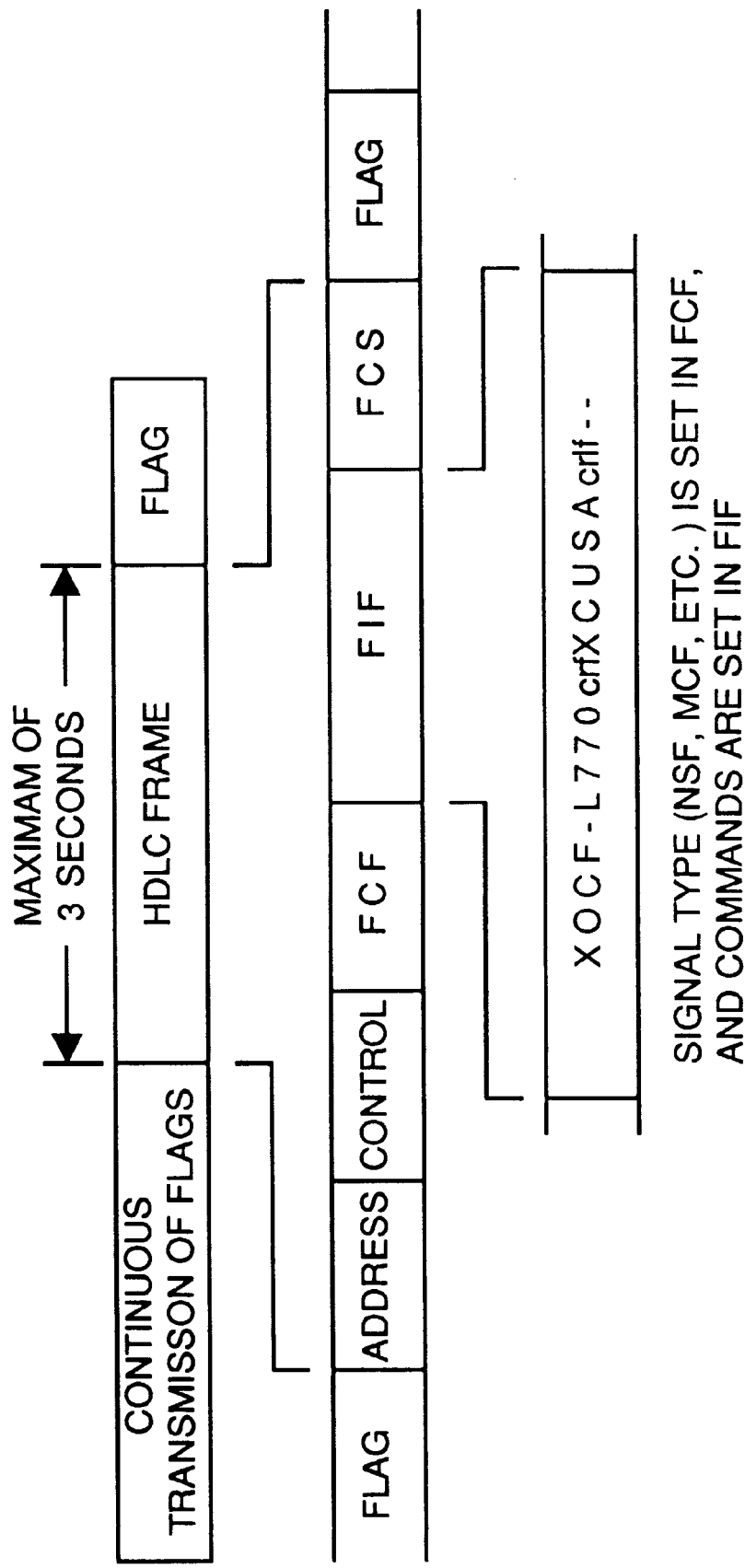
FIG. 36 shows a frame format according to the seventh embodiment.

Figure 36, "MAXIMAM" should read --MAXIMUM--.

COLUMN 1

Line 31, "a" should read --a read--.

COLUMN 2

Line 8, "cannot" should read --cannot be--.
   Line 25, "period" should read --period of--.
   Line 32, "be" should read --be normally--.
   Line 53, "period" should read --period of--.

COLUMN 11

Line 39, "a" should read --of a--.

UNITED STATES PATENT AND TRADEMARK OFFICE
CERTIFICATE OF CORRECTION

PATENT NO. : 6,005,675

DATED : December 21, 1999

INVENTOR(S) : TORU MAEDA ET AL.

It is certified that error appears in the above-identified patent and that said Letters Patent is hereby corrected as shown below:

COLUMN 14

Line 64, "can" should read --can be--.

COLUMN 19

Line 32, "iS" should read --is--.

COLUMN 20

Line 28, "29D" should read --29D).--.

COLUMN 21

Line 21, "place. <Seventh" should read
     --place.  ¶<Seventh--.

COLUMN 26

Line 54, "the" should read --The--.

UNITED STATES PATENT AND TRADEMARK OFFICE
CERTIFICATE OF CORRECTION

PATENT NO. : 6,005,675

DATED : December 21, 1999

INVENTOR(S) : TORU MAEDA ET AL.

It is certified that error appears in the above-identified patent and that said Letters Patent is hereby corrected as shown below:

COLUMN 33

```
Line 8, "claim 38" should read --claim 38,--.
Line 14, "comprising;" should read --comprising:--.
```

Signed and Sealed this

Twentieth Day of February, 2001

Attest:

NICHOLAS P. GODICI

Attesting Officer    Acting Director of the United States Patent and Trademark Office